(12) United States Patent
Takara et al.

(10) Patent No.: US 8,964,581 B2
(45) Date of Patent: Feb. 24, 2015

(54) BANDWIDTH VARIABLE COMMUNICATION METHOD, BANDWIDTH VARIABLE COMMUNICATION APPARATUS, TRANSMISSION BANDWIDTH DETERMINATION APPARATUS, TRANSMISSION BANDWIDTH DETERMINATION METHOD, NODE APPARATUS, COMMUNICATION PATH SETTING SYSTEM, COMMUNICATION PATH SETTING

(75) Inventors: Hidehiko Takara, Yokosuka (JP);
Masahiko Jinno, Yokosuka (JP);
Atsushi Watanabe, Yokohama (JP);
Kozicki Bartlomiej, Yokosuka (JP);
Yoshiaki Sone, Yokosuka (JP); Akira Hirano, Yokohama (JP); Takafumi Tanaka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 547 days.

(21) Appl. No.: 13/395,747

(22) PCT Filed: Sep. 13, 2010

(86) PCT No.: PCT/JP2010/065765
§ 371 (c)(1),
(2), (4) Date: May 4, 2012

(87) PCT Pub. No.: WO2011/030897
PCT Pub. Date: Mar. 17, 2011

(65) Prior Publication Data
US 2012/0224851 A1 Sep. 6, 2012

(30) Foreign Application Priority Data

Sep. 14, 2009 (JP) ................................. 2009-212148
Mar. 23, 2010 (JP) ................................. 2010-066826
Mar. 24, 2010 (JP) ................................. 2010-068796

(51) Int. Cl.
*H04B 10/079* (2013.01)
*H04L 12/42* (2006.01)
(Continued)

(52) U.S. Cl.
CPC ............ *H04L 12/42* (2013.01); *H04B 10/0793* (2013.01); *H04B 10/07953* (2013.01);
(Continued)

(58) Field of Classification Search
USPC .......................................................... 370/252
See application file for complete search history.

(56) References Cited

U.S. PATENT DOCUMENTS

| 2011/0103413 | A1* | 5/2011 | Kafka et al. ................... 372/22 |
| 2011/0164620 | A1 | 7/2011 | Jinno et al. |
| 2012/0330804 | A1* | 12/2012 | Morrill et al. .................. 705/34 |

FOREIGN PATENT DOCUMENTS

| JP | 6 121354 | 4/1994 |
| JP | 2007-158667 | 6/2007 |

(Continued)

OTHER PUBLICATIONS

Sato, K.I., et al., "Network Performance and Integrity Enhancement with Optical Path Layer Technologies," IEEE Journal on Selected Areas in Communications, vol. 12, No. 1, pp. 159-170, (Jan. 1994).

(Continued)

*Primary Examiner* — Melvin Marcelo
*Assistant Examiner* — Peter Solinsky
(74) *Attorney, Agent, or Firm* — Oblon, Spivak, McClelland, Maier & Neustadt, L.L.P.

(57) ABSTRACT

A bandwidth variable communication method is provided that enables effective use of frequency bandwidths in which the bit rate is constant in every optical path. The bandwidth variable communication method includes, when a network management apparatus sets or changes an optical path that passes through plural communication apparatuses, measuring or obtaining an optical signal quality deterioration amount in a route of the optical path; selecting a modulation format in which a spectrum bandwidth is the narrowest from among modulation formats by which transmission is available on conditions of the optical signal quality deterioration amount and a desired bit rate B (bit/s); and exchanging control information between the network management apparatus and a control unit of each communication apparatus on the optical path route. A bandwidth variable communication apparatus receives the control information, and changes a passband based on the received control information.

25 Claims, 45 Drawing Sheets

(51) Int. Cl.
*H04J 14/02* (2006.01)
*H04L 12/437* (2006.01)

(52) U.S. Cl.
CPC ............ *H04J14/02* (2013.01); *H04J 14/0212* (2013.01); *H04J 14/0213* (2013.01); *H04J 14/0217* (2013.01); *H04J 14/0221* (2013.01); *H04J 14/0224* (2013.01); *H04L 12/437* (2013.01); *H04J 14/0204* (2013.01); *H04J 14/0295* (2013.01); *H04J 14/0254* (2013.01); *H04J 14/0257* (2013.01); *H04J 14/026* (2013.01); *H04J 14/0267* (2013.01); *H04J 14/0269* (2013.01); *H04J 14/0268* (2013.01)
USPC ........................................................ 370/252

(56) References Cited

FOREIGN PATENT DOCUMENTS

| | | |
|---|---|---|
| JP | 2008 167126 | 7/2008 |
| WO | 2010 032844 | 3/2010 |

OTHER PUBLICATIONS

Goto, H., et al., "Polarization-multiplexed 1 Gsymbol/s, 128 QAM (14 Gbit/s) coherent optical transmission over 160 km using a 1.4 GHz Nyquist filter," IEEE, OFC/NFOEC, Total 3 Pages, (2008).

Rival, O., et al., "Optical Network Planning with Rate-Tunable NRZ Transponders," ECOC 2009, Total 2 Pages, (Sep. 20-24, 2009).

International Search Report Issued Dec. 7, 2010 in PCT/JP10/65765 Filed Sep. 13, 2010.

Japanese Office Action issued May 21, 2013, in Japan Patent Application No. 2011-530906.

Yoshiaki Sone, et al., "Highly Survivable Restoration Scheme Employing Optical Bandwidth Squeezing in Spectrum-Sliced Elastic Optical Path (SLICE) Network", Optical Fiber Communication 2009, Mar. 26, 2009, 3 pages.

\* cited by examiner (SHORT DISTANCE, TRANSMISSION ROUTE IS GOOD)

(SHORT DISTANCE, TRANSMISSION ROUTE
ENVIRONMENT IS DETERIORATED)

(LONG DISTANCE)

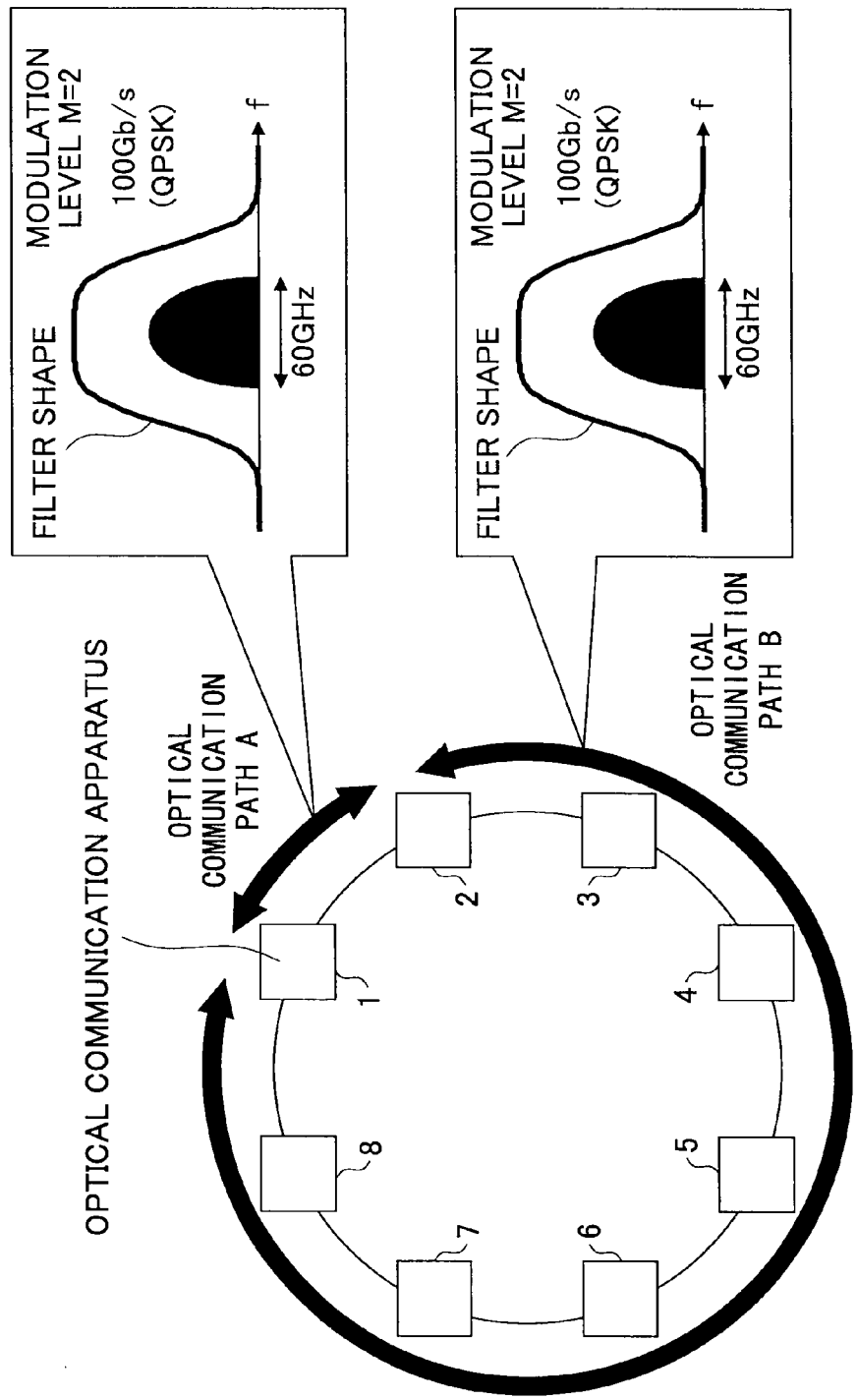

SPECTRUM BEFORE PASSING THROUGH FILTER

SPECTRUM AFTER PASSING THROUGH MULTIPLE FILTERS (WHEN NARROW BANDWIDTH IS ASSIGNED)

SPECTRUM BEFORE PASSING THROUGH FILTER

SPECTRUM AFTER PASSING THROUGH MULTIPLE FILTERS (WHEN WIDE BANDWIDTH IS ASSIGNED)

NUMBER OF TRANSFER NODES, TRANSFER DISTANCE
(CONVENTIONAL METHOD)

NUMBER OF TRANSFER NODES, TRANSFER DISTANCE
(PRESENT INVENTION)

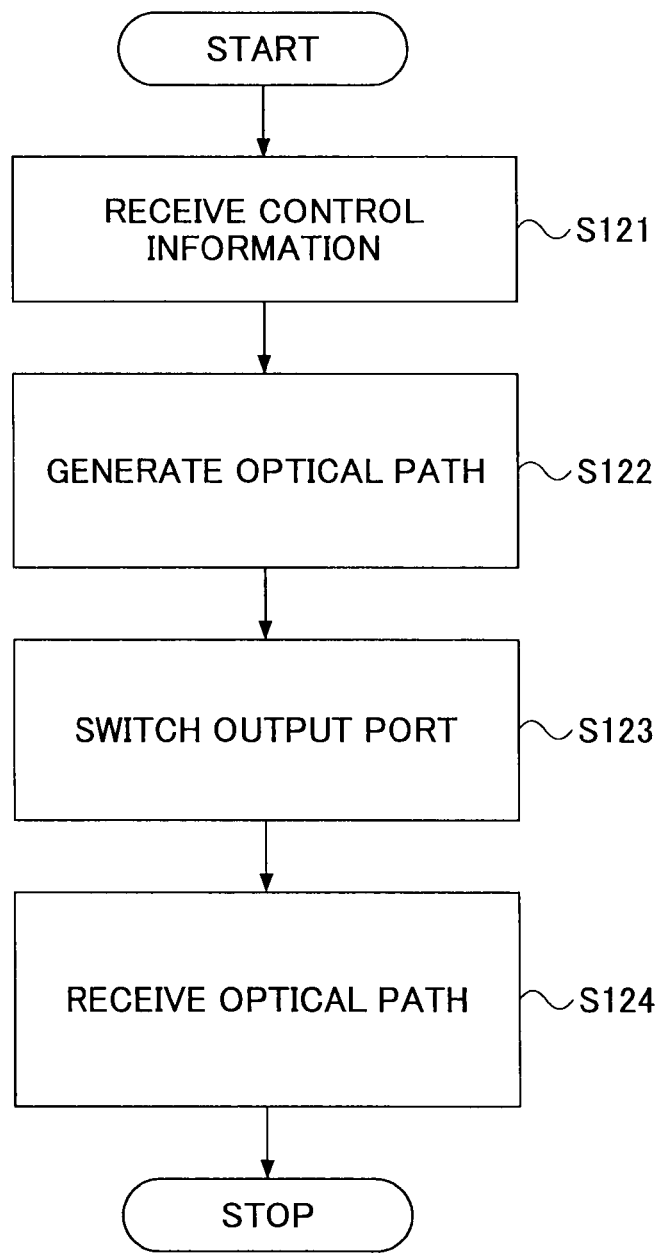

(RING-TYPE NETWORK OF 12 NODES)

(CONVENTIONAL TECHNIQUE)

FIG.20B
400 Gb/s OFDM OPTICAL PATH
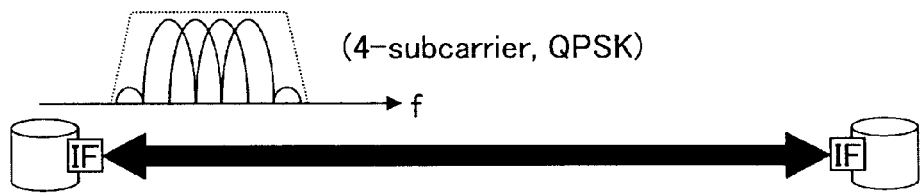
(4-subcarrier, QPSK)
400 Gb/s OFDM OPTICAL PATH
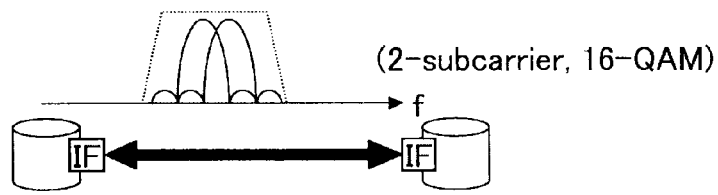
(2-subcarrier, 16-QAM)
(PRESENT INVENTION)
FIG.21
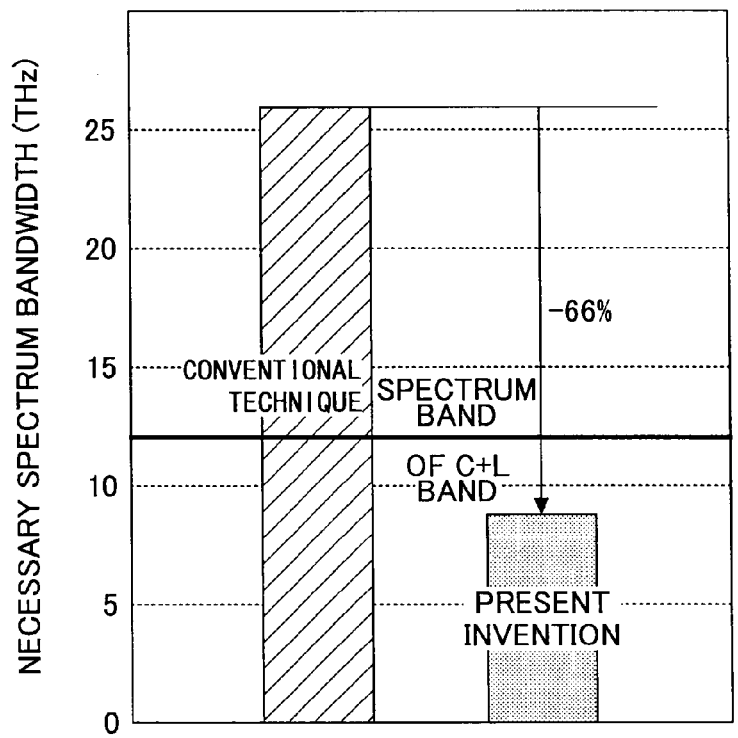

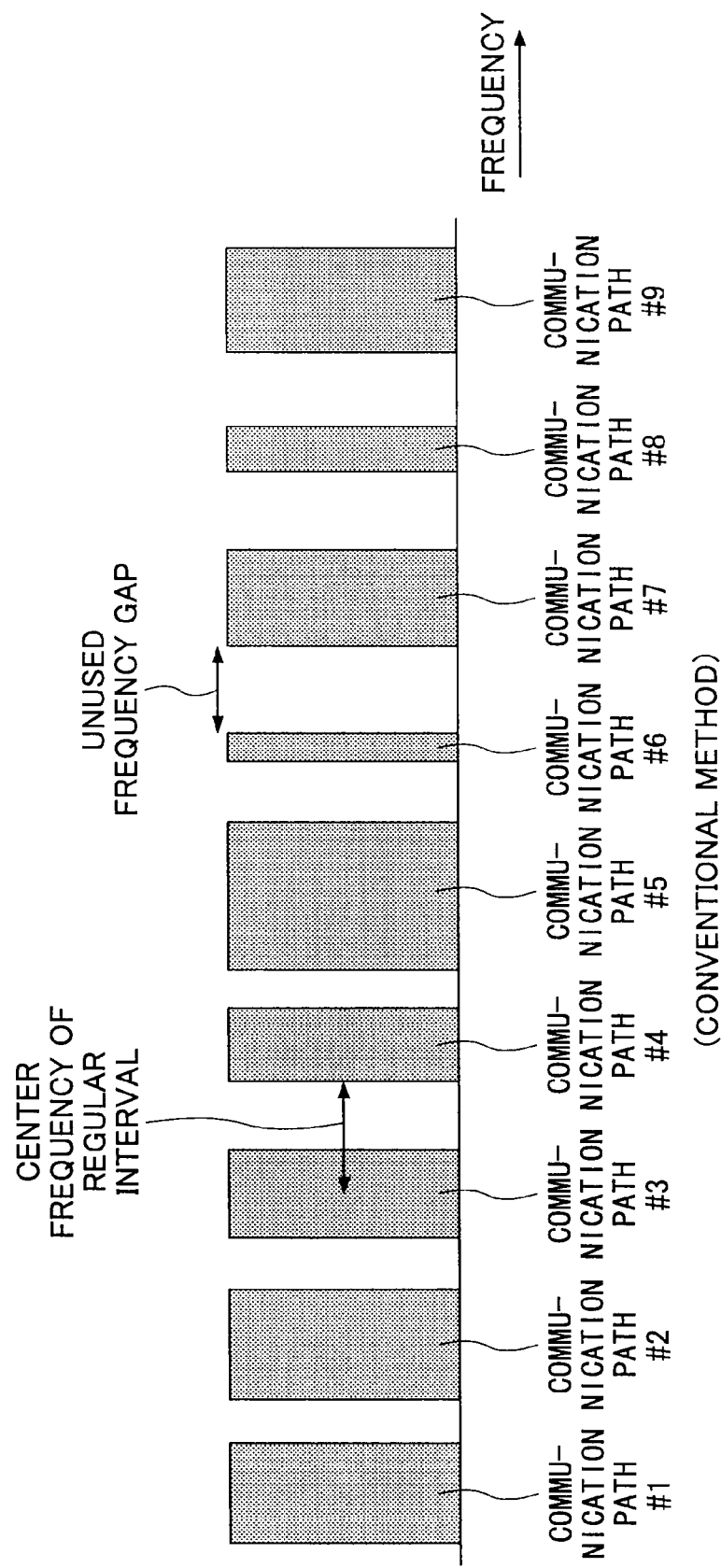

FIG.39

| | TRANSMISSION DISTANCE | NUMBER OF PASSING NODES | BIT RATE | COMMUNICATION PATH BANDWIDTH |
|---|---|---|---|---|
| TRANSMISSION SPECIFICATION PATTERN#1 | 0~100km | 2~3 | 40Gbps | 25GHz |
| TRANSMISSION SPECIFICATION PATTERN#2 | 100~150km | 3~4 | 40Gbps | 50GHz |
| TRANSMISSION SPECIFICATION PATTERN#3 | 150~250km | 4~6 | 40Gbps | 100GHz |
| TRANSMISSION SPECIFICATION PATTERN#4 | 0~100km | 2~3 | 100Gbps | 50GHz |
| TRANSMISSION SPECIFICATION PATTERN#5 | 100~150km | 3~4 | 100Gbps | 100GHz |

BANDWIDTH VARIABLE COMMUNICATION METHOD, BANDWIDTH VARIABLE COMMUNICATION APPARATUS, TRANSMISSION BANDWIDTH DETERMINATION APPARATUS, TRANSMISSION BANDWIDTH DETERMINATION METHOD, NODE APPARATUS, COMMUNICATION PATH SETTING SYSTEM, COMMUNICATION PATH SETTING

TECHNICAL FIELD

The present invention relates to a technique for controlling transmission bandwidths in an optical communication path, in an optical communication network that forms the optical communication path by connecting transmission routes such as optical fibers using node apparatuses such an optical cross-connect, a ROADM (Reconfigurable add drop multiplexer) and the like.

BACKGROUND ART

The optical communication path network (to be also referred to as optical path network) that supports current backbone networks and metro networks are mainly formed by optical communication apparatuses (that may be referred to as node apparatuses) such as wavelength multiplexing transmission apparatuses and optical add drop apparatuses (ROADM: Reconfigurable add drop multiplexer and the like), transmission routes such as optical fibers connecting them, and optical communication paths such as wavelength for connecting the optical communication apparatuses via the transmission routes. Especially, research and development are getting attention for a transparent-type optical communication path network that forms an optical communication path between an optical communication apparatus of a transmission end and an optical communication apparatus of a receiving end without recover and relay processing for optical signals in relay sections.

In the following, an optical communication method and apparatus in the conventional transparent type optical communication path network are described in the following.

FIG. 1 shows an example of a conventional ring-type optical communication path network (refer to non-patent document 1, for example). The optical communication path network includes optical communication apparatuses 1-8. As shown in FIG. 2, each of the optical communication apparatuses 1-8 mainly includes a transmission function unit 11 including a transmission function of a main signal, a receiving function unit 12 including a receiving function, a route exchange function unit 13 including a wavelength multiplexing-demultiplexing unit and an optical switch, and a control unit 16 configured to control the transmission function unit 11, the receiving function unit 12 and the route switch function unit 13. Also, optical amplifiers 14 and 15 are provided according to the level of the optical signal.

In addition, in the optical communication apparatus at the input side (transmission end) of the optical communication path, the transmission function unit 11 converts an electrical signal transmitted from a client into an optical signal and outputs the optical signal, then, the route exchange function unit 13 switches a destination of the output optical communication path to a designated destination. Also, at the optical communication apparatus in the output side (receiving end) of the optical communication path, the route exchange function unit 13 switches the destination of the optical communication path to the receiving function unit 12, so that the receiving function unit 12 converts the optical signal into the electrical signal. The optical communication apparatus in the relay side switches between routes for each optical communication path.

According to the above-mentioned optical communication method, processes for optical signals are reduced in the optical communication apparatuses in the relay section. Thus, it is expected to realize economization, space-saving, and power saving for the optical communication path network

RELATED ART DOCUMENT

[Non-Patent document 1] K. Sato et al., "Network performance and integrity enhancement with optical path layer technologies", IEEE J-SAC, Vol. 12, No. 1, pp. 159-170. 1994

[Non-Patent document 2] H. Goto et al., "Polarization-multiplexed 1 Gsymbol/s, 128 QAM (14 Gbit/s) coherent optical transmission over 160 km using a 1.4 GHz Nyquist filter", OFC/NFOEC 2008, HThA45, 2008

[Non-Patent document 3] O. Rival et al, "Optical Network Planning with Rate Tunable NRZ Transponders," in Proc. ECOC 2009, Paper 8.3.4, 2009

[Patent document 1] Japanese Laid-Open Patent Application No. 2008-167126

SUMMARY OF THE INVENTION

Problem to be Solved by the Invention (First Aspect)

A problem in the first aspect is described first.

In recent years, research and development are actively undertaken for improving frequency use efficiency of optical signals by performing multilevel optical modulation (refer to non-patent document 2, for example), and it is expected that limited wavelength resources (frequency resources) in the optical fiber are more effectively used.

However, in the conventional optical path network, every length of optical paths uses a modulation scheme by which transmission can be performed for the optical signal quality deterioration amount of the longest optical path.

FIG. 3 shows a relationship between each type of modulation scheme and SNR penalty. The case of the modulation scheme of low modulation level such as PSK (Phase Shift Keying) and QPSK (Quadrature Phase Shift Keying) is suitable for transmission by an optical path of a long distance or the large number of nodes since the SNR penalty is small. On the other hand, as the modulation level increases like 8 PSK, 16 QAM and 64 QAM, the SNR penalty increases. Thus, the transmission distance and the number of nodes through which a signal can be transmitted decreases.

Therefore, in the conventional optical path network, a modulation scheme of the low modulation level such as PSK or QPSK in which SNR penalty is small is used such that a signal can be transmitted against optical signal quality deterioration amount due to effects of OSNR deterioration and non-linear optical effects in the longest optical path. Therefore, even for a short optical path (optical communication path A in FIG. 1, for example), a wide spectrum bandwidth which is necessary for the modulation scheme (QPSK) of the low modulation level is used like the longest path (optical communication path B of FIG. 1, for example), so that excessive spectrum bandwidth is assigned almost every optical path. Thus, almost every optical path is assigned an excessive spectrum bandwidth.

Also, as shown in FIGS. 4A-4C, in ADSL and wireless LAN, there is an adaptive modulation scheme in which connectivity is ensured by decreasing transmission bit rate when transmission path environment deteriorates. Applying this scheme also to the optical communication is proposed (refer to patent document 1, for example). However, these conventional examples are applied to cases of point to point (P2P). In the conventional technique, the bandwidth to be assigned to each optical path is fixed. Thus, even though spectrum bandwidth is changed when the modulation scheme is changed, frequency use efficiency is not improved.

In the case for an optical path of a short transmission distance that includes the small number of nodes, a desired transmission bit rate can be ensured using a modulation scheme of high modulation level since the optical signal quality deterioration is small. However, in the case for optical paths of long distance or the large number of passing nodes, the optical signal quality deterioration becomes large. Thus, in this case, since a modulation scheme of low modulation level is used, the bit rate decreases and there is a problem in that the desired transmission bit rate cannot be ensured.

(Second Aspect)

Next, a problem in a second aspect is described.

When performing optical transmission without performing electrical signal processing as described in the background art, realizable transmission specification (transmission distance, bit rate, signal quality) is restricted due to deterioration of optical signals (optical loss, amplifier noise, bandwidth narrowing by filtering in the node, and the like). Thus, in order to realize high-performance transmission specification, it is necessary to reduce deterioration of optical signals in a communication path as much as possible.

For example, as the required transmission distance becomes longer or as the required bit rate becomes higher, it is more necessary to suppress transmission deterioration of optical communication path (frequency narrowing due to filtering and the like). Also, in order to obtain resistance against transmission deterioration, it is required to establish a communication path by sufficiently keeping spectrum bandwidth to be used by the optical communication path (refer to non-patent document 3, for example).

Therefore, for a communication path having severe transmission specification (high bit rate, long distance transmission), it is necessary to sufficiently ensure spectrum bandwidth to be used for the communication path in order to reduce effects of the transmission deterioration. But, on the other hand, since frequency resources of the optical fiber are finite, it is extremely important to accommodate more optical communication paths into a transmission route so as to utilize frequency resources efficiently.

However, in the establishment of the conventional optical communication path, a modulation scheme and a filter width required for a path having the severest transmission specification are uniformly used for every optical path. Therefore, even an optical communication path for which transmission specification is not severe uses a wide spectrum bandwidth similarly to the optical communication path of the severest specification, so that almost all of the optical communication paths are assigned excessive spectrum bandwidth. Therefore, even when optical signal quality deterioration is small in an optical communication path of a short transmission distance and having the small number of nodes, the frequency width to be assigned becomes large more than necessary, and frequency resources are wastefully consumed.

For example, in an example of a ring network shown in FIG. 5, in the case of an optical communication path network formed by two optical communication paths (optical communication path A, optical communication path B) of different transmission distance having the same bit rate, a modulation scheme and a filter width by which transmission is available in the optical communication path B of the severest transmission specification are set for both of the optical communication paths evenly. In this case, necessary and adequate filter width and spectrum bandwidth are provided for the optical communication path B. But, on the other hand, spectrum bandwidth and filter width excessive for the transmission specification are provided for the optical communication path A.

As mentioned above, it is important and a problem to use the finite frequency resources with economy in an optical communication network.

(Third Aspect)

Next, a problem in a third aspect is described.

<Relationship Between Transmission Distance and Assigned Bandwidth>

As described in the problem of the second aspect, for a communication path of the severe transmission specification (high bit rate, long distance transmission), it is necessary to adequately ensure the optical frequency bandwidth to be used by the communication path in order to reduce effects of transmission deterioration.

For example, in a case of a node apparatus (optical communication apparatus) in which a bandwidth of a communication path is set by changing a passband of a bandwidth variable optical filter, since the actual optical filter used in node apparatuses on the communication path is not an ideal rectangle shape, the effective passband narrows after the signal passes through plural stages of nodes. Therefore, in the case of a communication path that passes through many nodes, it is necessary to set a wide filter width for a long path in consideration of the above-mentioned effect. This is shown in FIGS. 6A and 6B. When a narrow bandwidth is assigned to the communication path, the bandwidth of the communication path further decreases due to narrowing effect of bandwidth that occurs when the signal passes through plural stages of filters having a deviation from a desired pass-characteristic in a node. Accordingly, the power of the signal light decreases, and signal to noise ratio deteriorates. Thus, the distance by which transmission is available is limited. On the other hand, in a case where a wide path bandwidth is assigned beforehand in consideration of the path bandwidth narrowing due to the filtering, more path bandwidth can be ensured even when the signal passes through many filters, so that the signal optical power can be endured. As a result, long transmission becomes available by the wide path bandwidth.

<Relationship Between Optical Frequency Use Efficiency and Assigned Bandwidth>

On the other hand, it is necessary to use optical frequency resources in a transmission route when setting an optical communication path to the transmission route. Thus, it is very important to reduce optical frequency resources used by the optical communication path and to accommodate more optical communication paths in the transmission route from the viewpoint of cost reduction in communication networks. It is expected to use finite wavelength resources (optical frequency resources) in the optical fiber more effectively. Also, in addition to that, it becomes possible to accommodate more communication paths using the same optical frequency resources by narrowing optical frequency used by the communication path in the transmission route.

As mentioned above, in a transparent optical communication network, as the resistance against transmission deterioration of a resistance path is increased (1), and as more resistance paths are accommodated in a communication network (2), more optical frequency resources are necessary.

Also, in an optical communication network, it is important to use optical frequency resources efficiently. From this point of view, there is a following problem in the third aspect.

Normally, optical communication paths (such as optical path) of various transmission specifications are set in a normal optical communication network. However, in the conventional optical communication path network, for optical communication paths of every transmission specification, the optical frequency bandwidth of every communication path is uniformly designed in conformity to the optical signal quality deterioration amount of a communication path of the severest transmission specification. Therefore, even an optical communication path for which transmission specification requirement is not severe uses a wide spectrum bandwidth similarly to the optical communication path of the severest requirement, so that almost all of the optical communication paths are assigned excessive optical frequency bandwidth. Therefore, even when optical signal quality deterioration is small in an optical communication path of a short transmission distance and having the small number of nodes, the frequency width to be assigned becomes large more than necessary, and frequency resources are wastefully consumed.

In addition, in a conventional communication network, in route exchange of a node apparatus, a center optical frequency of an optical signal that is input/output for the node apparatus is fixed, and the center optical frequency is adapted to an optical frequency grid having regular intervals. That is, it is necessary to set the center optical frequency of the input communication path to a predetermined value on the grid, and the number of communication paths that can be set in the node apparatus is determined to be constant according to the adopted grid and a frequency bandwidth in which communication paths can be set, so that communication frequencies of communication path bands are fitted to the grid. Accordingly, in the case when the optical frequency bandwidth to be used by the communication path is narrower than the grid interval, there is a problem in that an unused optical frequency bandwidth occurs between communication paths and waste of optical frequency occurs, also, there is a problem in that the number of communication paths that can be set is fixed regardless of the optical frequency bandwidth used by the communication path.

The technique disclosed in the patent document 1 is a scheme for changing a modulation scheme in a transmitter, in which it is not realized to use the optical frequency bandwidth efficiently by changing the filter bandwidth.

Also, in the case of the method for changing transmission scheme (such as modulation scheme) in an optical transmitter, it is necessary to implement, in the optical transmitter, plural transmission schemes and the switching function. Thus, there is a disadvantage that the configuration of the transmitter is complicated and the apparatus cost increases. Therefore, even though the optical frequencies are used efficiently, the transmitter cost increases more than that. Thus, there is a problem in that the cost of the communication network cannot be reduced.

The present invention is contrived in view of the first to third aspects, and objects of the present invention are as follows.

A first object of the present invention is to provide a bandwidth variable communication technique in which an optical path can be transferred by selecting a combination of a modulation level and a symbol rate by which transmission is available and spectrum bandwidth is narrow according to optical signal quality deterioration in an optical path route, the bit rate is constant in every optical path, and the frequency bandwidth can be utilized effectively.

A second object of the present invention is to provide a transmission bandwidth determination technique in which, in an optical communication path, a filter width is selected such that transmission is available and the use spectrum bandwidth becomes the smallest by properly changing both of a filter width and a modulation scheme according to optical signal quality deterioration that increases in proportion to the route length of the optical communication path, so that frequency resources are used effectively.

A third object of the present invention is to provide a technique that can set an optical communication path in which transmission is available and the optical frequency bandwidth is narrow according to optical signal quality deterioration in the optical communication path route, so that the optical frequency bandwidth can be used effectively.

Means for Solving the Problem

In order to achieve the first object, according to an embodiment of the present invention, there is provided a bandwidth variable communication apparatus and a bandwidth variable communication method using the bandwidth variable communication apparatuses for transmitting and receiving an optical path by selecting a modulation format in which transmission is available and the spectrum bandwidth is narrow, for example, according to an optical signal quality deterioration in the optical path route, and for changing a passable frequency bandwidth in a section through which the optical path passes in accordance with the bandwidth of the optical path.

The bandwidth variable communication method of an embodiment of the present invention is a bandwidth variable communication method in an optical path network, in which communication apparatuses are connected by optical transmission, that includes a network management apparatus having a function for setting and managing an optical path, the method being performed by the network management apparatus, or by the network management apparatus and the communication apparatus when the network management apparatus sets or changes an optical path that passes through plural communication apparatuses, the method comprising:

an optical signal quality deterioration amount obtaining step of obtaining an optical signal quality deterioration amount in a route of the optical path;

a modulation format selection step of selecting a modulation format in which a spectrum bandwidth is the narrowest from among modulation formats by which transmission is available on conditions of the optical signal quality deterioration amount and a desired bit rate B (bit/s);

a control message exchange step of exchanging control information for controlling a transmission unit, a receiving unit and a route exchange unit in the communication apparatus based on a selection result in the modulation format selection step, the control information being exchanged between the network management apparatus and a control unit of each communication apparatus on the optical path route;

an optical signal transmission step of generating and transmitting the optical signal of the selected modulation format and of the bit rate B (bit/s) based on the control information received by the control unit in the control message exchange step, the optical signal transmission step being performed by the transmission unit of a communication apparatus of a start point of the optical path;

a route exchange step of switching an output port of the optical path by the route exchange unit of the communication apparatuses in a section through which the optical path passes;

a bandwidth change step of changing a passband of the route exchange unit based on the control information; and an optical path receiving step of receiving the optical path of the selected modulation format and of the bit rate B (bit/s) in the receiving unit of the communication apparatus in an end point of the optical path.

The modulation format selection step may include:

selecting a combination of a modulation level M and a symbol rate SR that satisfies B=M×SR by using a modulation format corresponding to M multi-level modulation of optical phase, optical strength or both of the optical phase and the optical strength with a symbol rate SR (bit/s) in a single carrier.

The modulation format selection step may include:

selecting the combination of the modulation level M and the symbol rate SR that satisfies B=M×SR×2 by further using polarized wave multiplexing.

The modulation format selection step may include:

selecting a combination of the number N of subcarriers and a modulation level M that satisfies B=N×M×SR by using a modulation format corresponding to M multi-level modulation of optical phase, optical strength or both of the optical phase and the optical strength with an orthogonal frequency division multiplexing signal of N subcarriers and a symbol rate SR (bit/s) for each subcarrier.

The modulation format selection step may include:

selecting the combination of the number N of subcarriers and the modulation level M that satisfies B=N×M×SR×2 by further using polarized wave multiplexing.

The bandwidth variable communication apparatus of an embodiment of the present invention is a bandwidth variable communication apparatus that is placed on a route of a link connecting between client apparatuses of a start point and an end point and that includes a function for transmitting, receiving and route-exchanging for an optical signal, the bandwidth variable communication apparatus comprising:

a transmission unit configured to generate and transmit an optical path of a desired bit rate B (bit/s);

a receiving unit configured to receive an optical path of a desired bit rate B (bit/s);

a control unit configured to receive a control signal from an external management apparatus to control the transmission unit, the receiving unit and the route exchange unit; and a route exchange unit including a route exchange function configured to switch an output port of one or more optical paths entering from an input port based on the control signal from the control unit and a bandwidth change function configured to change a frequency bandwidth by which an optical path can pass through a section from the output port to the output port, the control unit including:

a control transmit receive function configured to transmit and receive, with the external management apparatus, modulation format control information of the transmission unit and the receiving unit and control information of the route exchange function and the bandwidth change function of the route exchange unit, and a control function configured to control the transmission unit, the receiving unit and the route exchange unit based on the control information, wherein the transmission unit generates and transmits an optical signal by changing the modulation format based on the control signal from the control unit, the receiving unit performs reception corresponding to a modulation format of an optical path transmitted from another optical communication apparatus, and the route exchange unit sets a frequency bandwidth in a section through which the optical path passes in accordance with the bandwidth of the path.

The transmission unit may:

perform M multi-level modulation of optical phase, optical strength or both of the optical phase and the optical strength with a symbol rate SR (bit/s) using a single carrier, and generate an optical signal by selecting a combination of a modulation level M and a symbol rate SR that satisfies B=M×SR in which transmission is available and the spectrum bandwidth is narrow according to the optical signal quality deterioration amount in the optical path route.

The transmission unit may:

further use polarized wave multiplexing, and generate the optical signal by selecting the combination of the modulation level M and the symbol rate SR that satisfies B=M×SR×2 in which transmission is available and the spectrum bandwidth is narrow.

The transmission unit may:

perform M multi-level modulation of optical phase, optical strength or both of the optical phase and the optical strength with a symbol rate SR (bit/s) for each subcarrier by using orthogonal frequency division multiplexing of N subcarriers in which frequency bands partially overlap, and generate an optical signal by selecting a combination of the number N of subcarriers and a modulation level M that satisfies B=N×M×SR in which transmission is available and the spectrum bandwidth is narrow according to the optical signal quality deterioration amount in the path route.

The transmission unit may:

further use polarized wave multiplexing, and generate the optical signal by selecting the combination of the number N of subcarriers and the modulation level M that satisfies B=N×M×SR×2 in which transmission is available and the spectrum bandwidth is narrow.

In order to achieve the second object, according to an embodiment of the present invention, there are provided a transmission bandwidth determination apparatus and a transmission bandwidth determination method using transmission bandwidth determination apparatuses for performing communication by selecting a pass bandwidth (filter width) and a modulation format in which transmission is available and the spectrum bandwidth is the narrowest, for example, according to an optical signal quality deterioration in the optical path route.

The transmission bandwidth determination apparatus of an embodiment of the present invention is a transmission bandwidth determination apparatus including a function configured to transmit a control instruction to an optical transmission apparatus, a node apparatus and an optical receiving apparatus and to set a designated route, in an optical communication network formed by connecting, via transmission routes, the optical transmission apparatus having a function for changing a modulation scheme for transmitting an optical signal, the node apparatus having a function for changing a pass bandwidth of an optical signal, and an optical receiving apparatus that can receive signals of various modulation schemes, the transmission bandwidth determination apparatus comprising:

a transmission information database configured to store corresponding relationship between transmission specification of a communication path for route setting, a pass bandwidth to be assigned to the node apparatus on the communication path and a modulation scheme to be set to the optical transmission apparatus;

a pass bandwidth and modulation scheme determination unit configured to determine a pass bandwidth to be assigned and a modulation scheme according to the transmission specification of an optical communication path to be set by referring to the transmission information database; and a control unit configured to receive information of the pass bandwidth and the modulation scheme set by the pass bandwidth and modulation scheme determination unit, and to perform setting of the optical communication path according to the information.

By using the transmission bandwidth determination apparatus, frequency use in the communication network becomes efficient by adaptively changing the modulation scheme of the optical transmission apparatus according to transmission specification so that frequency amount used in the communication network can be reduced.

The pass bandwidth and modulation scheme determination unit may change a modulation level, a bit rate, or the number of subcarriers in the change of the modulation scheme of the optical transmission apparatus.

According to this configuration, frequency use in the communication network becomes efficient by adaptively changing the modulation level or spectrum bandwidth of the optical transmitter and the filter width used in the node apparatus according to transmission specification so that frequency amount used in the communication network can be reduced.

The pass bandwidth and modulation scheme determination unit may include:

a unit configured to determine the pass bandwidth of the node apparatus, and a modulation level, a bit rate, or the number of subcarriers of the optical transmission apparatus such that a use communication bandwidth becomes the smallest by comparing cases of applying different modulation schemes, or by comparing cases of applying different pass bandwidth with the same modulation scheme, or for both of the cases.

According to this configuration, frequency use in the communication network becomes efficient by adaptively changing the modulation level or spectrum bandwidth of the optical transmitter and the filter width used in the node apparatus according to transmission specification so that frequency amount used in the communication network can be reduced.

The transmission bandwidth determination method of an embodiment of the present invention is a transmission bandwidth determination method in a transmission bandwidth determination apparatus including a function configured to transmit a control instruction to an optical transmission apparatus, a node apparatus and an optical receiving apparatus and to set a designated route, in an optical communication network formed by connecting, via transmission routes, the optical transmission apparatus having a function for changing a modulation scheme for transmitting an optical signal, the node apparatus having a function for changing a pass bandwidth of an optical signal, and an optical receiving apparatus that can receive signals of various modulation schemes, the transmission bandwidth determination apparatus comprising:

a pass bandwidth and modulation scheme determination step in which a pass bandwidth and modulation scheme determination unit determines a pass bandwidth to be assigned and a modulation scheme by referring to a transmission information database configured to store corresponding relationship between transmission specification of a communication path for route setting, a pass bandwidth to be assigned to the node apparatus on the communication path and a modulation scheme to be set to the optical transmission apparatus;

a control step in which a control unit receives information of the pass bandwidth and the modulation scheme set by the pass bandwidth and modulation scheme determination step, and performs setting of the optical communication path according to the information.

By using the transmission bandwidth determination method, frequency use in the communication network becomes efficient by adaptively changing the modulation scheme of the optical transmission apparatus according to transmission specification so that frequency amount used in the communication network can be reduced.

The pass bandwidth and modulation scheme determination step may include:

changing a modulation level, a bit rate, or the number of subcarriers in the change of the modulation scheme of the optical transmission apparatus.

According to this configuration, frequency use in the communication network becomes efficient by adaptively changing the modulation level or spectrum bandwidth of the optical transmitter and the filter width used in the node apparatus according to transmission specification so that frequency amount used in the communication network can be reduced.

The pass bandwidth and modulation scheme determination step may include:

determining the pass bandwidth of the node apparatus, and a modulation level, a bit rate, or the number of subcarriers of the optical transmission apparatus such that a use communication bandwidth becomes the smallest by comparing cases of applying different modulation schemes, or by comparing cases of applying different pass bandwidth with the same modulation scheme, or for both of the cases.

According to this configuration, frequency use in the communication network becomes efficient by adaptively changing the modulation level or spectrum bandwidth of the optical transmitter and the filter width used in the node apparatus according to transmission specification so that frequency amount used in the communication network can be reduced.

In order to achieve the third object, according to an embodiment of the present invention, a node apparatus, there are provided a communication path setting system, and a communication path setting method for adaptively changing the optical frequency band in passing nodes according to transmission specification (bit rate, distance) of the optical communication path to be set.

The node apparatus according to an embodiment of the present invention is a node apparatus in a communication network, comprising:

a bandwidth variable transmission unit configured to transmit an optical signal of an arbitrary frequency band;

a bandwidth variable receiving unit configured to receive an optical signal of an arbitrary frequency band;

a bandwidth variable route exchange unit configured to perform route exchange for an optical signal of an arbitrary frequency band between arbitrary input-output routes; and a control function unit configured to set a signal of an arbitrary frequency bandwidth in arbitrary input-output routes by exchanging a control signal with the bandwidth variable transmission unit, the bandwidth variable receiving unit and the bandwidth variable route exchange unit, wherein the control signal designates the frequency bandwidth of the optical signal on which route exchange is performed by using a start point value and an end point value of an optical frequency or by using a center frequency and a bandwidth.

Accordingly, it becomes possible to assign minimum bandwidth to a communication path according to circumstances, so that necessary amount of bandwidth used in the communication network can be reduced. In addition, it becomes possible to accommodate the communication path set by the minimum bandwidth without gap between bands of communication paths, so that frequency use efficiency can be increased.

The node apparatus may includes:

a connection part to be connected to a client apparatus on the communication network;

an output route exchange unit configured to exchange an output route to a node of a next stage; and a switch unit between the connection part and the output route exchange unit, wherein the client apparatus connects to an arbitrary output route with an arbitrary frequency.

Accordingly, frequency collision at the connection part with the client apparatus can be avoided, so that frequency use efficiency can be improved. In addition, it becomes possible that the client apparatus connects to an arbitrary output route, so that the connection route (UNI route) to the client apparatus can be shared by plural output route. Thus, the number of route to UNI or the number of ports can be decreased.

The node apparatus may include a unit configured to receive a signal quality that is measured by changing an oscillation optical frequency of an optical transmitter within a range predetermined in a receiver on the communication network, determine an oscillation optical frequency bandwidth based on the reception result, and output an optical signal input in an input part to an output part with an optical frequency band of the oscillation optical frequency bandwidth.

Accordingly, it becomes possible to perform communication with the optimum communication band in accordance with errors of devices actually used in the communication path, so that signal quality can be improved.

In the node apparatus, when the communication network includes a function for setting a standby communication path for an active communication path and performing switching from the active communication path to the standby communication path being triggered by a trigger signal or route change of a communication path, the node comprises a unit configured to change an optical frequency bandwidth to be set to the communication path, or the node apparatus comprises a unit configured to reduce the number of transmission lanes for an active communication path of a short route for communication and to increase the number of transmission lanes only when the active communication path is switched to a standby communication path of a long route.

Accordingly, it is unnecessary to set redundant band to an active communication path based on a request of a standby communication path, so that signal quality can be improved.

The node apparatus may include a unit configured to change an optical frequency transmitted by the optical transmitter when the communication network switches the active communication path to the standby communication path.

Accordingly, when the bandwidth of the communication path increases with switching to a standby communication path so that the center frequency of use band is changed, signal quality in the switched standby communication path can be improved by changing transmission frequency of the transmitter in conformity with the change.

In the node apparatus, when the communication network includes a function for setting a standby communication path for an active communication path and performing switching from the active communication path to the standby communication path being triggered by a trigger signal or route change of a communication path, the node comprises:

a unit configured to change a modulation scheme of an optical signal to be transmitted when the node apparatus becomes the transmitter, and a unit configured to change a modulation scheme for receiving when the node apparatus becomes the receiver.

Accordingly, a modulation scheme of a narrow spectrum bandwidth is used for an active communication path of a short route, and a modulation scheme of a wide spectrum bandwidth is used only when being switched to a standby communicant path of a long route, so that the frequency band used when performing communication with the active communication path can be decreased.

The node apparatus may include a unit configured to change the number of lanes for transmission when the node apparatus becomes the optical transmitter in the case when the communication network sets a standby communication path for an active communication path and switches from the active communication path to the standby communication path being triggered by a trigger signal or changes a route of a communication path; and a unit configured to change the number of lanes for reception when the node apparatus becomes the optical receiver in the case when the communication network sets a standby communication path for an active communication path and switches from the active communication path to the standby communication path being triggered by a trigger signal or changes a route of a communication path.

Accordingly, communication is performed by decreasing the number of transmission lanes for an active communication path of a short route, and the number of transmission lanes is increased only when being switched to a standby communicant path of a long route, so that the frequency bandwidth used when performing communication with the active communication path can be decreased.

The communication path setting system of an embodiment of the present invention is a communication path setting system in a communication network that connects, via optical transmission routes, a node apparatus that can output an input optical signal to an arbitrary output unit by parallel transmission and that includes a function for changing the number of lanes in the parallel transmission, an optical transmitter that can perform parallel transmission of an optical signal and that can change the number of lanes, and an optical receiver that can receive an optical signal received in parallel transmission with an arbitrary number of lanes, the communication path setting system comprising:

a control function unit configured to transmit a control instruction to the node apparatus;

a database configured to store correspondence information between transmission specification required when setting a communication path and the number of transmission lanes;

a transmission lane number determination function unit configured to determine the number of lanes corresponding to a required transmission specification; and a control apparatus including a unit configured to transmit a communication path setting instruction to the node apparatus with the lane number determined by the transmission lane number determination function unit, and to set a communication path, the optical transmitter comprising:

a unit configured to change the number of lanes for transmission in the case when the communication network sets a standby communication path for an active communication path and switches from the active communication path to the standby communication path being triggered by a trigger signal or performs route change of a communication path, and the optical receiver comprising:

a unit configured to change the number of lanes for reception in the case when the communication network sets a standby communication path for an active communication path and switches from the active communication path to the standby communication path being triggered by a trigger signal or performs route change of a communication path.

Accordingly, communication is performed by decreasing the number of transmission lanes for an active communication path of a short route, and the number of transmission lanes is increased for a communicant path of a long route, so that the frequency bandwidth used in the communication network can be decreased.

The communication path setting method of an embodiment of the present invention is a communication path setting method in a node apparatus in a communication network, wherein a control function unit of the node apparatus:

sets a signal of an arbitrary frequency band in arbitrary input-output routes by performing control of exchanging a control signal among a bandwidth variable transmission unit configured to transmit an optical signal of an arbitrary frequency band, a bandwidth variable receiving unit configured to receive an optical signal of an arbitrary frequency band, and a bandwidth variable route exchange unit configured to perform route exchange for an optical signal of an arbitrary frequency band between arbitrary input-output routes, wherein the control signal designates the frequency band of the optical signal on which route exchange is performed by using a start point value and an end point value of an optical frequency or by using a center frequency and a bandwidth.

Accordingly, it becomes possible to assign minimum bandwidth to a communication path according to circumstances, so that necessary amount of bandwidth used in the communication network can be reduced. In addition, it becomes possible to accommodate the communication path set by the minimum bandwidth without gap between bands of communication paths, so that frequency use efficiency can be increased.

Effect of the Present Invention

According to the present invention corresponding to the first object an optical path is transferred by selecting a combination of a modulation level and a symbol rate by which transmission is available and spectrum bandwidth is narrow according to optical signal quality deterioration in an optical path route, so that use efficiency of the optical frequency bandwidth can be improved without changing bit rate of the optical path in the optical path network.

According to the present invention corresponding to the second object, a filter width and a modulation scheme are selected such that the use spectrum bandwidth becomes the smallest according to transmission specification of the optical communication path, so that it can be avoided to consume in setting of an optical communication route and use efficiency of frequency resources can be improved.

According to the present invention corresponding to the third object, an optical communication path in which transmission is available and the optical frequency bandwidth is narrow can be set according to optical signal quality deterioration in the optical communication path route, so that the optical frequency bandwidth can be used effectively.

BRIEF DESCRIPTION OF THE DRAWINGS

FIG. 5 shows an example of a conventional optical communication path network;

FIG. 14 is a flowchart of processes of the bandwidth variable communication apparatus in the embodiment 1-1;

FIG. 20B is a diagram showing a spectrum bandwidth occupied by an optical path in a technique of the present invention;

FIG. 21 is a diagram showing a calculation result of required spectrum bandwidth in the case where full-mesh optical paths are placed in the ring type network of 12 nodes;

FIG. 33A is a diagram showing frequency management in the conventional method;

FIG. 39 is a diagram showing an example of a transmission specification information table;

EMBODIMENTS FOR CARRYING OUT THE INVENTION

In the following, embodiments of the present invention are described with reference to figures.

First Embodiment

In the following, the first embodiment is described. The first embodiment is an embodiment of the invention corresponding to the first object.

(Outline)

First, outline of the present embodiment is described with reference to FIGS. 7 and 8. The bandwidth variable communication method is a bandwidth variable communication method in an optical path network, in which communication apparatuses are connected by optical transmission, that includes a network management apparatus having a function for setting and managing an optical path.

Figure 7:
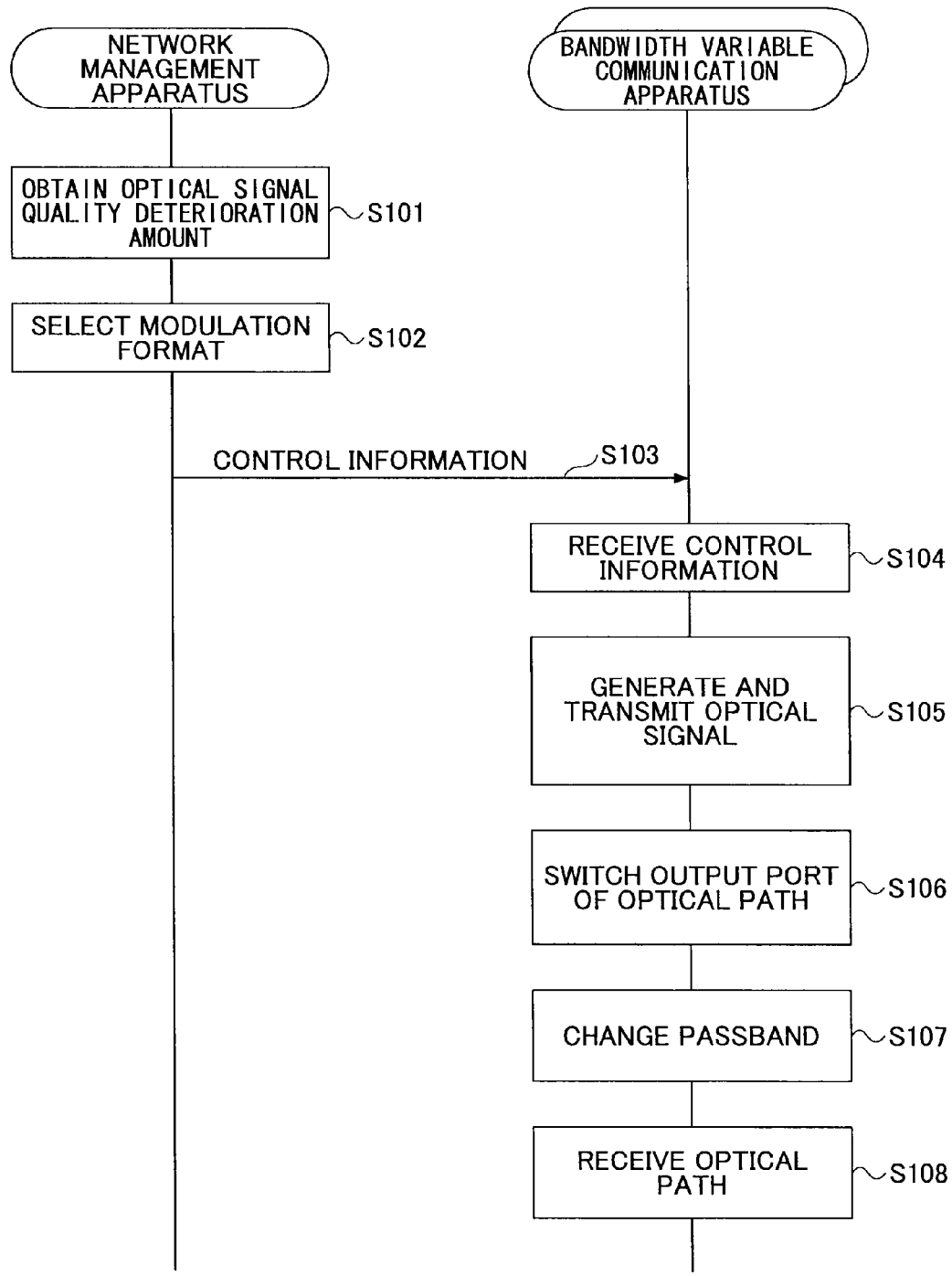
FIG. 7 is a diagram for explaining an outline of a first embodiment of the present invention.

As shown in FIG. 7, the bandwidth variable communication method includes step 101 and step 102 being performed by the network management apparatus, or by the network management apparatus and the communication apparatus when the network management apparatus sets or changes an optical path that passes through plural communication apparatuses. That is, the bandwidth variable communication method includes:

an optical signal quality deterioration amount obtaining step (step 101) of obtaining an optical signal quality deterioration amount in a route of the optical path; and a modulation format selection step (step 102) of selecting a modulation format in which a spectrum bandwidth is the narrowest from among modulation formats by which transmission is available on conditions of the optical signal quality deterioration amount and a desired bit rate B (bit/s). In addition, the bandwidth variable communication method includes:

a control message exchange step (step 103) of exchanging control information for controlling a transmission unit, a receiving unit and a route exchange unit in the communication apparatus based on a selection result in the modulation format selection step, the control information being exchanged between the network management apparatus and a control unit of each communication apparatus on the optical path route;

an optical signal transmission step (steps 104, 105) of generating and transmitting the optical signal of the selected modulation format and of the bit rate B (bit/s) based on the control information received by the control unit in the control message exchange step (step 103), the optical signal transmission step being performed by the transmission unit of a communication apparatus of a start point of the optical path;

a route exchange step (step 106) of switching an output port of the optical path by the route exchange unit of the communication apparatuses in a section through which the optical path passes;

a bandwidth change step (step 107) of changing a passband of the route exchange unit based on the control information; and an optical path receiving step (step 108) of receiving the optical path of the selected modulation format and of the bit rate B (bit/s) in the receiving unit of the communication apparatus in an end point of the optical path.

Figure 8:
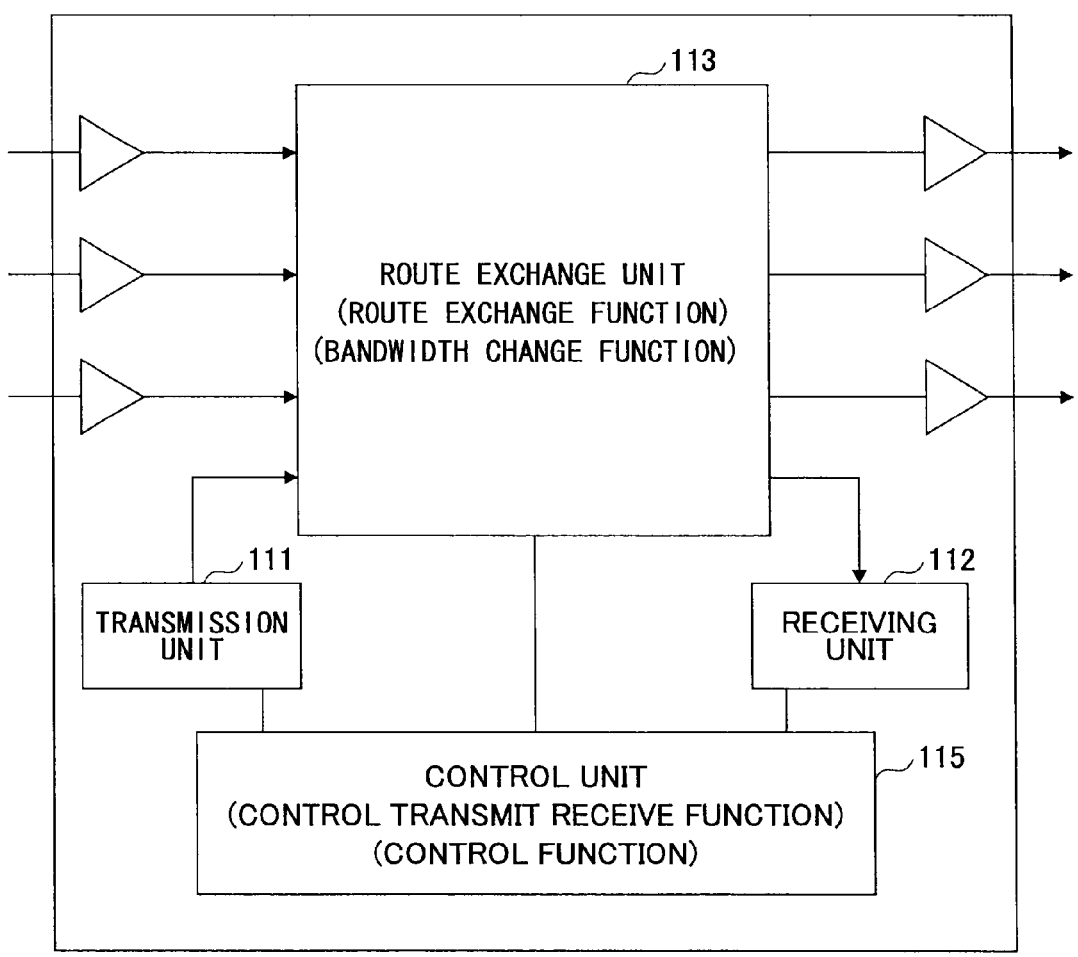
FIG. 8 is a diagram for explaining an outline of the first embodiment of the present invention.

FIG. 8 is a schematic block diagram of a communication apparatus in the present embodiment. This communication apparatus is a communication apparatus that is placed on a route of a link connecting between client apparatuses of a start point and an end point and that includes a function for transmitting, receiving and route-exchanging for an optical signal. As shown in FIG. 8, the communication apparatus includes:

a transmission unit 111 configured to generate and transmit an optical path of a desired bit rate B (bit/s);

a receiving unit 112 configured to receive an optical path of a desired bit rate B (bit/s);

a control unit 115 configured to receive a control signal from an external management apparatus to control the transmission unit 111, the receiving unit 112 and the route exchange unit 113; and a route exchange unit 113 including a route exchange function configured to switch an output port of one or more optical paths entering from an input port based on the control signal from the control unit 115 and a bandwidth change function configured to change a frequency bandwidth by which an optical path can pass through a section from the output port to the output port.

The control unit 115 includes:

a control transmit receive function configured to transmit and receive, with the external management apparatus, modulation format control information of the transmission unit and the receiving unit and control information of the route exchange function and the bandwidth change function of the route exchange unit, and a control function configured to control the transmission unit, the receiving unit and the route exchange unit based on the control information.

The transmission unit 115 generates and transmits an optical signal by changing the modulation format based on the control signal from the control unit 115, the receiving unit 112 performs reception corresponding to a modulation format of an optical path transmitted from another optical communication apparatus, and the route exchange unit 113 sets a frequency bandwidth in a section through which the optical path passes in accordance with the bandwidth of the path.

In the following, a first embodiment of the present invention is described with reference to figures in more detail by dividing the embodiment into an embodiment 1-1 and an embodiment 1-2.

Embodiment 1-1

Figure 9:
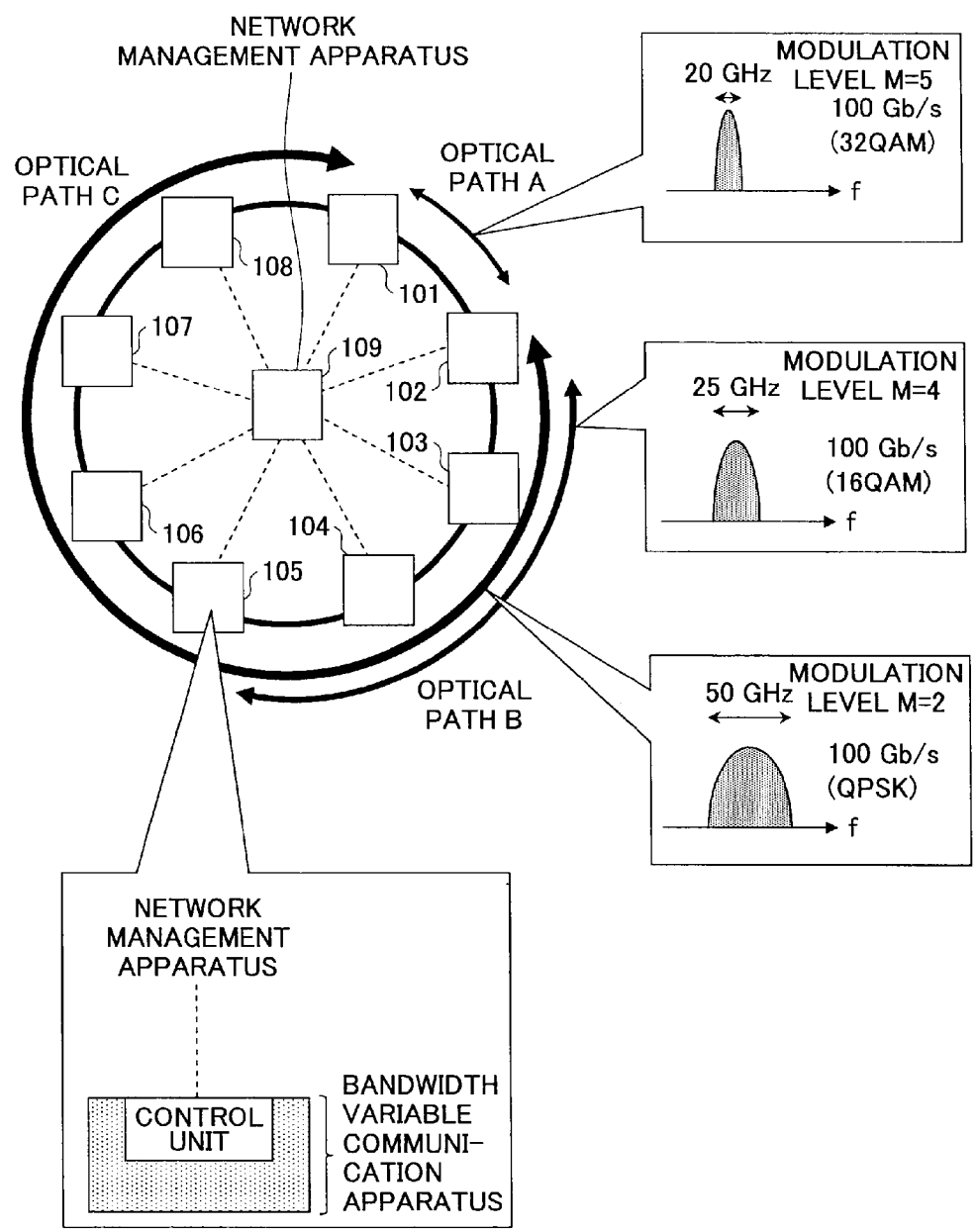
FIG. 9 is a configuration diagram of a bandwidth variable communication system in an embodiment 1-1.

FIG. 9 is an example of a configuration of a bandwidth variable communication system in an embodiment 1-1.

In the figure, bandwidth variable communication apparatuses 101-108 are placed like a circle, and the center one is a network management apparatus 109.

Figure 10:
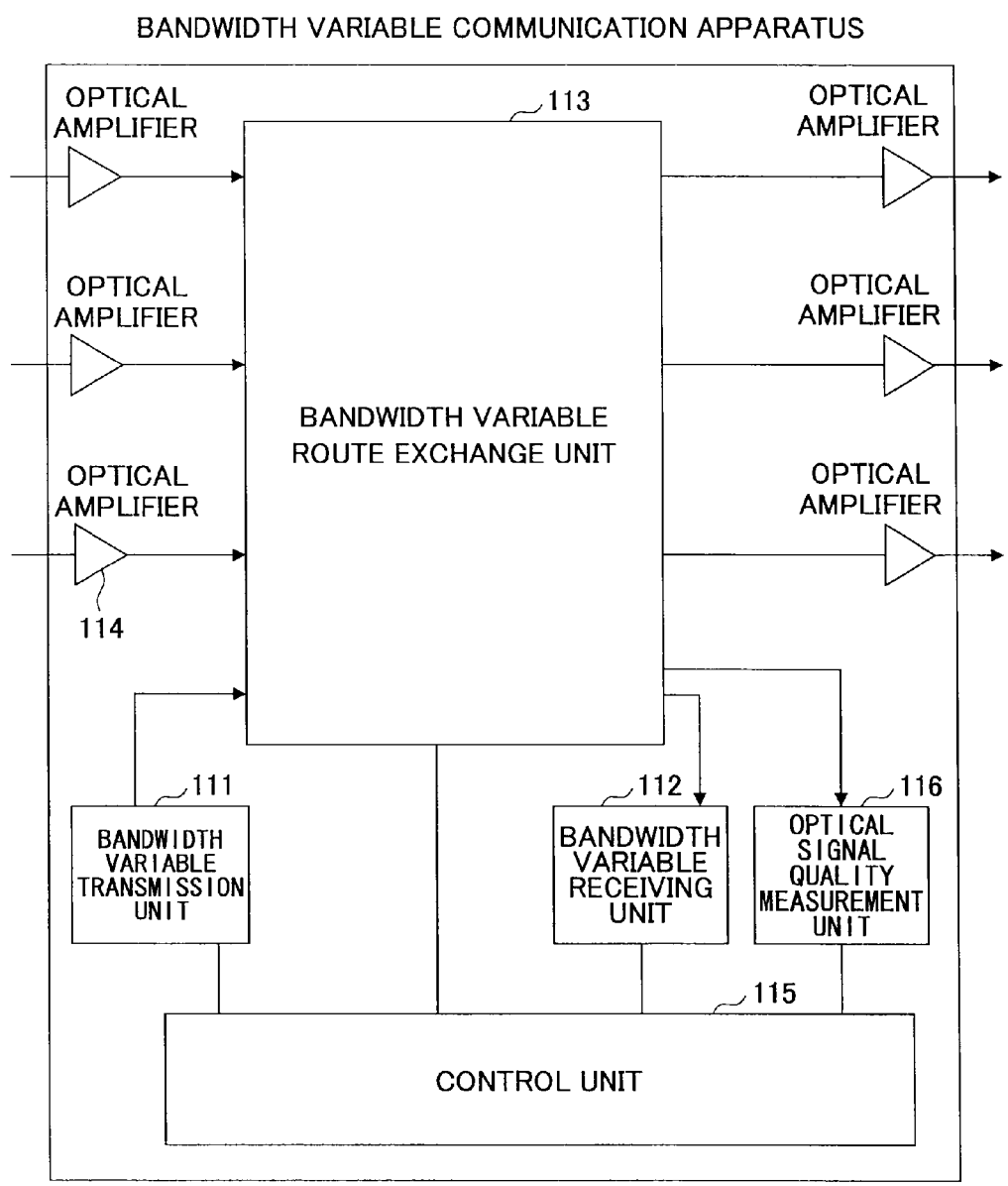
FIG. 10 shows an configuration example of a bandwidth variable communication apparatus in the embodiment 1-1.

As shown in FIG. 10, each of the bandwidth variable apparatuses 101-108 includes a bandwidth variable transmission unit 111, a bandwidth variable receiving unit 112, a bandwidth variable route exchange unit 113, an optical amplifier 114, a control unit 115, and an optical signal quality measurement unit 116. If the optical amplifier 114 and the optical signal quality measurement unit 116 are unnecessary, they may not be provided.

The transmission unit 111 generates an optical path of a desired bit rate of B (bit/s) and transmits the optical path.

The receiving unit 112 receives the optical path of the desired bit rate of B (bit/s).

The route exchange unit 113 includes a route exchange function configured to switch output ports of one or more optical signals entering from an input port based on a control signal from the control unit 115, and a bandwidth change function configured to change a passable frequency bandwidth in a section from an input port to an output port through which the optical path passes.

The control unit 115 receives a control signal from the network management apparatus 109 and controls the transmission unit 111, the receiving unit 112, and the route exchange unit 113. In more detail, the control unit 115 transmits and receives modulation format control information of the transmission unit 111 and the receiving unit 112, and control information of the route exchange function and the bandwidth change function of the route exchange unit 113, then, the control unit 115 controls the transmission unit 111, the receiving unit 112 and the route exchange unit 113 based on the control information.

The optical signal quality measurement unit 116 has a function for measuring optical signal quality such as OSNR and Q value of an optical path.

As shown in FIG. 9, in the bandwidth variable communication system of the present embodiment, bandwidth variable communication apparatuses are connected by optical transmission routes, and the network management apparatus 109 is provided for controlling and managing the bandwidth variable communication apparatuses.

Figure 11:
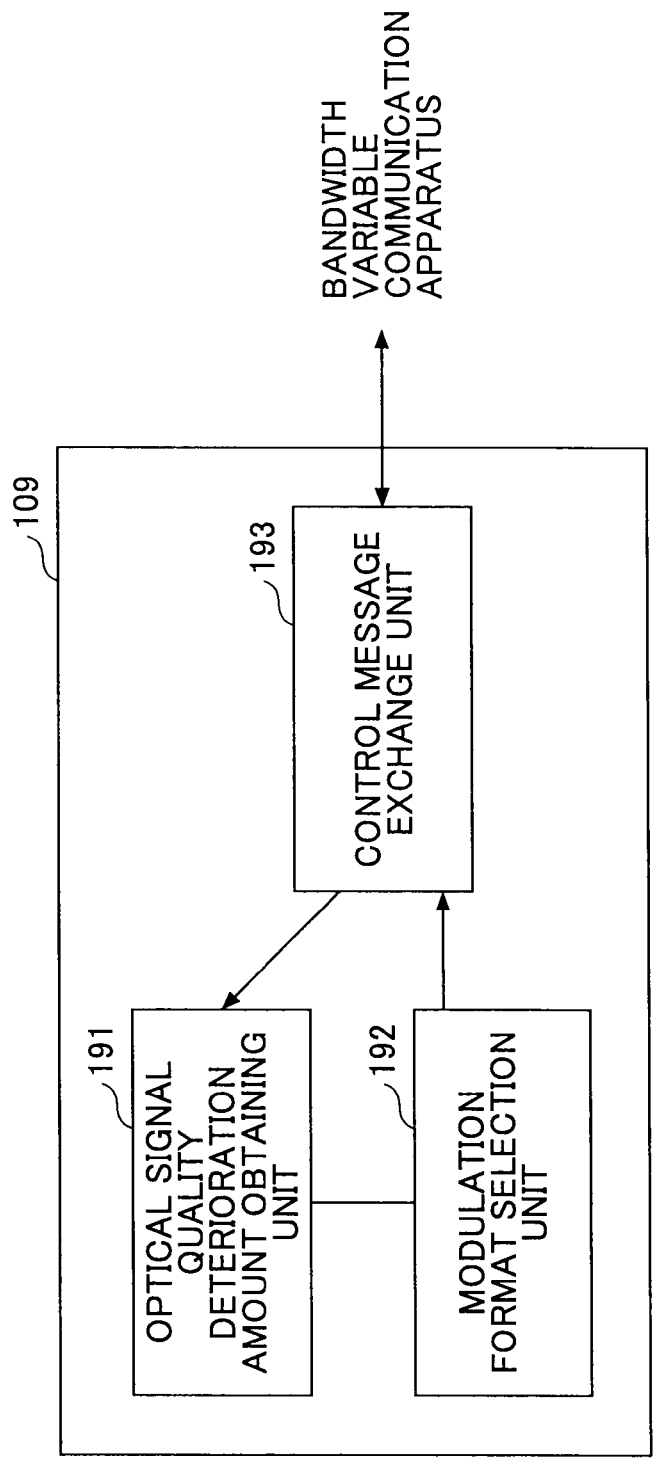
FIG. 11 is a block diagram of a network management apparatus in the embodiment 1-1.

FIG. 11 shows a configuration of the network management apparatus 109 in the embodiment 1-1.

The network management apparatus 109 shown in the figure includes an optical signal quality deterioration amount obtaining unit 191, a modulation format selection unit 192 and a control message exchange unit 193.

The optical signal quality deterioration amount obtaining unit 191 calculates an optical signal deterioration amount from a loss, dispersion characteristics, and a non-linear optical effect of a transmission route in an optical path route, and a loss and filtering characteristics of a node. Or, the optical signal quality deterioration amount obtaining unit 191 receives, via the control message conversion unit 193, optical signal quality measured by the optical signal quality measurement unit 26 of bandwidth variable communication apparatuses of a start point and an end point of the optical path, and obtains the optical signal quality deterioration amount from the two optical signal qualities. For example, in a case where an optical signal quality in the bandwidth variable communication apparatus of the start point is 30 dB as a Q value, and an optical signal quality in the bandwidth variable communication apparatus of the end point is 10 dB as a Q value, the optical signal quality deterioration amount becomes 20 dB of the difference of the two Q values.

The modulation format selection unit 192 selects a modulation format of the narrowest spectrum bandwidth from among modulation formats by which transmission is available in a condition of the optical signal quality deterioration in a route of the optical path obtained from the optical signal quality deterioration amount obtaining unit 191 and a desired bit rate B (bit/s). The control message exchange unit 193 exchanges, with the control unit 115 of the bandwidth variable communication apparatuses 101-108, control information for controlling the transmission unit 111, the receiving unit 112 and the route exchange unit 113. Also, when using the optical signal qualities measured by the bandwidth variable communication apparatuses of the start point and the end point, the control message exchange unit 193 receives information of the optical signal qualities from control units 115 of the bandwidth variable communication apparatuses of the start point and the end point.

Figure 12:
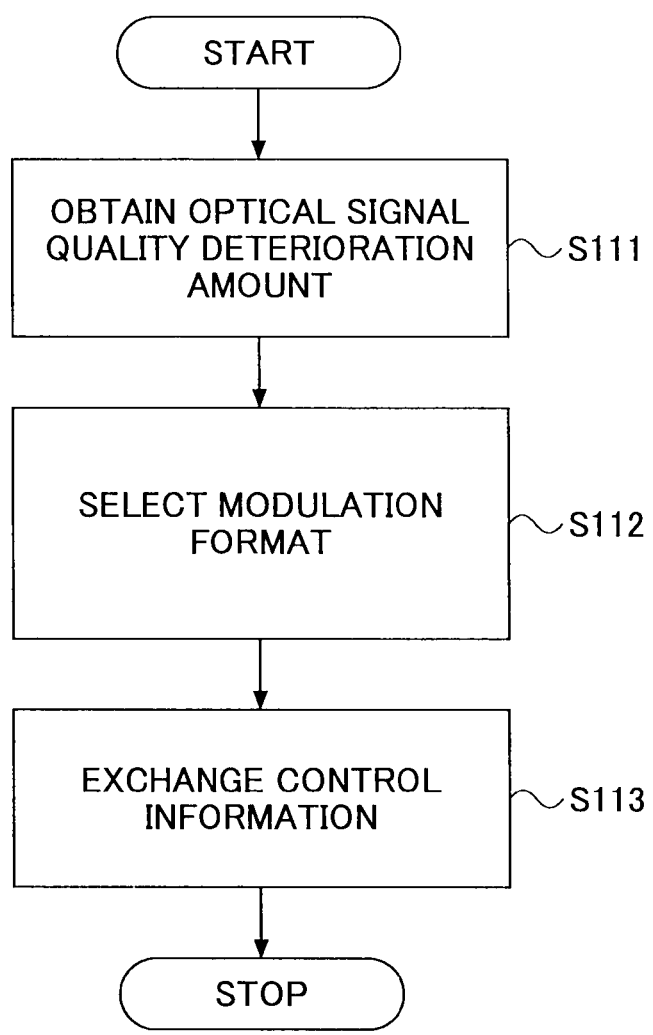
FIG. 12 shows a flowchart of processes of the network management apparatus in the embodiment 1-1.

FIG. 12 is a flowchart of processes of the network management apparatus 109 in the embodiment 1-1.

Step 111) When setting or changing an optical path, the optical signal quality deterioration amount obtaining unit 191 of the network management apparatus 109 calculates an optical signal quality deterioration amount in a route of the optical path. The optical signal quality deterioration amount is, for example, deterioration of OSNR (Optical Signal-to-Noise Ratio) due to noise load such as ASE from the optical amplifier 114, OSNR deterioration due to transmission route loss and node loss, waveform deterioration due to wavelength dispersion and polarization wave mode dispersion of the transmission route and the communication apparatus, and waveform deterioration due to filtering of the optical switch and the filter in the communication apparatus and the like, and the optical signal quality deterioration amount is determined as a parameter such as Q value and OSNR penalty. Also, in the case where the number of multiplexed wavelengths in each transmission route is known, the optical signal quality deterioration amount may be determined in consideration of signal quality deterioration due to non-linear optical effect such as four-wave mixing, self phase modulation, cross-phase modulation and the like in the transmission route and the optical amplifier 114. In the case when the number of multiplexed wavelengths in each transmission route is unknown, the optical signal quality deterioration amount may be determined in consideration of the worst signal quality deterioration due to non-linear optical effect for the maximum number of multiplexed wavelengths. Also, the optical signal quality deterioration amount can be obtained from information from the network management apparatus 109 and a measurement value in the bandwidth variable communication apparatus. For example, in the case when using optical signal qualities measured in bandwidth variable communication apparatuses of the start point and the end point, the optical signal quality deterioration amount obtaining unit 191 may receive information of the optical signal qualities via the control message exchange unit 193 and obtain the optical signal quality deterioration amount from the two optical signal qualities.

Step 112) Next, the modulation format selection unit 192 selects a modulation format in which spectrum bandwidth is the narrowest, for the optical signal quality deterioration amount, by which transmission is available using the desired bit rate of B (bit/s) in the optical path route. The condition that transmission is available indicates that, for example, the bit error ratio of a received signal is equal to or less than $10^{-12}$.

At this time, a modulation format is used for performing multi-level modulation of M (modulation level) of optical phase or optical strength or both of them with a symbol rate SR (bit/s) in a single carrier, and a combination of the number M of modulation level and the symbol rate SR is selected from among modulation levels in which $$B = M \times SR \quad (1)$$

is satisfied, transmission is available and the spectrum bandwidth is the narrowest according to the optical signal quality deterioration in the optical path route.

Figure 13A:
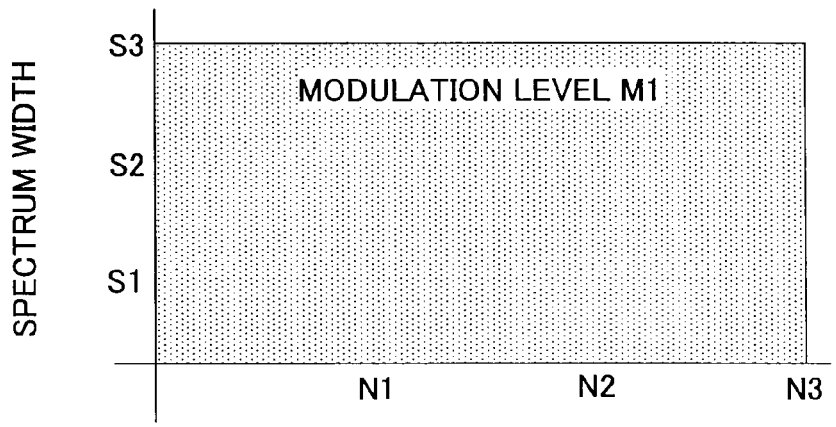
FIG. 13A is an example of relationship between the number of transfer nodes, transfer distance and spectrum width and shows a conventional method.
Figure 13B:
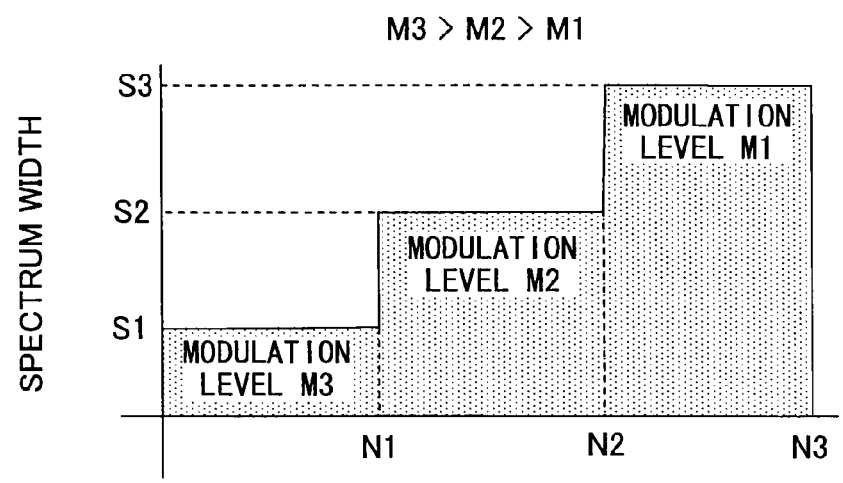
FIG. 13B is an example of relationship between the number of transfer nodes, transfer distance and spectrum width and shows a technique of the present invention.

As a result, relationship between the number of nodes or distance and spectrum bandwidth in which transmission is available is shown in FIGS. 13A and 13B. In a conventional technique, as shown in FIG. 13A, the spectrum width is determined for the maximum transfer node number or distance and is constant in all cases. On the other hand, in the case of the embodiment of the present invention, as shown in FIG. 13B, the number of modulation levels and the symbol rate are selected according to the transfer node number or distance. Thus, the shorter the distance is, the more the spectrum bandwidth can be reduced.

In the example of FIG. 9, the optical signal quality deterioration amount is large for an optical path, like the optical path C, in which the transmission distance is long and the number of passing nodes is large. Thus, the conversion format selection unit 192 of the network management apparatus 109 selects a modulation format (QPSK, M=2) of a high symbol rate (SR=50 Gb/s) and a low modulation level M in order to ensure high signal to noise ratio. Also, the optical signal quality deterioration amount is reduced for an optical path, like the optical path B, of mid-distance in which the number of passing nodes is reduced. Thus, the conversion format selection unit 192 selects a modulation format (16 QAM, M=4) in which the symbol rate is reduced (SR=25 Gb/s) and the modulation level is increased. The optical signal quality deterioration amount is further reduced for an optical path, like the optical path A, in which the transmission distance is further reduced and the number of passing nodes is further reduced. Thus, the conversion format selection unit 192 selects a modulation format (32 QAM, M=5) in which the symbol rate is further reduced (SR=12.5 Gb/s) and the modulation level is further increased. In all optical paths, the bit rate B is constant and is 100 Gb/s.

Step 113) Next, the control message exchange unit 193 of the network management apparatus 109 exchanges control information, with the control unit 115 of the bandwidth variable communication apparatuses 101-108 on the optical path route, for controlling the bandwidth variable transmission unit 111, the bandwidth variable receiving unit 112 and the bandwidth variable route exchange unit 113 based on the modulation format selected by the network management apparatus 109.

Next, operation is described for the bandwidth variable communication apparatuses 101-109 that receive the control information in step 113 from the network management apparatus 109.

FIG. 14 is a flowchart of processes of the bandwidth variable communication apparatus in the embodiment 1-1.

Step 121) The control unit 115 receives control information from the network management apparatus 109.

Step 122) The transmission unit 111 of the bandwidth variable communication apparatus of the optical path start point generates and transmits an optical path of the modulation format selected by the network management apparatus 109 and the bit rate B (bit/s) based on the control information received by the control unit 115. At this time, the transmission unit 111 generates the optical path by selecting a combination of the modulation level M and the symbol rate SR in which the above-mentioned (1) is satisfied, transmission is available and the spectrum bandwidth is narrow according to the optical signal quality deterioration on the optical path route.

Step 123) The route exchange unit 113 of the bandwidth variable communication apparatuses of a section through which the optical path passes switches an output port of the optical path based on the wavelength, and changes a passband based on the spectrum bandwidth of the optical path.

Step 124) The receiving unit 112 of the bandwidth variable communication apparatus of the optical path end point receives the optical path of the selected modulation format of the bit rate B (bit/s).

Figure 15:
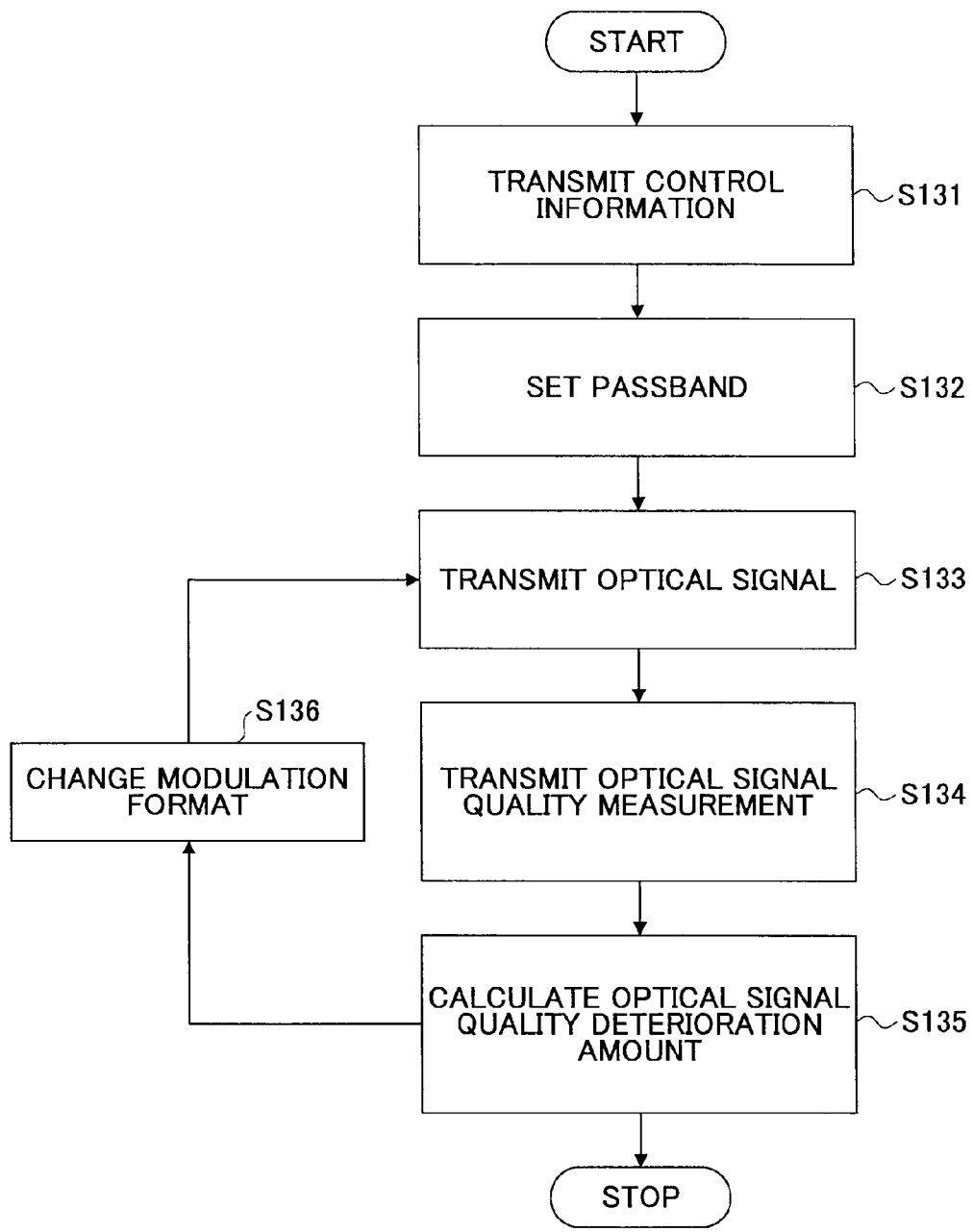
FIG. 15 is a flowchart of processes for obtaining an optical signal quality deterioration amount in the embodiment 1-1.

As described before, when setting or changing an optical path, the optical signal deterioration amount obtaining unit 191 of the network management apparatus 109 calculates the optical signal quality deterioration amount on the optical path route beforehand. In the following, a concrete example of the process for obtaining the optical signal quality deterioration amount is described with reference to a flowchart of FIG. 15.

Step 131) The network management apparatus 109 transmits control information of passband and modulation format to the bandwidth variable communication apparatus on the optical path route.

Step 132) Every bandwidth variable communication apparatus on the optical path route sets the passband based on the control information. The value of the passband can be selected from ITU-T grid (100 G Hz, 50 GHz, 25 GHz, 12.5 GHz), for example. In general, when the bit rate is 100 Gb/s, a passband of 100 G Hz or 50 GHz is selected. When the bit rate is 40 Gb/s, a passband of 50 GHz or 25 GHz is selected. When the bit rate is 10 Gb/s, a passband of 25 GHz or 12.5 GHz is selected. However, other values may be selected for the above-mentioned cases.

Step 133) The bandwidth variable transmission unit 111 of the bandwidth variable communication apparatus of the start point transmits an optical signal of a predetermined bit rate based on control information. At this time, the modulation format is selected from among modulation formats by which transmission is available by the bandwidth variable transmission unit 111.

Step 134) The optical signal quality measurement unit 116 of the bandwidth variable communication apparatus of the start point measures optical signal quality (OSQs) based on the control information, and transmits the optical signal quality to the network management apparatus 109. Next, the optical signal quality measurement unit 116 of the bandwidth variable communication apparatus of the end point measures optical signal quality (OSQs) based on the control information, and transmits the optical signal quality to the network management apparatus 109. As a parameter of the optical signal quality, a Q factor or an optical SNR can be used. The Q factor can be obtained from a bit error rate obtained by converting an optical signal to an electrical signal and performing digital signal processing. The optical SNR can be obtained as a ratio between an optical signal component and a noise component of optical spectrum using an optical spectrum analyzer and the like. Or, the transmission unit 111 superimposes a tone signal onto an optical signal, and the optical signal quality measurement unit 116 extracts a tone signal component after optical-electrical conversion, so that the size of the tone signal component or a ratio between the tone signal component and the optical signal component can be used as the parameter of the optical signal quality.

Step 135) The network management apparatus 109 calculates an optical signal quality deterioration amount ($\Delta OSQ$) using optical signal quality information (OSQs, OSQe) of the start point and the end point. For example, when using the Q factor, $\Delta OSQ$ is calculated as a ratio (OSQe/OSQs) between optical signal qualities of the end point and the start point (if the Q factor is represented using decibel, the ratio is OSQe-OSQs (dB)). Similarly, when using the optical SNR or the tone signal (or the ratio between the tone signal component and the optical signal component), the amount becomes OSQe/OSQs (if it is represented using decibel, the ratio is OSQe-OSQs (dB)).

Step 136) The network management apparatus 109 transmits a control signal to the bandwidth variable communication apparatus of the start point to change the modulation format. By repeating step 133)-step 135) for every modulation format in which the bandwidth variable transmission unit 111 can perform transmission, the optical signal quality deterioration amount for every modulation format can be obtained.

After that, the modulation format selection unit 192 selects a modulation format, using these optical signal quality deterioration amounts, in which transmission is available by the desired bit rate B (bit/s) on the optical path route and the spectrum bandwidth is the narrowest.

The characteristic feature of the present embodiment is that necessary spectrum width is reduced as a whole and the frequency use efficiency is improved by increasing the number of modulation level and decreasing the symbol rate for a short optical path to save spectrum width while maintaining the maximum optical path length and the transmission bit rate according to the optical path length. When the total spectrum bandwidth that is available in the optical path network is constant (for example, L band and the like), it becomes possible to accommodate more optical paths.

Although the modulation level is divided into three stages according to the transfer node number and the distance, the number of divisions may be other number. Also, as to the combination of modulation formats for modulation levels of QPSK, 16 QAM, 64 QAM and the like, combinations other than the above-mentioned combination may be applied.

Figure 16:
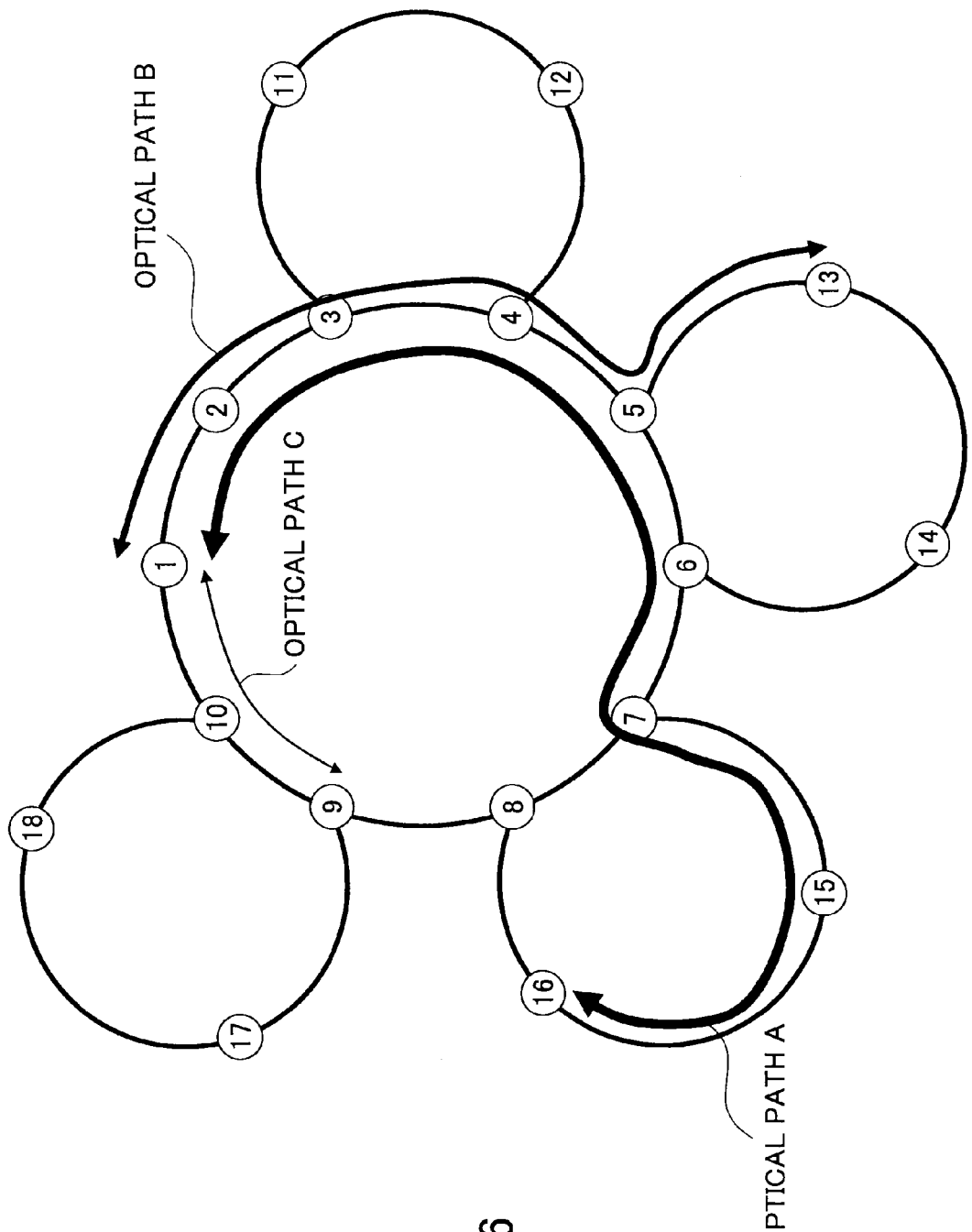
FIG. 16 is a configuration example of a multi-ring type network.
Figure 17:
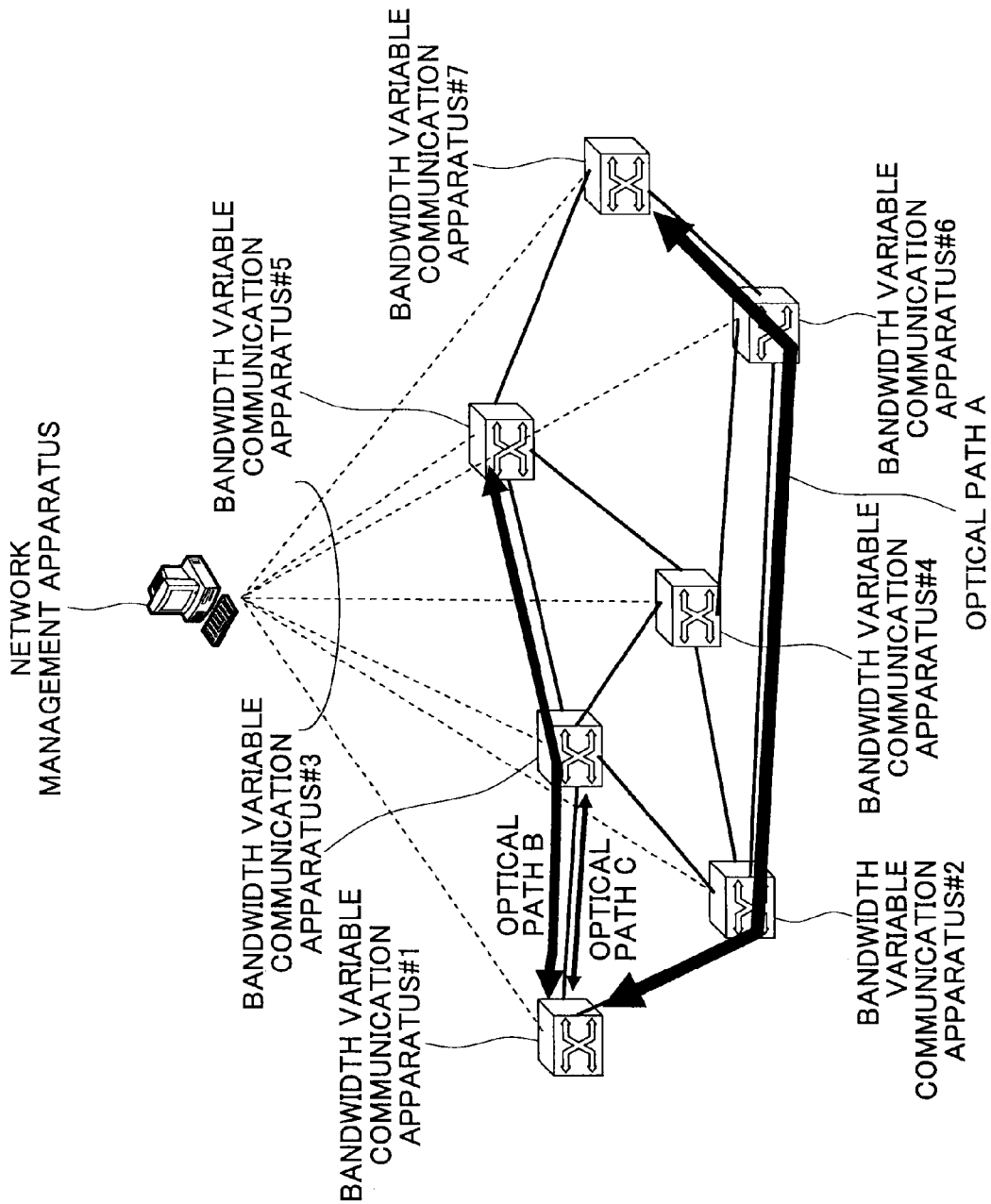
FIG. 17 is a configuration example of a mesh type network.

Although an example of a ring type network configuration is described, any transparent network configuration can be applied such as a multi-ring type of FIG. 16 and a mesh type of FIG. 17. FIG. 16 shows a multi-ring type network including nodes 1-16 (bandwidth variable communication apparatuses) in which optical paths A-C are set. FIG. 17 shows a mesh type network having bandwidth variable communication apparatuses #1-#7 in which optical paths A-C are set.

Also, in each of the transmission unit 111 and the receiving unit 112 of each of the bandwidth variable communication apparatuses 101-108, a polarized wave multiplexing function and a polarized wave demultiplexing function may be provided. In this case, the modulation format selection unit 192 of the network management apparatus 9 selects a combination of a modulation level M and a symbol rate SR in which $$B = M \times SR \times 2 \tag{2}$$

is satisfied, transmission is available and the spectrum bandwidth is narrow. Then, the combination is transmitted to the bandwidth variable communication apparatuses 101-108. By using the polarized wave multiplexing together, the frequency use efficiency of the limited frequency resources in the optical fiber can be doubled.

Although the degree of improvement of the frequency use efficiency depends on the applied network configuration and the combination of the modulation levels to be used, the upper limit of the degree of improvement becomes a ratio (Mmax/Mmin) between the maximum modulation level Mmax and the minimum modulation level Mmin. For example, as shown in FIG. 9, when using QPSK and 32 QAM, 2.5 times (Mmax/Mmin=5/2) can be expected at the maximum as improvement of the frequency use efficiency. When using 256 QAM and QPSK, 4 times (Mmax/Mmin=8/2) can be expected at the maximum as improvement of the frequency use efficiency.

Embodiment 1-2

Figure 18:
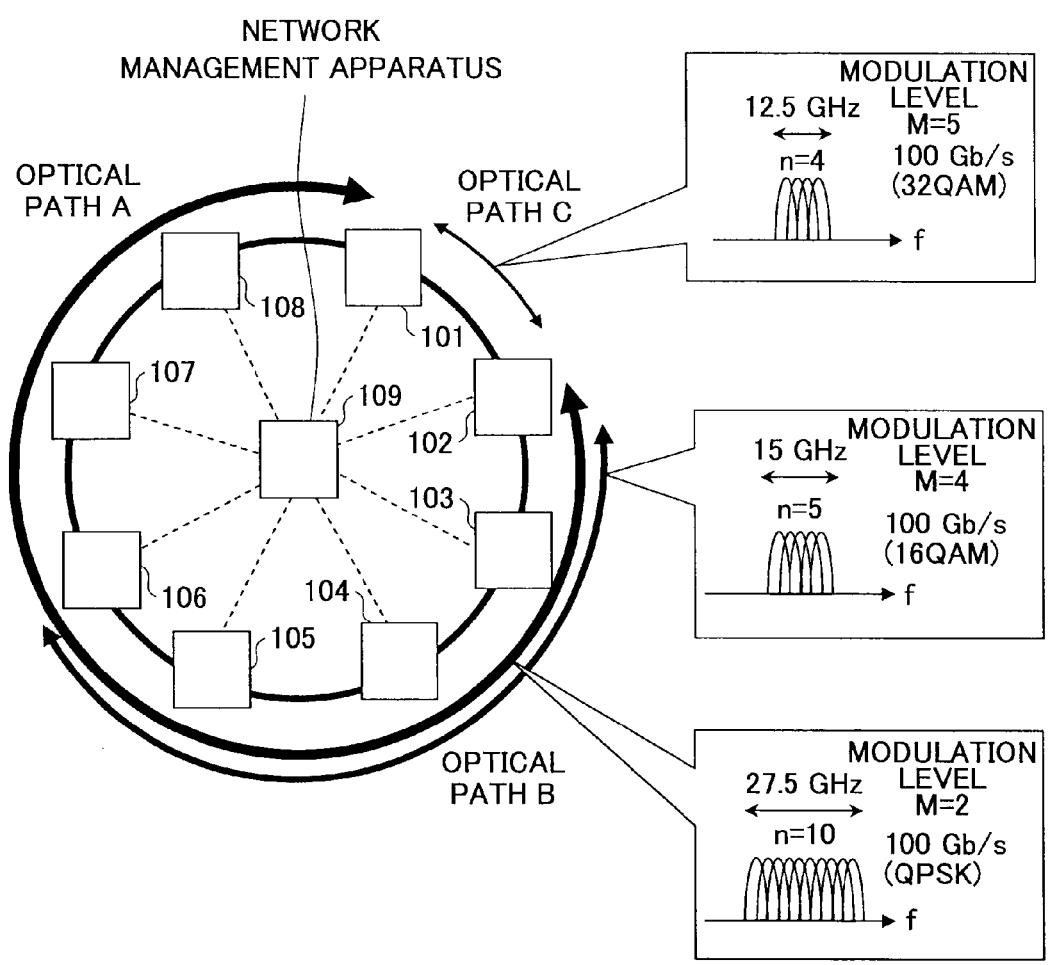
FIG. 18 is a configuration diagram of the bandwidth variable communication system of the embodiment 1-2.

Next, the embodiment 1-2 of the first embodiment is described. FIG. 18 shows a configuration of the bandwidth variable communication system of the embodiment 1-2.

Similarly to the embodiment 1-1, in the bandwidth variable communication system, bandwidth variable communication apparatuses 101-108 are connected by optical transmission routes. The configuration of each of the bandwidth variable communication apparatuses 101-108 is the same as one shown in FIG. 10. Also, the configuration of the network management apparatus 109 is the same as one shown in FIG. 11.

The characteristic feature of the embodiment 1-2 is that Orthogonal Frequency Division Multiplexing (OFDM, refer to non-patent document 2, for example) is used while the symbol rate SR (bit/s) is constant in the transmission unit 111 and the receiving unit 112. Also, when selecting a modulation format, the modulation format selection unit 192 of the network management apparatus 109 uses a modulation format for performing multi-level modulation of M of optical phase or optical strength or both of them with a symbol rate SR (bit/s) for each subcarrier, and selects a combination of the number of subcarriers N and the number M of modulation level in which $$B = N \times M \times SR \tag{3}$$

is satisfied, transmission is available and the spectrum bandwidth is narrow according to the optical signal quality deterioration amount on the optical path route. Accordingly, the transmission unit 111 of the bandwidth variable communication apparatus of the start point of the optical path performs orthogonal frequency division multiplexing having N subcarriers in which frequency bands are partially overlapping, and performs multi-level modulation of M of optical phase or optical strength or both of them with the symbol rate SR (bit/s) for each subcarrier, so as to select a combination of the number N of subcarriers and the number M of modulation level in which (3) is satisfied, transmission is available and spectrum bandwidth is narrow according to the optical signal deterioration on the optical path route, and generates the optical path.

Accordingly, in the embodiment 1-2, as shown in FIG. 18, the transmission unit 111 can multiplex the frequency bands of the plural subcarriers while the bands are partially overlapping with a symbol rate of a low speed by using OFDM. Thus, an optical path of narrower spectrum bandwidth can be generated compared to the method in which a single carrier is used in the embodiment 1-1. Therefore, a bandwidth variable optical communication system of higher frequency use efficiency can be provided.

Also, in each of the transmission unit 111 and the receiving unit 112, a polarized wave multiplexing function and a polarized wave demultiplexing function may be provided. In this case, the modulation format selection unit 192 of the network management apparatus 109 selects a combination of a modulation level M and a symbol rate SR in which $$B = N \times M \times SR \times 2 \quad (4)$$

is satisfied, transmission is available and the spectrum bandwidth is narrow. The transmission unit 111 of the bandwidth variable communication apparatus of the optical path start point generates an optical path by selecting a combination of the number of subcarriers N, the modulation level M and the symbol rate SR in which transmission is available and the spectrum bandwidth is narrow according to the optical signal quality deterioration on the optical path route, based on the modulation format and by using optical polarized wave multiplexing together. Accordingly, the frequency use efficiency can be doubled.

Effects

Calculation is performed for showing effects of the optical frequency use efficiency of the embodiment 1-2. Currently, 40 Gb/s is realized as a bit rate per one optical path in the optical network, and standardization of 100 Gb/s is proceeding, and study of a network of a 400 Gb/s optical path is proceeding as a next generation technique.

Figure 19:
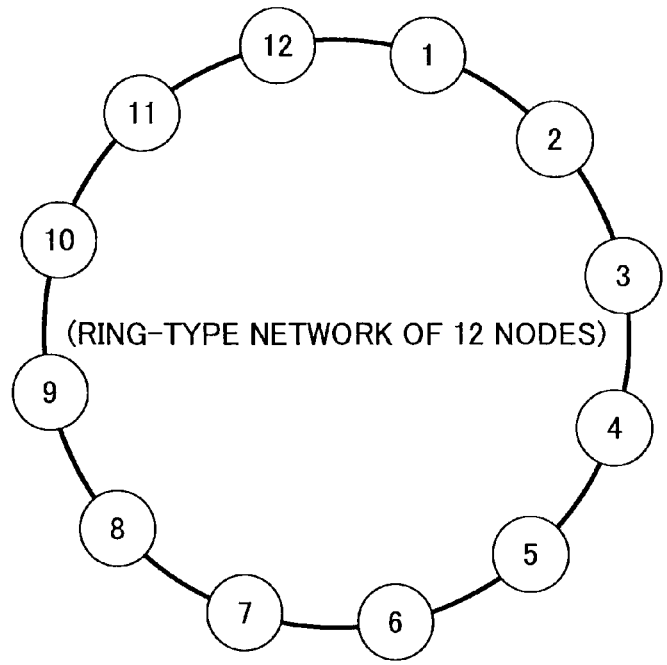
FIG. 19 is a diagram showing a ring type network of 12 nodes.
Figure 20A:
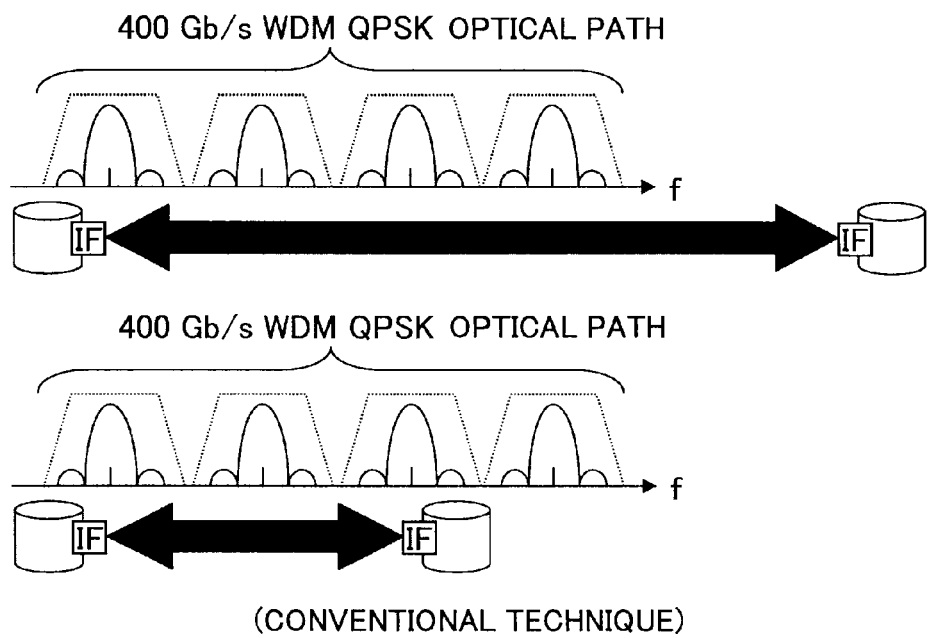
FIG. 20A is a diagram showing a spectrum bandwidth occupied by an optical path in a conventional technique.

In this example, as a calculation model, a ring type network including 12 nodes that handles the 400 Gb/s optical path is used as shown in FIG. 19. As shown in FIG. 20A, in the conventional technique, the 400 Gb/s optical path is generated by multiplexing 4 QPSK signals of 100 Gb/s using wavelength multiplexing (WDM), and the spectrum bandwidth occupied by the optical path is constant irrespective of the transmission distance of the optical path.

Figure 1:
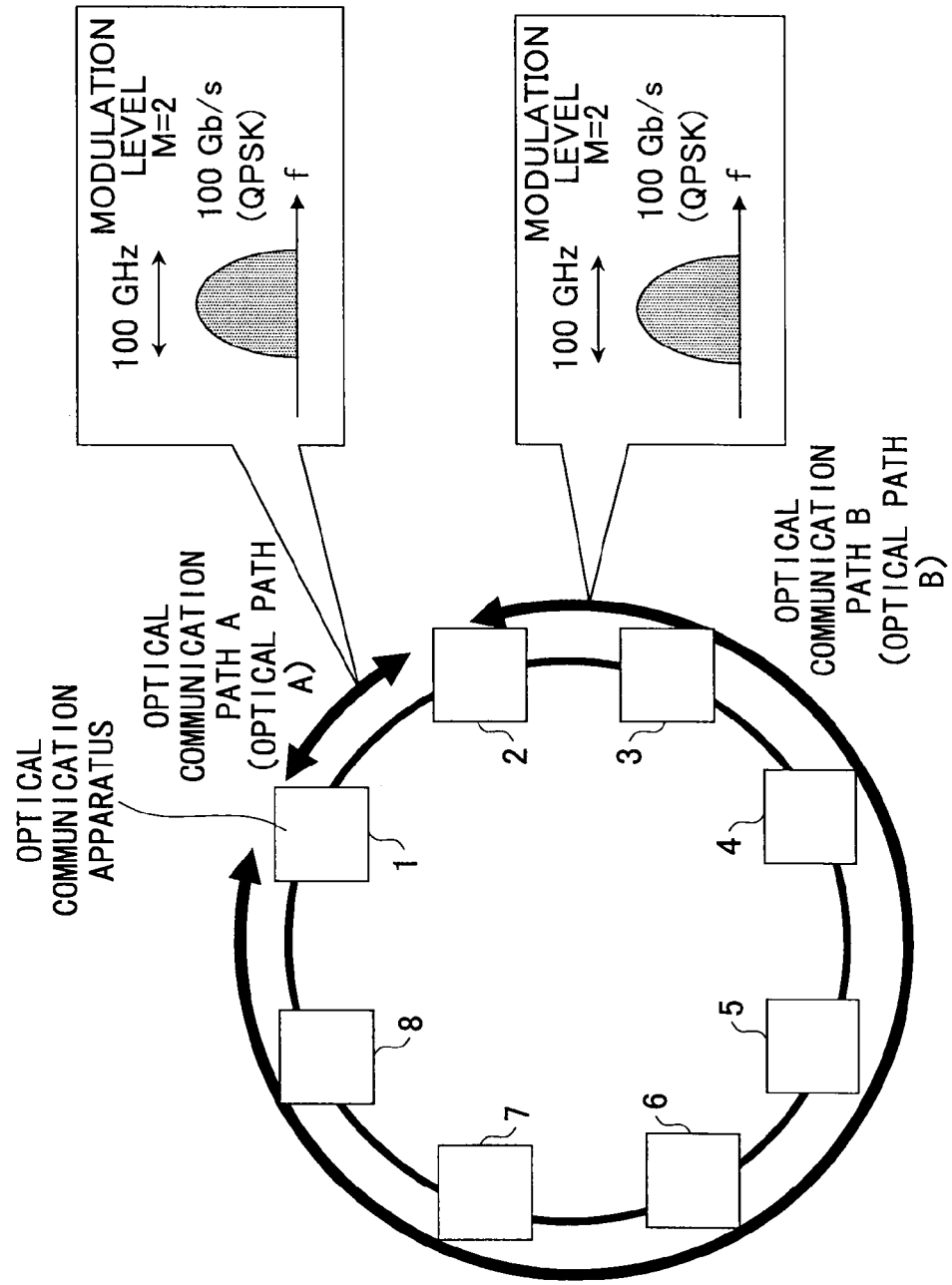
FIG. 1 shows an example of a conventional optical communication path network (optical path network)
Figure 2:
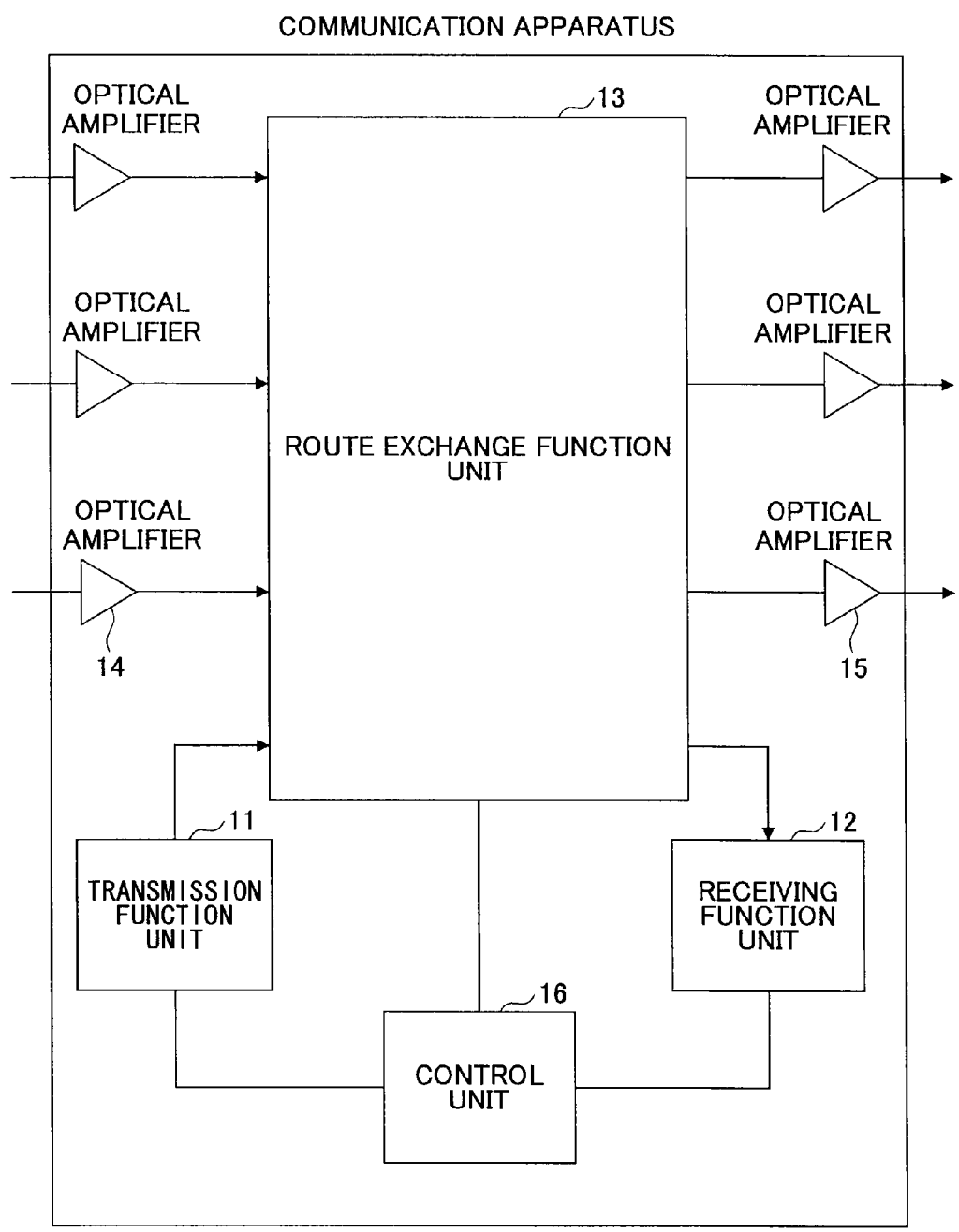
FIG. 2 shows a configuration example of a conventional communication apparatus.
Figure 3:
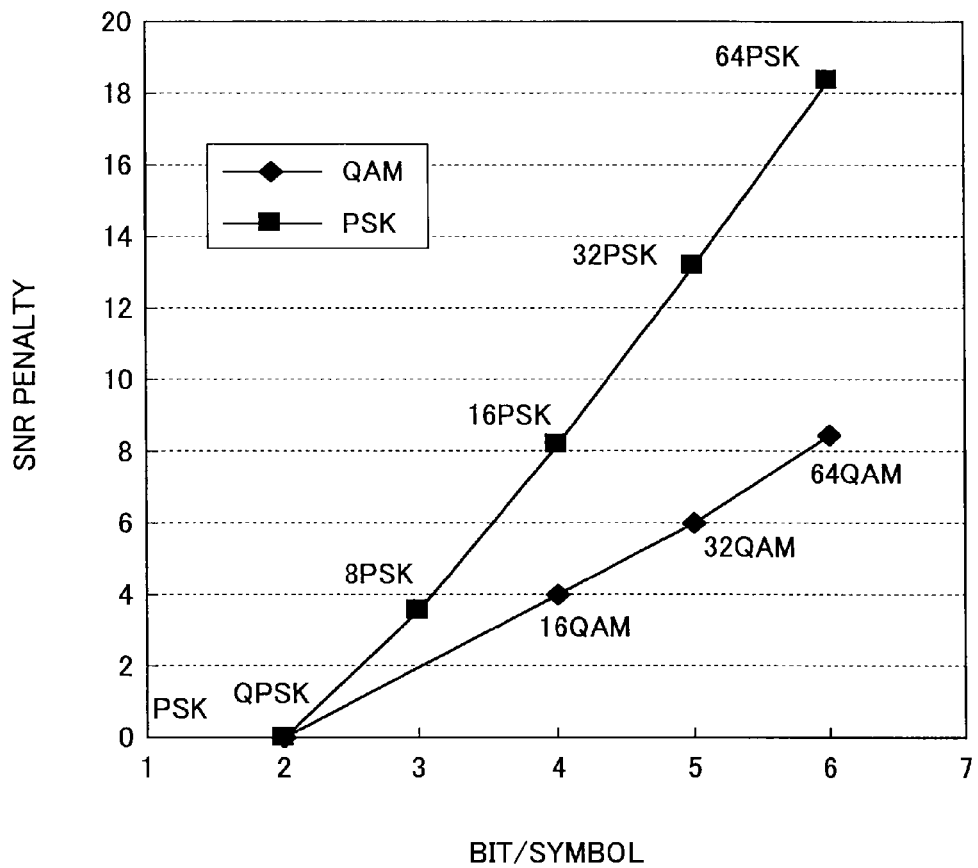
FIG. 3 shows a relationship between each type of modulation schemes and SNR penalty.
Figure 4A:
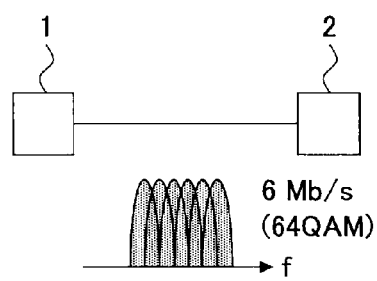
FIG. 4A shows an example of a conventional communication scheme, and shows a case of short distance where transmission route is good.
Figure 4B:
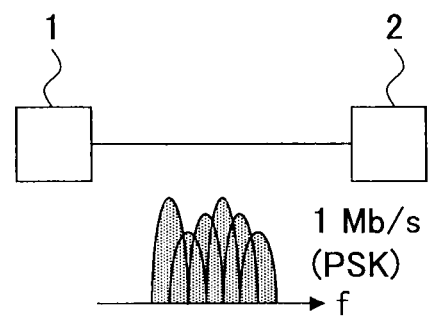
FIG. 4B shows an example of a conventional communication scheme, showing a case of short distance where transmission route environment deteriorates.
Figure 4C:
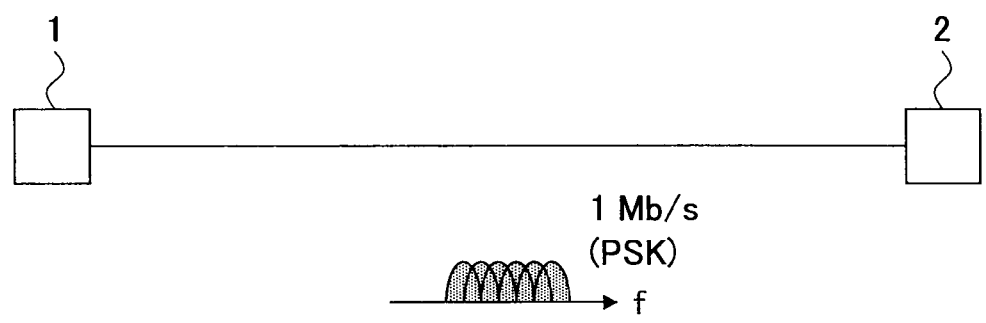
FIG. 4C shows an example of a conventional communication scheme in a case of long distance.
Figure 6A:
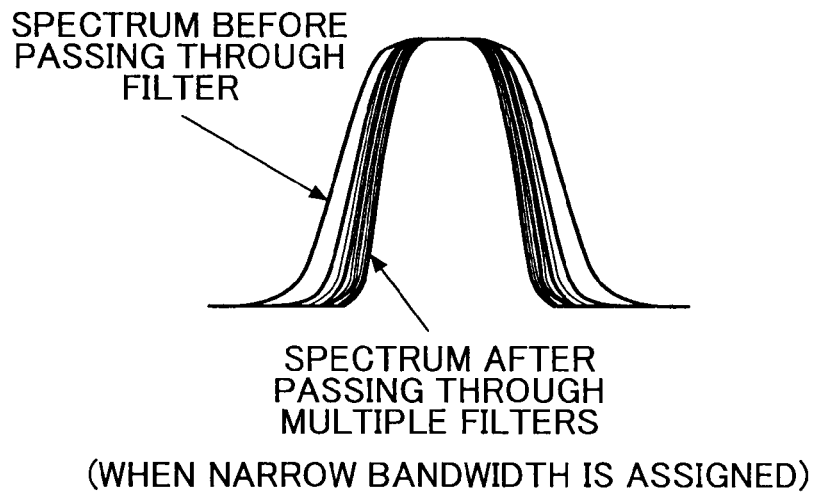
FIG. 6A shows a signal spectrum when a bandwidth of a filter is assigned in which a narrow bandwidth is assigned.
Figure 6B:
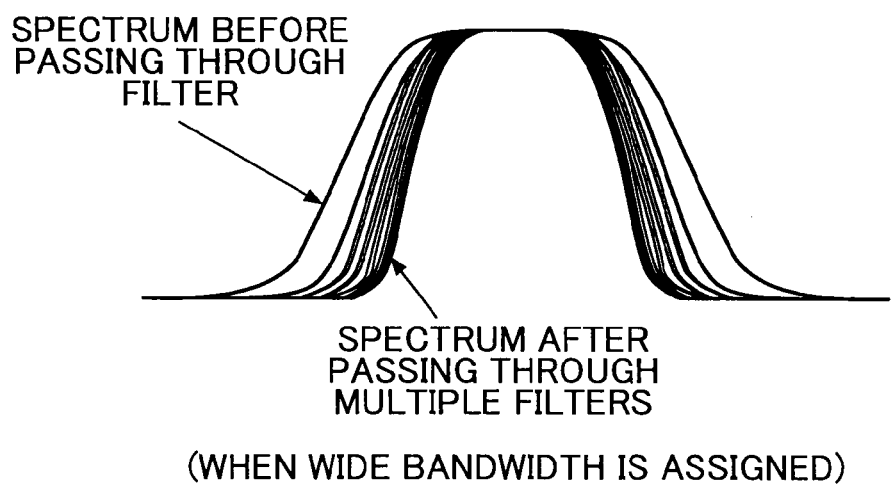
FIG. 6B shows a signal spectrum when a bandwidth of a filter is assigned in which a wide bandwidth is assigned.

On the other hand, according to the embodiment 1-2 of the present invention, the 400 Gb/s optical path is generated by using OFDM as mentioned above. As shown in FIG. 20B, 4 QPSK signals of 100 Gb/s are multiplexed using OFDM in the long distance, and 2 16-QAM signals of 200 Gb/s are multiplexed using OFDM in the short distance. Accordingly, in the present embodiment, high-density OFDM multiplexing and spectrum placement adapted to distance are performed, so that optical frequency use efficiency becomes higher than the conventional technique.

FIG. 21 shows calculation results of required spectrum bandwidth in the case where full-mesh optical paths are placed in the ring type network of 12 nodes. In the conventional technique, a bandwidth of about 26 THz is required, which is not supplied even by the total (12 THz) of C band and L band of optical communication. Therefore, the network cannot be realized.

On the other hand, according to the embodiment of the present invention, only about 9 THz is required due to spectrum reduction of 66%. Therefore, by using the technique of the present invention, it becomes possible to realize an optical path network of the large capacity of 400 Gb/s that cannot be realized by the conventional technique. The effect is extremely large.

Second Embodiment

In the following, a second embodiment is described. The second embodiment is an embodiment of the invention corresponding to the second object.

(Outline)

Figure 22:
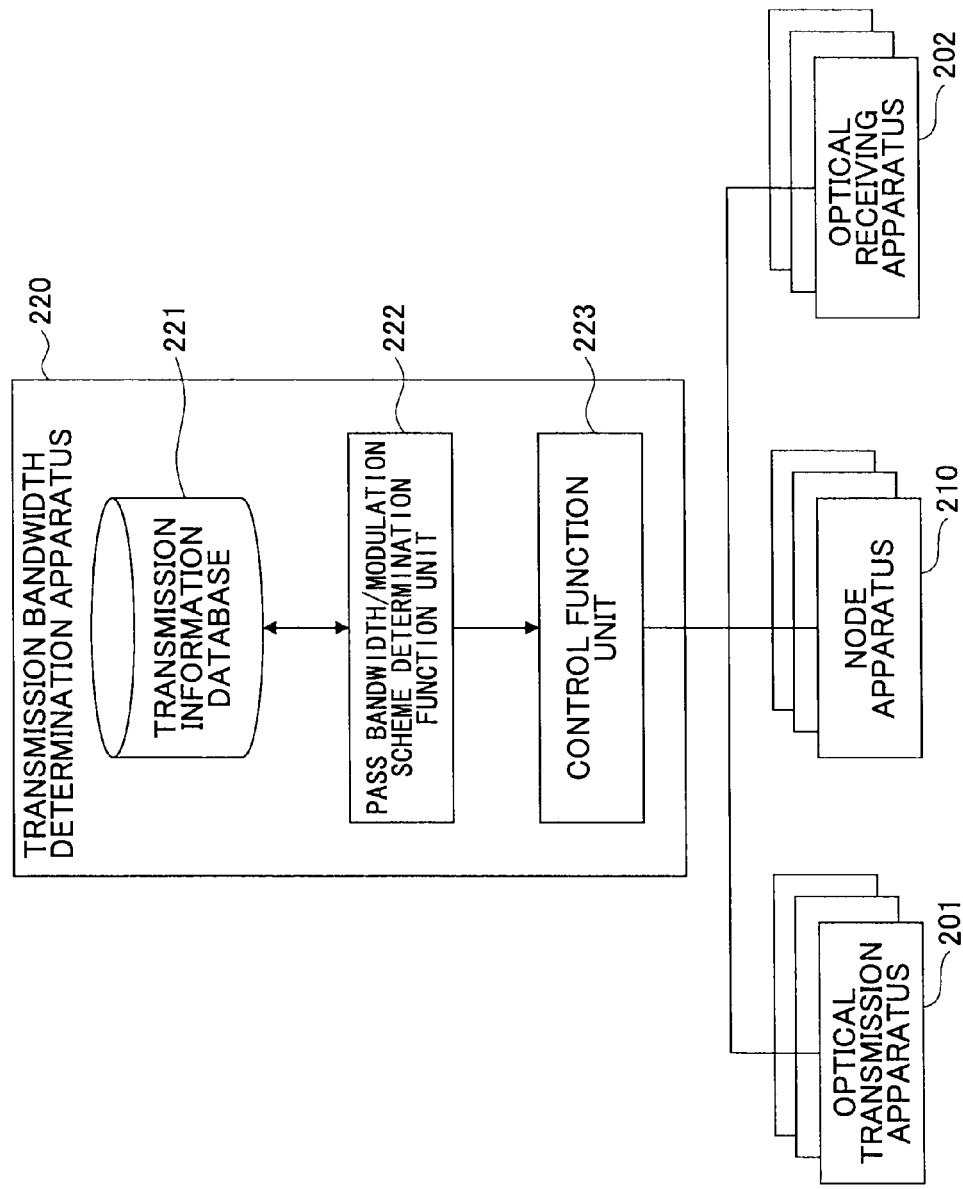
FIG. 22 is a diagram for explaining an outline of a second embodiment of the present invention.

First, outline of the present embodiment is described with reference to FIGS. 22 and 23. The transmission bandwidth determination apparatus in the present embodiment is a transmission bandwidth determination apparatus 220 including a function configured to transmit a control instruction to an optical transmission apparatus 201, a node apparatus 210 and an optical receiving apparatus 202 and to set a designated route, in an optical communication network formed by connecting, via transmission routes, the optical transmission apparatus 201 having a function for changing a modulation scheme for transmitting an optical signal, the node apparatus 210 having a function for changing a pass bandwidth of an optical signal, and an optical receiving apparatus 202 that can receive signals of various modulation schemes.

The transmission bandwidth determination apparatus 220 includes:

a transmission information database 221 configured to store corresponding relationship between transmission specification of a communication path for route setting, a pass bandwidth to be assigned to the node apparatus on the communication path and a modulation scheme to be set to the optical transmission apparatus;

a pass bandwidth and modulation scheme determination unit 222 configured to determine a pass bandwidth to be assigned and a modulation scheme according to the transmission specification of an optical communication path to be set by referring to the transmission information database; and a control unit 223 configured to receive information of the pass bandwidth and the modulation scheme set by the pass bandwidth and modulation scheme determination unit 222, and to perform setting of the optical communication path according to the information.

The transmission bandwidth determination method of the present embodiment is a transmission bandwidth determination method in a communication path setting system including a function configured to transmit a control instruction to an optical transmission apparatus, a node apparatus and an optical receiving apparatus and to set a designated route, in an optical communication network formed by connecting, via transmission routes, the optical transmission apparatus having a function for changing a modulation scheme for transmitting an optical signal, the node apparatus having a function for changing a pass bandwidth of an optical signal, and an optical receiving apparatus that can receive signals of various modulation schemes.

Figure 23:
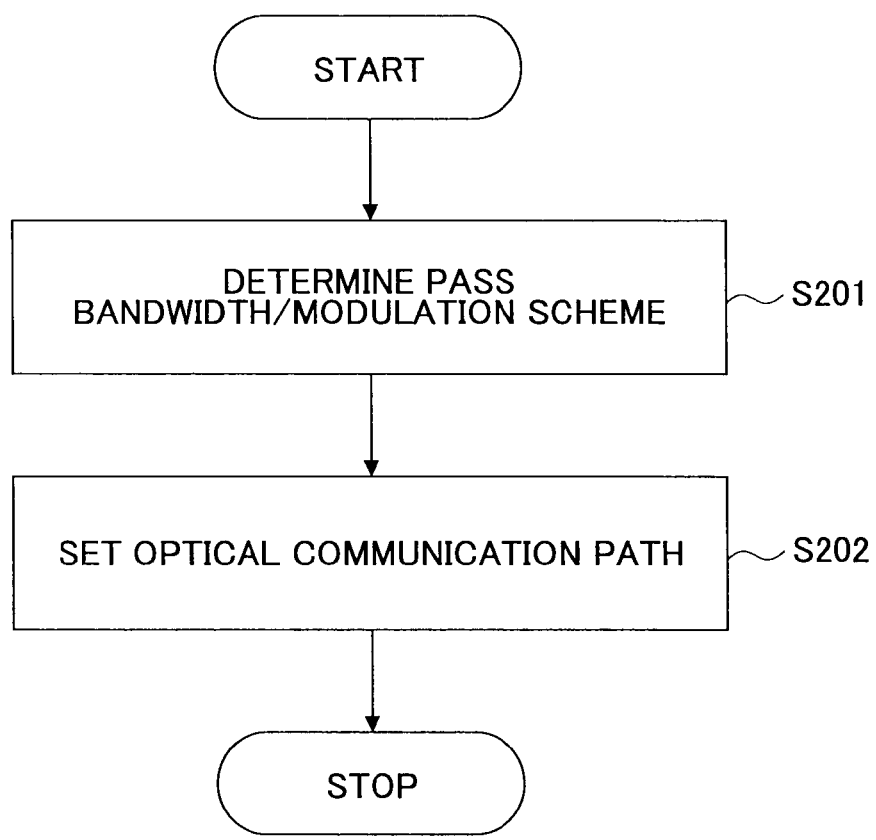
FIG. 23 is a diagram for explaining an outline of the second embodiment of the present invention.

As shown in FIG. 23, the transmission bandwidth determination method includes:

a pass bandwidth and modulation scheme determination step (step 201) in which a pass bandwidth and modulation scheme determination unit of the communication path setting system determines a pass bandwidth to be assigned and a modulation scheme by referring to a transmission information database configured to store corresponding relationship between transmission specification of a communication path for route setting, a pass bandwidth to be assigned to the node apparatus on the communication path and a modulation scheme to be set to the optical transmission apparatus; and a control step (step 202) in which a control unit receives information of the pass bandwidth and the modulation scheme set by the pass bandwidth and modulation scheme determination step, and performs setting of the optical communication path according to the information.

DETAILED DESCRIPTION OF THE EMBODIMENT

In the following, the second embodiment of the present invention is described with reference to figures in detail.

Figure 24:
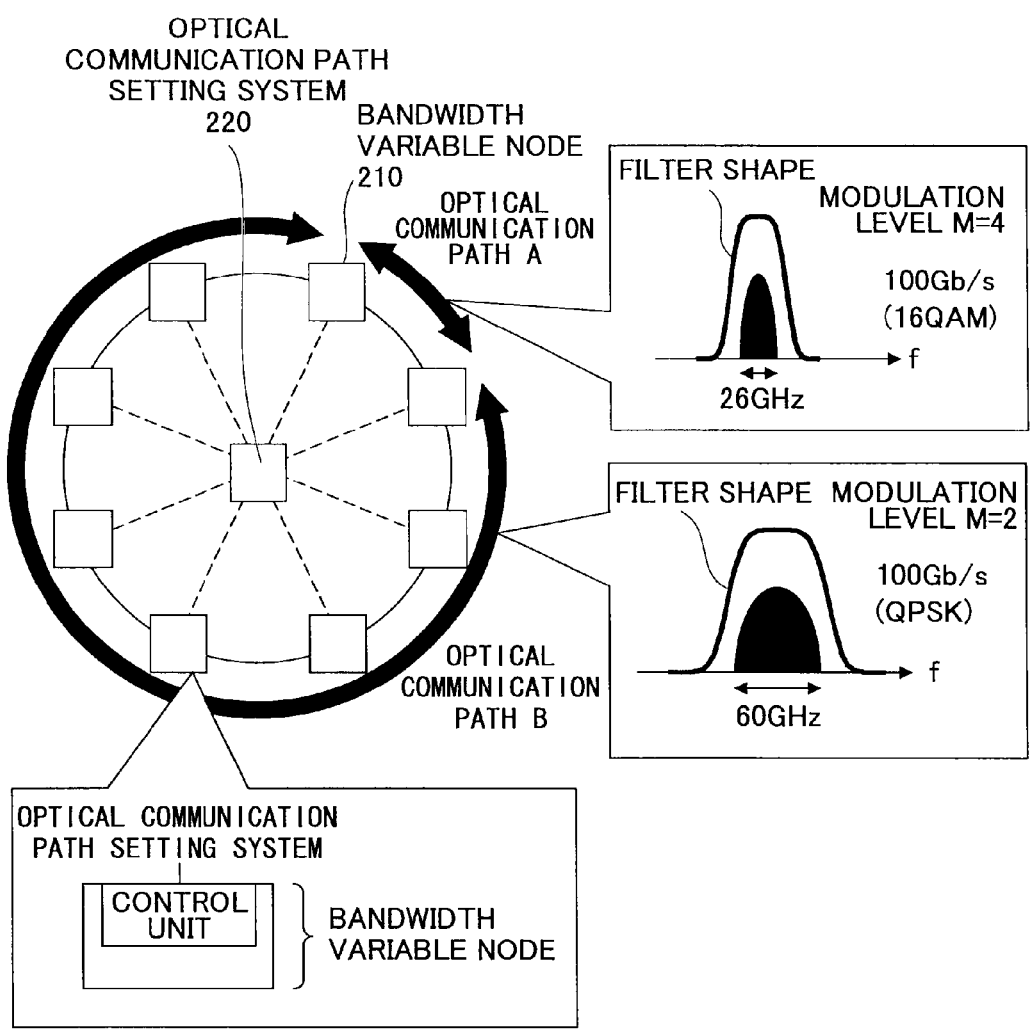
FIG. 24 is a configuration diagram of a bandwidth variable communication system of the second embodiment of the present invention.

FIG. 24 shows a configuration of a bandwidth variable communication system of the second embodiment of the present invention.

In the bandwidth variable communication system of the present embodiment, bandwidth variable nodes 210 are connected by optical transmission routes, and an optical communication path setting system 220 (to be also referred to as transmission bandwidth determination apparatus 220) is provided for managing settings of optical communication paths in the bandwidth variable nodes 210.

The characteristic feature of the present embodiment is that, when the transmission bit rate is maintained, a modulation scheme of a large modulation level (M=4) and a filter of a corresponding narrow width are used for an optical communication path (optical communication path A of FIG. 24) of a short transmission distance, and a modulation scheme of a small modulation level (M=2) and a filter of a corresponding wide width are used for an optical communication path (optical communication path B of FIG. 24) of a long transmission distance, so that required spectrum bandwidth is reduced as a whole so that frequency use efficiency is improved.

Figure 25:
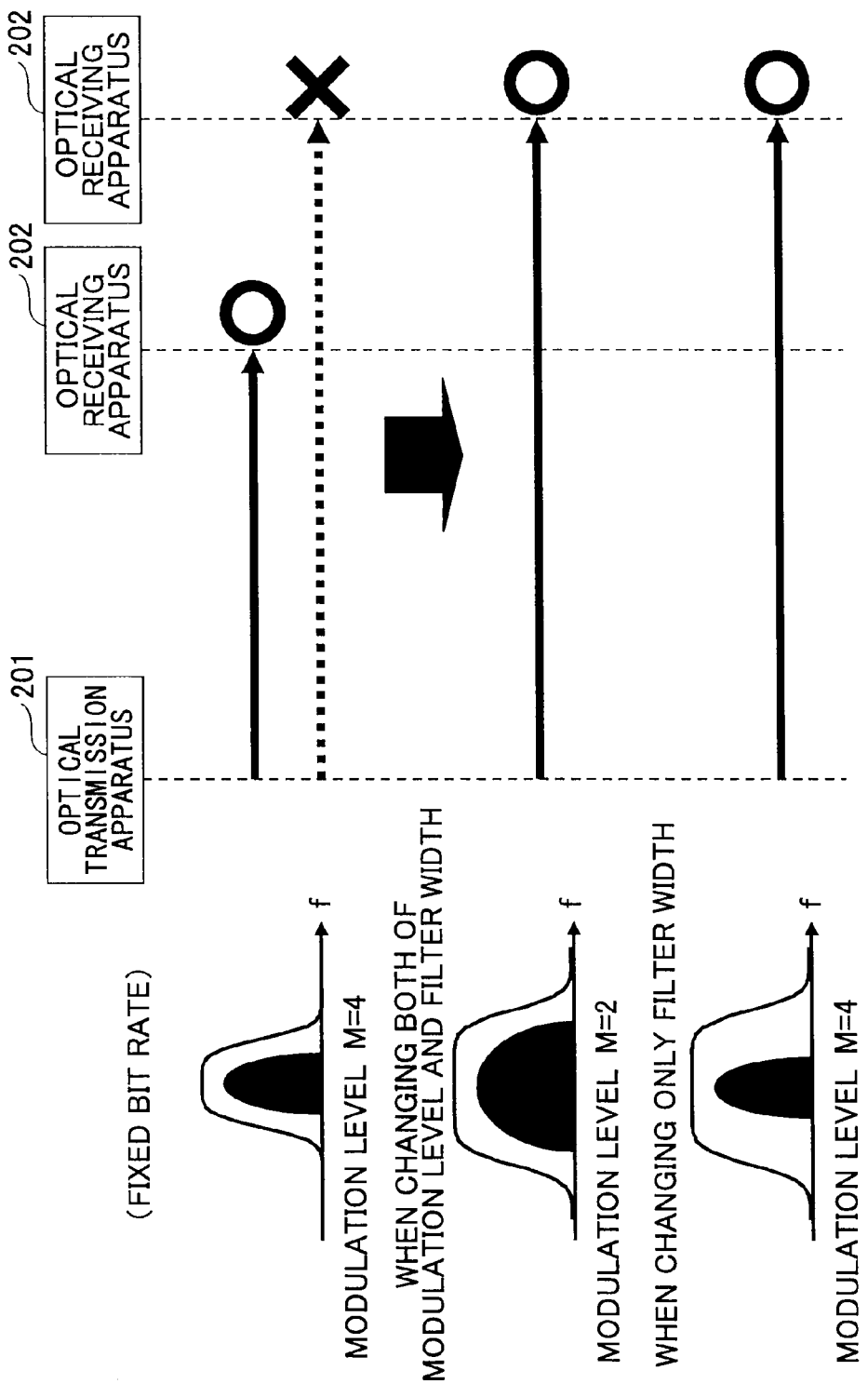
FIG. 25 is a diagram showing correspondence relationship among transmission distance, modulation level and filter width.

In the case when it is necessary to extend transmission distance of the optical communication path, if the spectrum bandwidth of the communication path can be decreased more by only changing the filter width of the bandwidth variable node without changing the modulation level of the optical transmission apparatus rather than changing both of the modulation level of the optical transmission apparatus and the filter width of the bandwidth variable node, increase of frequency use in the whole network can be suppressed only by changing the filter width of the bandwidth variable node apparatus. FIG. 25 shows correspondence relationship among transmission distance, modulation level and filter width.

Figure 26:
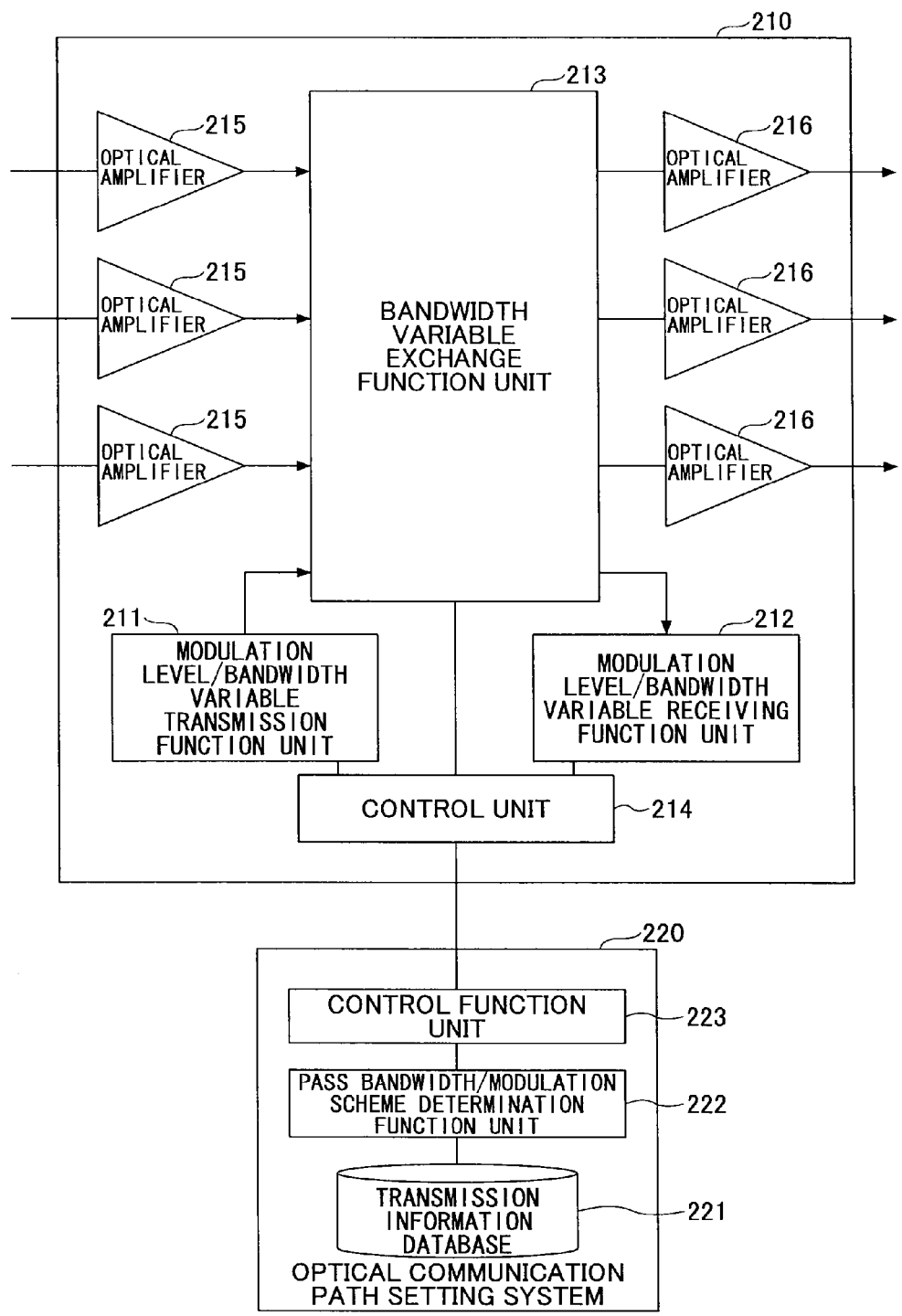
FIG. 26 is a block diagram of an optical communication path setting system and a bandwidth variable node in the second embodiment of the present invention.

FIG. 26 shows a configuration example of an optical communication path setting system and a bandwidth variable node in the second embodiment of the present invention.

When setting an optical communication path, the optical communication path setting system 220 sets both of the modulation scheme to be used by the transmission function unit 211 and a frequency filter width to be used by the node apparatus such that a required spectrum for a required transmission distance becomes the smallest.

The optical communication path setting system 220 includes transmission information database 221, a pass bandwidth/modulation scheme determination function unit 222, and a control function unit 223.

The transmission information database 221 stores correspondence relationship among transmission specification of optical communication path to be set, filter width to be assigned to node apparatuses 210 on the communication path and the modulation scheme of the transmission function unit 211 of the bandwidth variable node 210.

The pass bandwidth/modulation scheme determination function unit 222 determines filter width and modulation scheme to be assigned according to the transmission specification of the optical communication path to be set by referring to the transmission information database 221.

The control function unit 223 receives information of the filter width and modulation scheme to be set from the pass bandwidth/modulation scheme determination function unit 222, and sets the bandwidth variable node 210 according to the information.

The bandwidth variable node 210 includes a modulation level/bandwidth variable optical transmission function unit 211, a modulation level/bandwidth variable receiving function unit 212, a bandwidth variable exchange function unit 213, optical amplifiers 215 and 216 and a control unit 214. If unnecessary, the optical amplifiers 215 and 216 may not be provided.

The modulation level/bandwidth variable optical transmission function unit 211 includes a function configured to generate an optical signal by modulating light and to transmit the optical signal, a function configured to change the modulation level of the modulation scheme based on the control signal received from the control function unit 223 of the optical communication path setting system 220, and a function configured to change a frequency of the optical signal to be transmitted by changing the oscillation frequency.

The modulation level/bandwidth variable receiving function unit 212 includes a function configured to receive the optical signal transmitted from the modulation level/bandwidth variable optical transmission function unit 211.

The bandwidth variable exchange function unit 213 includes a route exchange function configured to switch output ports of one or more optical signals entering from an input port based on a control signal from the control unit 214, a bandwidth changing function configured to change a passable spectrum bandwidth in a section from the input port to the output port through which the optical communication path passes by filtering, and a function configured to receive a frequency assignment instruction when setting an optical communication path.

In the following, operation of the optical communication path setting system 220 is described.

Figure 27:
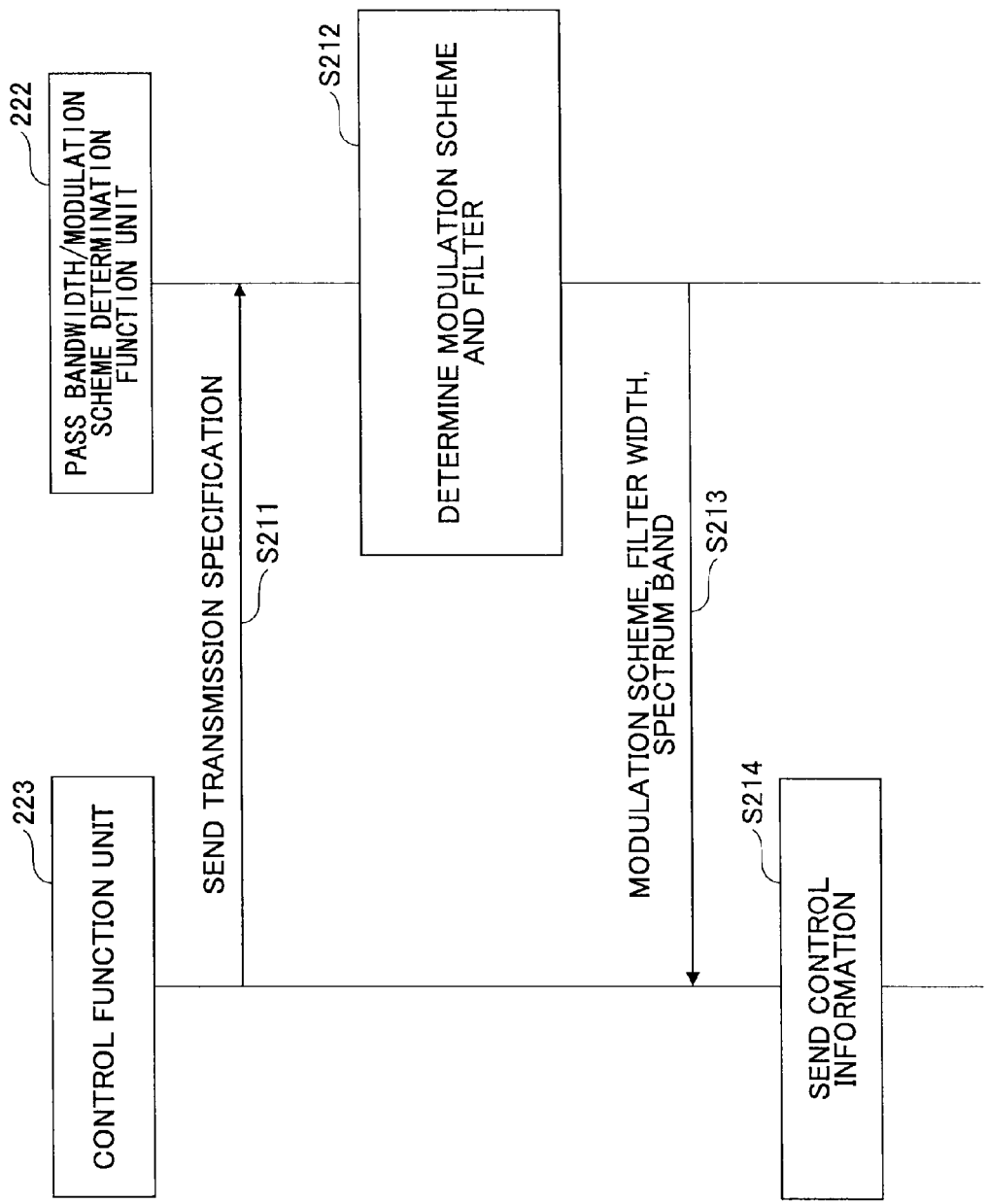
FIG. 27 is a sequence chart of the optical communication path setting system in the second embodiment of the present invention.

FIG. 27 is a sequence chart of the optical communication path setting system in the second embodiment of the present invention.

Step 211) In the optical communication path setting system 220, the control function unit 223 reports a transmission specification to the pass bandwidth/modulation scheme determination function unit 222 for setting an optical communication path.

Step 212) The pass bandwidth/modulation scheme determination function unit 222 accesses the transmission information database 221 using the transmission specification received from the control function unit 223 as a parameter so as to determine a modulation scheme and a filter in which the transmission specification is satisfied (transmission is available with the required bit rate) and the required spectrum bandwidth is the smallest.

Step 213) The pass bandwidth/modulation scheme determination function unit 222 reports the determined modulation scheme, filter width and the spectrum bandwidth to the control function unit 223.

Step 214) The control function unit 223 reports information of the modulation scheme to the modulation level/bandwidth variable optical transmission function unit 211 of the bandwidth variable node 210, and reports filter width information to the bandwidth variable exchange function unit 213. The change of the modulation scheme indicates change of the modulation level, change of the number of subcarriers in the optical OFDM (Orthogonal Frequency Division Multiplexing), or presence/absence of polarized wave multiplexing.

Figure 28A:
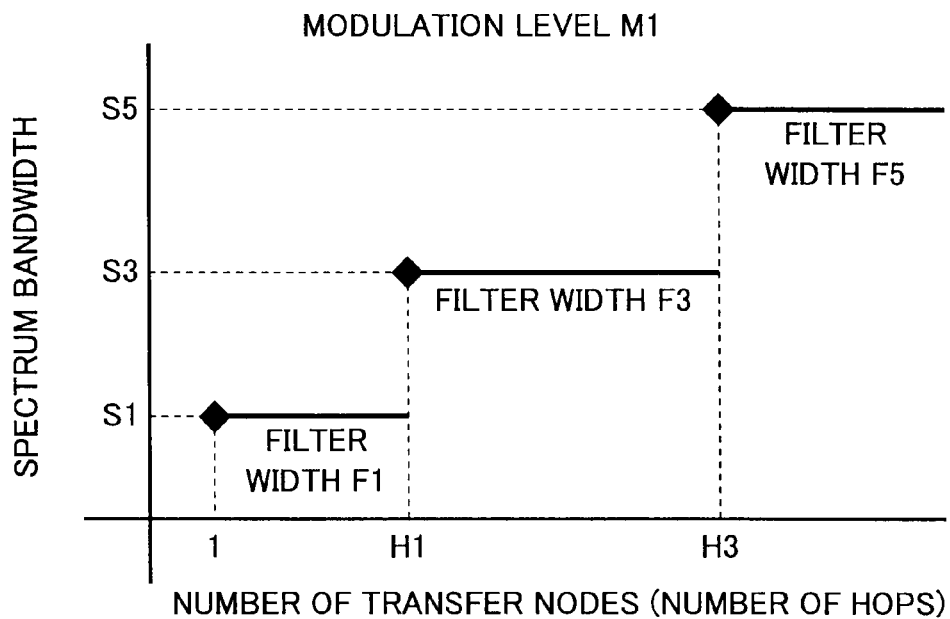
FIG. 28A is an example (when the modulation level is M1) of relationship between the number of transfer nodes and spectrum bandwidth.
Figure 28B:
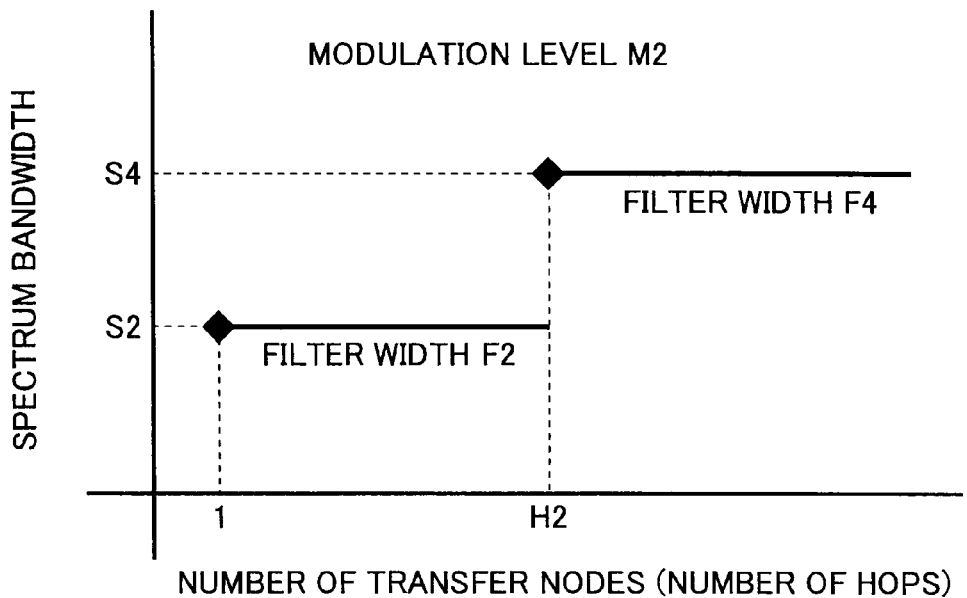
FIG. 28B is an example (when the modulation level is M2) of relationship between the number of transfer nodes and spectrum bandwidth.

FIGS. 28A and 28B show examples (step function) of relationship between the number of transfer nodes to the node apparatus of the transmission destination and spectrum bandwidth necessary for transmission with a constant bit rate for the distance in the case when transmission is performed by using a modulation scheme when setting an optical communication path to the node apparatus of the transmission destination. FIGS. 28A and 28B show two types of modulation schemes of the modulation level M1 (FIG. 28A) and the modulation level M2 (FIG. 28B). In the example, for the sake of simple explanation, it is assumed that the intervals between transfer nodes are constant, that is, the distance of optical communication path is in proportion of the number of transfer nodes. But, even if each distance between transfer nodes is different with each other, the present invention can be applied. The information is stored in the transmission information database 221.

Figure 29:
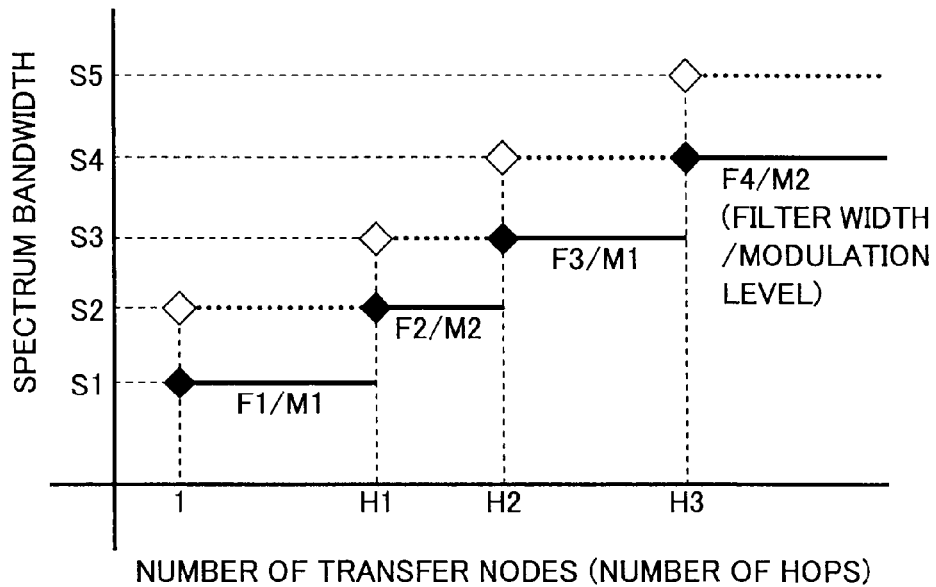
FIG. 29 is a diagram showing relationship between the number of transfer nodes and the spectrum bandwidth in the second embodiment.

FIG. 29 is an example for determining the spectrum bandwidth and the modulation level from the transmission information database 221 using the examples of FIGS. 28A and 28B.

In the present embodiment, the pass bandwidth/modulation scheme determination function unit 222 combines plural step functions corresponding to transmission specifications, and selects a combination in which the spectrum bandwidth is the smallest from among plural combinations of the modulation level and the filter width in which transmission is available in the number of transfer nodes.

Figure 30:
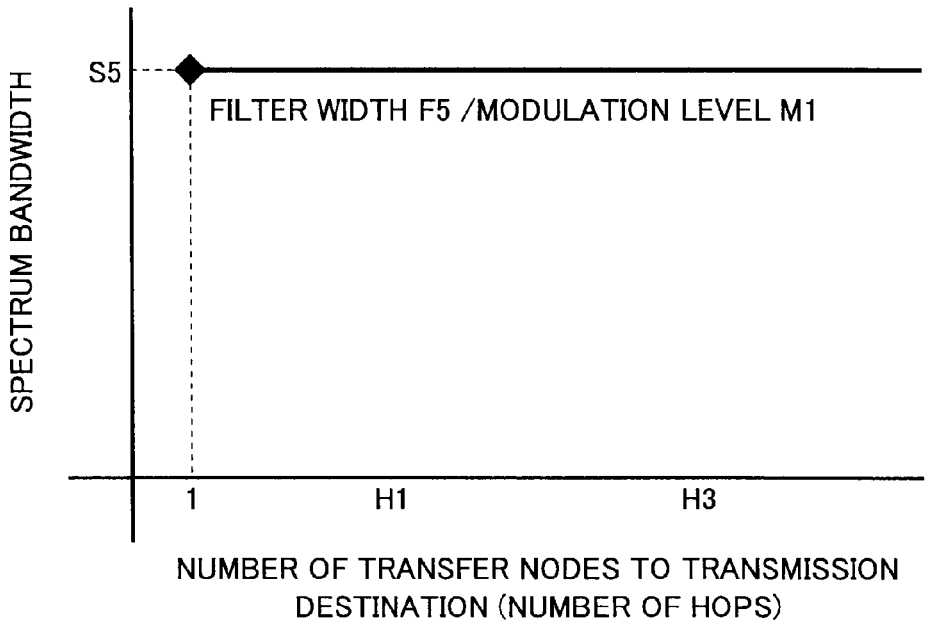
FIG. 30 is a diagram showing conventional relationship between the number of transfer nodes to a transmission destination and the spectrum bandwidth

As to the selection method, examples are explained using FIGS. 28-30.

In a conventional scheme, when setting an optical communication path, in conformity to the optical communication path of the severest transmission specification, the same spectrum bandwidth and the same modulation scheme are used also for other optical communication paths. In this case, as shown in the step function of FIG. 30 that indicates relationship between the number of transfer nodes to the transmission destination and the spectrum bandwidth, the spectrum bandwidth is fixed irrespective of the number of transfer nodes.

On the other hand, according to the technique of the present embodiment, plural modulation schemes can be used and the filter width can be flexibly changed. Thus, the smallest spectrum bandwidth in which transmission is available for the number of transfer nodes can be selected from among plural combinations of the modulation scheme and filter width.

In the present embodiment, by using the combined step functions, a better scheme can be selected, that is, a filter width and a modulation scheme in which transmission is available with a smaller spectrum bandwidth can be selected. FIG. 29 is a graph in which two step functions of FIGS. 28A and 28B are combined and a value of a smaller spectrum bandwidth can be selected. For example, in the case when the number of transfer nodes to the transmission destination is between 1 hop and H1 hops, an optical communication path can be set with S1 spectrum bandwidth by using F1 as the filter width and M1 as the modulation scheme. When comparing the present embodiment to the conventional scheme of FIG. 30, a spectrum bandwidth of S5-S1 [Hz] can be reduced.

The step functions are stored in the transmission information database 221. As an example, information of the step functions can be generated by investigating availability of transmission by changing filter width and transmission distance for each modulation scheme using experiments and field tests beforehand. Also, the transmission information database 221 includes a function for generating a new step function by combining step functions of the modulation scheme to be applied.

As mentioned above, after the pass bandwidth/modulation scheme determination function unit 222 determines information necessary for setting an optical communication path by referring to the transmission information database 221, the control function unit 223, in step 214 of FIG. 27, exchanges control information with the control unit 214 of the bandwidth variable node 210 based on information received from the pass bandwidth/modulation scheme determination function unit 222. More specifically, the control function unit 223 provides information of the modulation scheme for use to the transmission function unit 211 and the receiving function unit 212 at the optical communication path end, and provides filter width information to the bandwidth variable exchange function unit 213. The information to be transmitted to the transmission function unit 211 and the receiving function unit 212 may be spectrum bandwidth or both of modulation scheme and the spectrum bandwidth instead of only modulation scheme.

The operation of the optical communication path setting system 220 can be constructed as a program, and the program can be executed by installing it into a computer used as the optical communication path setting system 220 or the program can be distributed via network. That is, the optical communication path setting system 220 can be realized by executing the program on the computer, for example.

Also, it is possible to store the constructed program in a hard disk, or in a portable recording medium such as a flexible disk, CD-ROM and the like, so that the program can be installed in a computer or can be distributed.

Third Embodiment

In the following, a third embodiment is described. The third embodiment is an embodiment of the invention corresponding to the third object.

(Outline)

Figure 31:
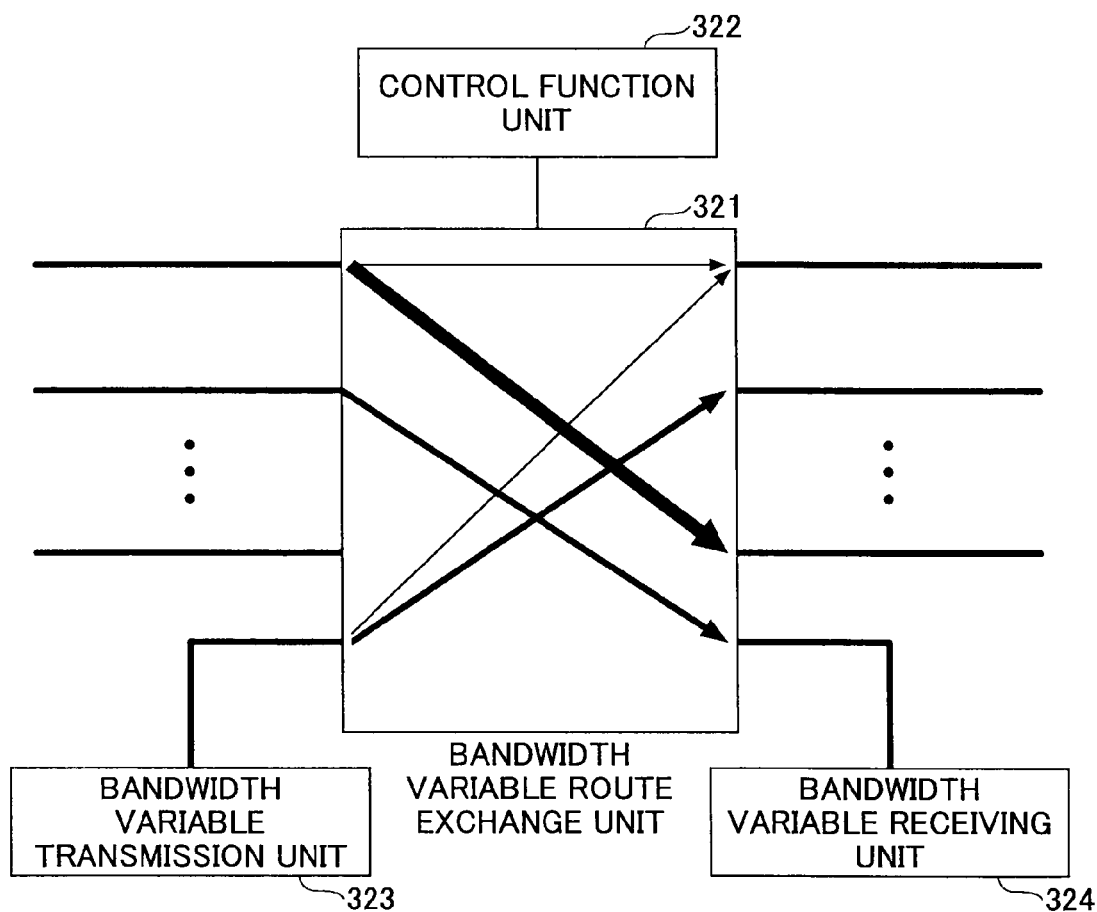
FIG. 31 is a diagram for explaining an outline of a third embodiment of the present invention.

First, outline of the present embodiment is described with reference to FIG. 31. As shown in FIG. 31, the node apparatus in a communication network of the present embodiment, includes:

a bandwidth variable transmission unit 323 configured to transmit an optical signal of an arbitrary frequency bandwidth;

a bandwidth variable receiving unit 324 configured to receive an optical signal of an arbitrary frequency bandwidth;

a bandwidth variable route exchange unit 321 configured to perform route exchange for an optical signal of an arbitrary frequency band between arbitrary input-output routes; and a control function unit 322 configured to set a signal of an arbitrary frequency bandwidth in arbitrary input-output routes by exchanging a control signal with the bandwidth variable transmission unit 323, the bandwidth variable receiving unit 324 and the bandwidth variable route exchange unit 321. The control signal designates the frequency band of the optical signal on which route exchange is performed by using a start point value and an end point value of an optical frequency or by using a center frequency and a bandwidth.

DETAILED DESCRIPTION OF THE EMBODIMENT

In the following, the third embodiment of the present invention is described with reference to figures in detail. In the present embodiment, basic configuration and processing are describe first, and after that, embodiments 3-1-3-6 are described as concrete examples.

Figure 32:
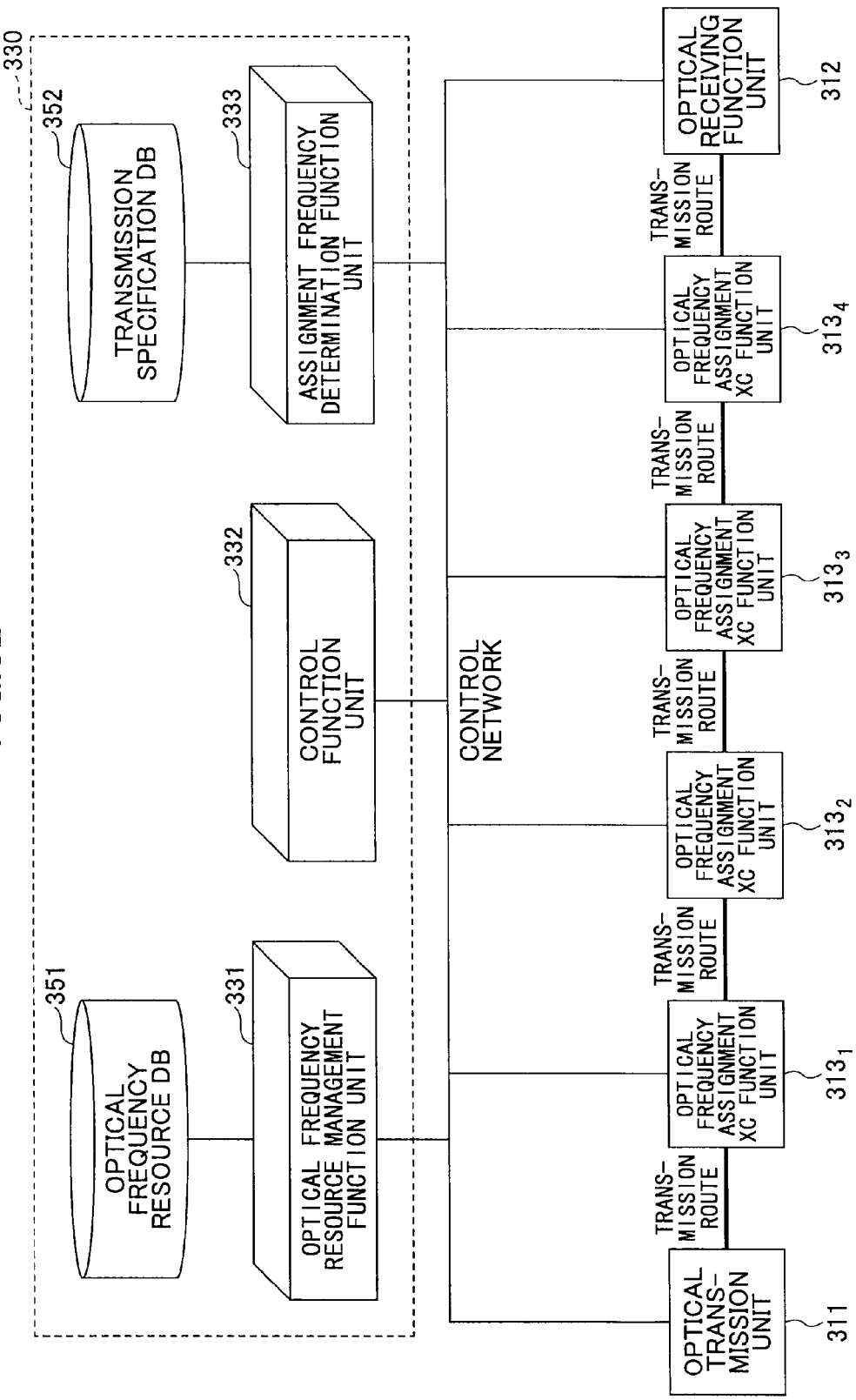
FIG. 32 is a system block diagram in the third embodiment of the present invention.

FIG. 32 shows a system configuration of the present embodiment. The system shown in the figure includes an optical transmission function unit 311 (node apparatus), an optical receiving function unit 312 (node apparatus), plural optical frequency assignment cross-connect (XC) function units 313 (node apparatus), an optical frequency resource management function unit 331, a control function unit 332, an assignment frequency determination function unit 333, an optical frequency resource DB 351 and a transmission specification DB 352.

In these components, the optical frequency resource management function unit 331, the control function unit 332, the assignment frequency determination function unit 333, the optical frequency resource DB 351 and the transmission specification DB 352 function as a communication path setting apparatus (control apparatus).

The optical transmission function unit 311 includes a function configured to generate an optical signal by modulating light, a function configured to transmit an optical signal and a function configured to change an optical frequency of the optical signal to be transmitted by changing oscillation optical frequency.

The optical receiving function unit 312 includes a function configured to receive the optical signal and a function configured to monitor signal quality of the received optical signal.

The optical frequency assignment XC function unit 313 includes a function configured to output an optical signal input from an input part to an arbitrary output part with an arbitrary optical frequency bandwidth, and a function configured to receive a cross connect instruction and an optical frequency assignment instruction from the control function unit 332.

The optical frequency resource management function unit 331 includes a function configured to manage optical frequency resources in the transmission route and the node apparatus (the optical frequency assignment XC function unit 313).

The optical frequency resource DB 351 is a database storing optical frequency resources used in the transmission route and the node apparatus (the optical frequency assignment XC function unit).

The control function unit 332 includes a function configured to transmit a cross-connect instruction and an optical frequency assignment instruction, to the optical frequency assignment XC function unit 313, including input port/output port for connection, optical frequency bandwidth of the communication path, and a center wavelength of communication path optical frequency (or upper limit value and the lower limit value of the optical frequency slot), and a function configured to transmit a control instruction of optical frequency setting and measurement and the like to the optical transmission function 311 and the optical receiving function 312.

The assignment frequency determination function unit 333 includes a function configured to determine an optical frequency width to be assigned according to the transmission specification of the communication path to be set (transmission distance, the number of passing nodes, bit rate), and vacancy status of the frequency resources.

The transmission specification DB 352 is a database for storing correspondence relationship between the transmission specification of the communication path to be set (transmission distance, the number of passing nodes, bit rate) and the optical frequency width to be assigned.

The optical frequency resource management method of the present embodiment adopts a new management scheme different from the conventional scheme.

The conventional optical frequency assignment is a management method for managing the center optical frequency of the communication path in conformity with the fixed optical frequency grid (e.g. ITU-T grid). In this case, the center wavelength for each optical frequency output by the optical frequency assignment cross-connect is on the fixed grid, so that it is impossible to realize operation for controlling the center optical frequency according to circumstances. On the other hand, in the present embodiment, an optical frequency assignment method is adopted for changing the center optical frequency according to status in addition to the optical frequency width to be assigned.

Figure 33B:
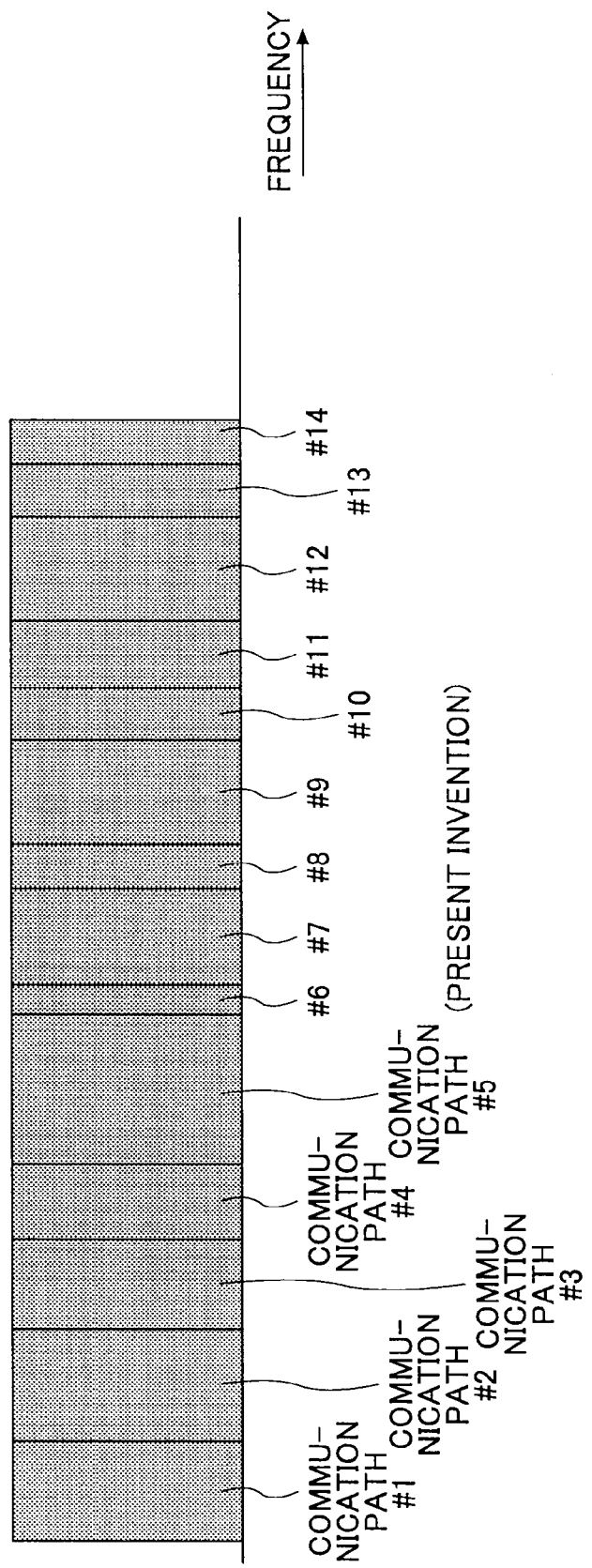
FIG. 33B is a diagram showing frequency management in a technique of the present invention.

FIGS. 33A and 33B show figures showing comparison of frequency management.

As shown in FIG. 33A, in the conventional method, even when the optical frequency bandwidth to be assigned is narrow, the number of communication paths that can be set is fixed by the grid since it is necessary to place the center wavelength onto the predetermined grid. Therefore, in the case when many communication paths of narrow assignment optical frequency coexist, large amount of optical frequency resources that cannot be utilized remain between communication path channels.

On the other hand, as shown in FIG. 33B, according to the optical frequency management scheme adopted in the present embodiment, since the center optical frequency of the communication path is not fixed, it is possible to set communication paths by eliminating gaps when the bandwidth is narrow. Therefore, as a result, the number of communication paths that can be set can be increased.

Also, the node apparatus of the present embodiment is provided with a route exchange function for setting connection state between arbitrary input part and output part under the new optical frequency resource management.

Figure 34:
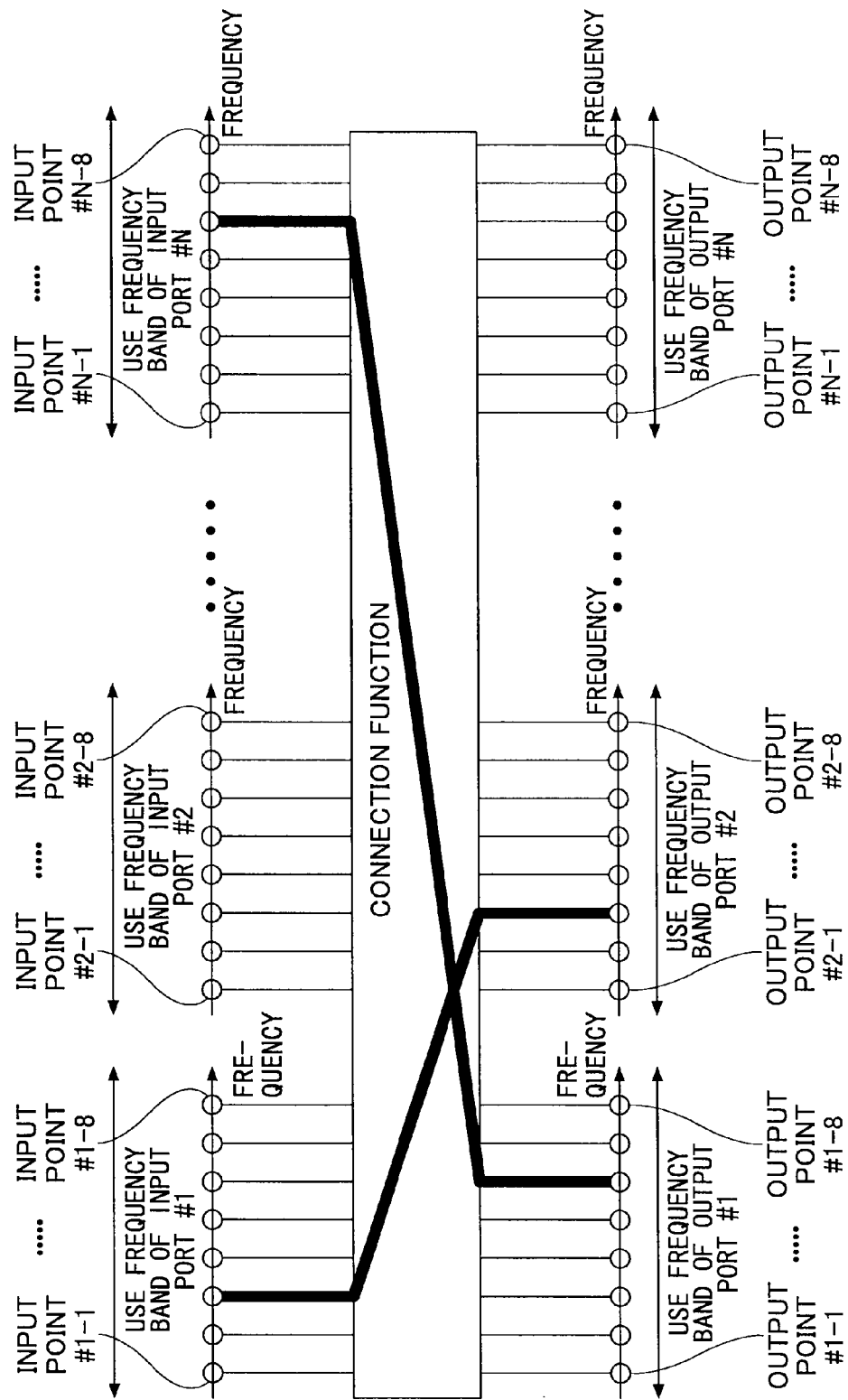
FIG. 34 is a diagram showing a conventional route exchange function.

In the route exchange function in the conventional node apparatus, as shown in FIG. 34, the optical frequency bandwidth used for the communication route is not managed. Thus, it is not necessary to receive information on bandwidth when setting the communication path. The input part and the output part of the communication path are identified and managed by a combination of output/input ports and a center optical frequency (not necessarily the center optical frequency, it may be any reference value that can be identified). That is, in the conventional method, each input part and each output part existing on the node apparatus are points (e.g. points on ITU-T grid) that are determined on an optical frequency axis that is not related to the communication path attribute of the communication path to be set, so coordinate on the optical frequency axis to which the communication path is assigned is determined irrespective of a bandwidth to be used for the communication path. When setting a communication path of the input part, it is only necessary to select points on the optical frequency axis for each of the input part (input point) and the output part (output point) and to connect them. Also, the number of input points and the output points is a fixed value inevitably determined by the communication bandwidth used in the communication network and the optical frequency grid to be used. In the example of FIG. 34, 8 input points (#1-1~#1-8, #2-1~#2-8, . . . , #N-1~#N-8) are determined for each of the input ports #1~#N in the input inevitably side, and 8 output points (#1-1~#1-8, #2-1~#2-8, . . . , #N-1~#N-8) are determined for each of the output ports #1~#N in the output inevitably side, and an input point #1-3 and an output point #2-3 are connected and an input point #N-6 and an output point #1-6 are connected.

Figure 35:
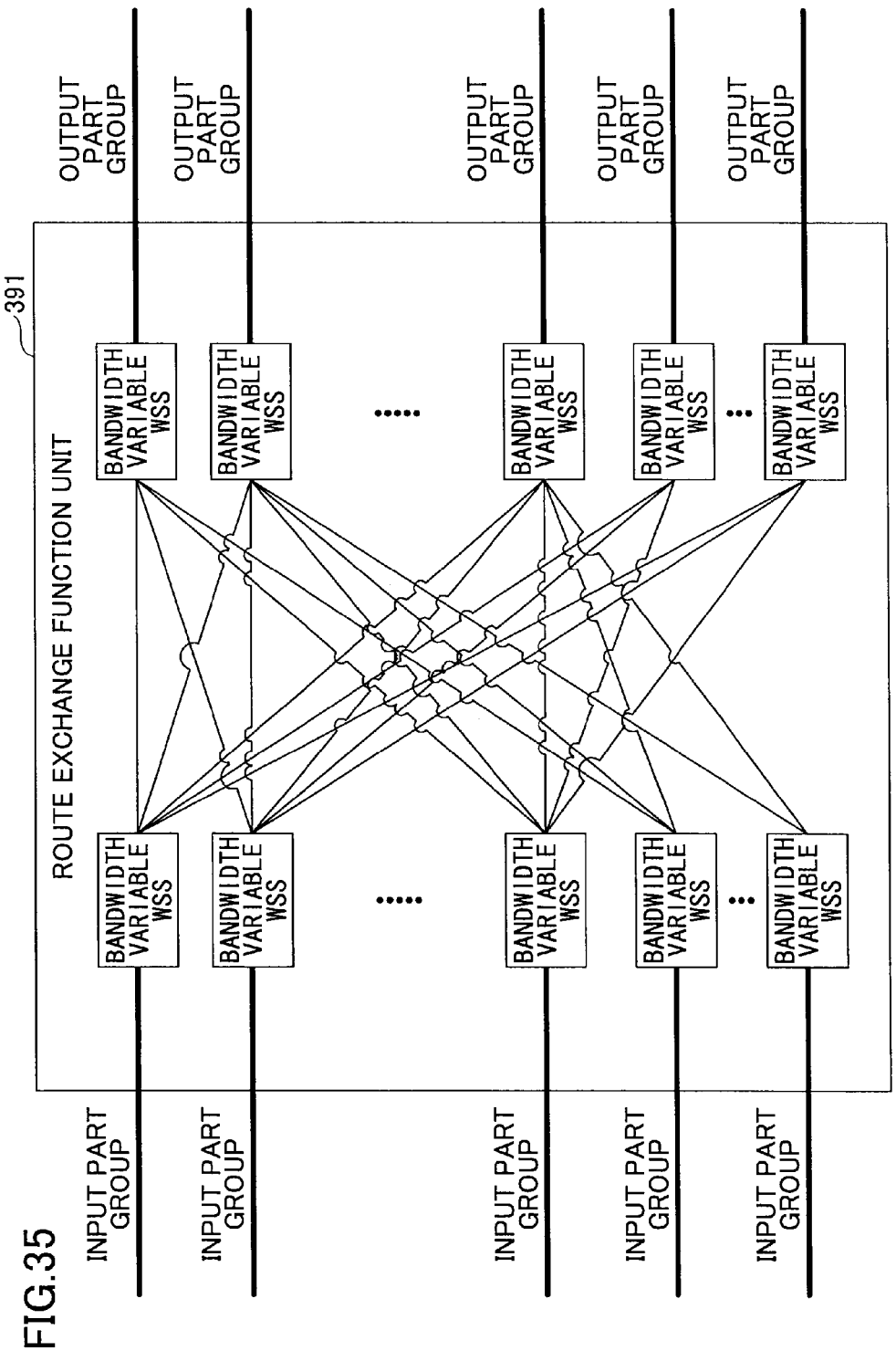
FIG. 35 is a block diagram of a route exchange function unit in the third embodiment of the present invention.
Figure 36:
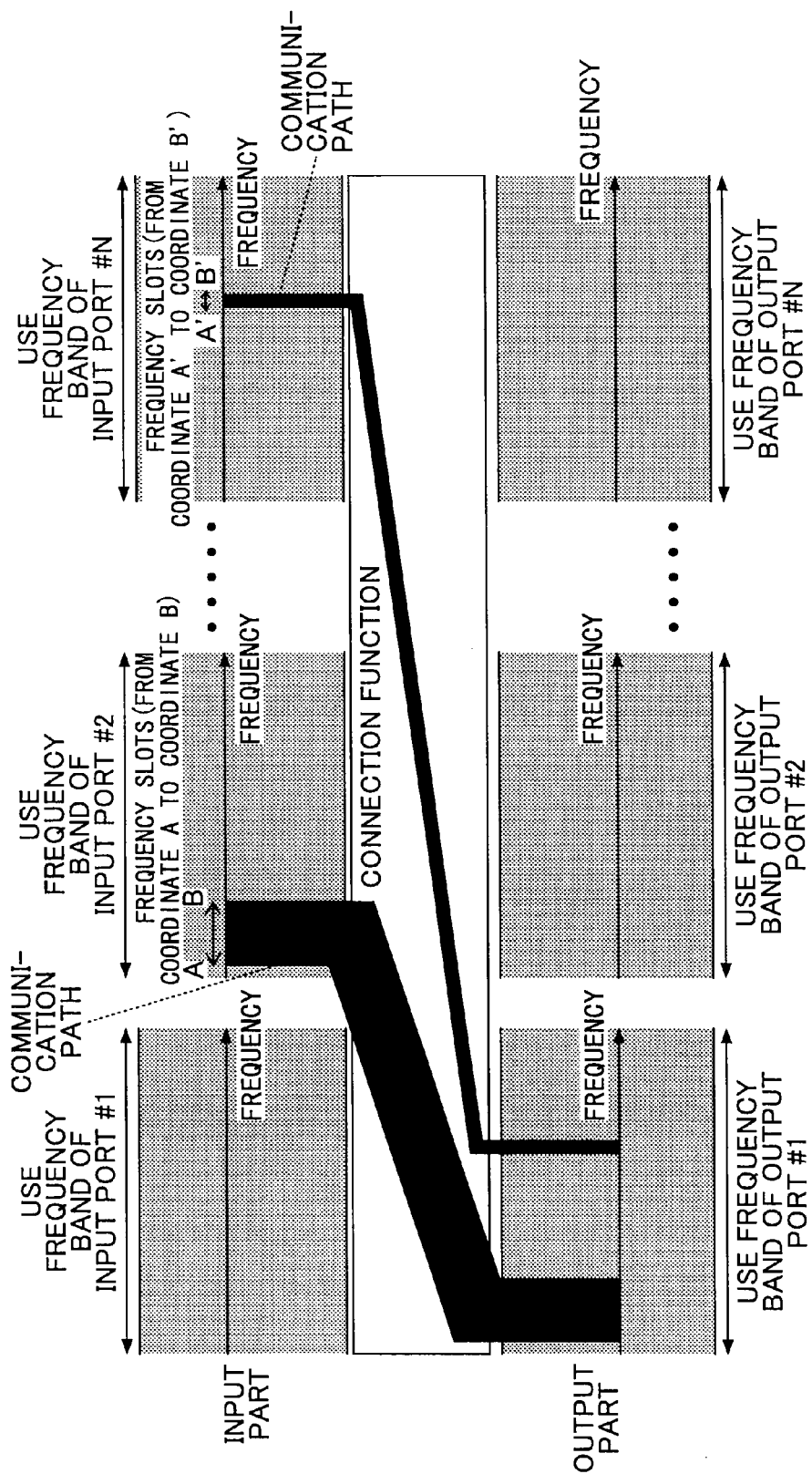
FIG. 36 is a block diagram showing a route exchange function in the third embodiment of the present invention.

On the other hand, in the route exchange function unit 391 in the node apparatus 313 in the present embodiment shown in FIG. 35, as shown in FIG. 36, a concept of an optical frequency slot is introduced in which a concept of bandwidth is added in addition to the points (absolute value) on the optical frequency axis. In the node apparatus 313 of the present embodiment, the input part and the output part of the route exchange function unit 391 are arbitrary optical frequency slots, and are identified by input/output port, coordinate information (absolute value information) on the optical frequency axis, and optical frequency bandwidth. When a bandwidth is assigned to the communication path, the communication path can be placed at any location on the optical frequency axis according to the necessary bandwidth of the communication path. When performing route exchange, an input port and an output port are connected using a designated slot (that is, absolute value information and the bandwidth information on the optical frequency axis), so that route exchange is performed. In the example of FIG. 36, an input port #2 and an output port #1 are connected using frequency slots from a coordinate A to a coordinate B, and an input port #N and an output port #1 are connected using frequency slots from a coordinate A' to a coordinate B'.

Different from the conventional route exchange method, parts for connection targets are not determined on the input port and the output port beforehand before setting a communication path, and a function is provided for adaptively selecting them according to a communication path to be set. Therefore, the number of connection targets (the number of communication paths) existing in the node apparatus 313 also changes according to a bandwidth of the communication path to be set according to circumstances. This function is different from the conventional route exchange function in which the input part and the output part are fixed irrespective of the communication path to be set. Also, it is necessary to consider the width (bandwidth) of the optical frequency slots according to the communication path to be set. Thus, a totally different mechanism is adopted in which the coordinates on the optical frequency axis for connection can be determined only after communication path information to be set is provided. When setting plural communication paths for the node apparatus 313, it is necessary to provide a communication path setting apparatus 330 including an assignment optical frequency determination function unit 333 that can arbitrary set a center optical frequency.

Figure 38:
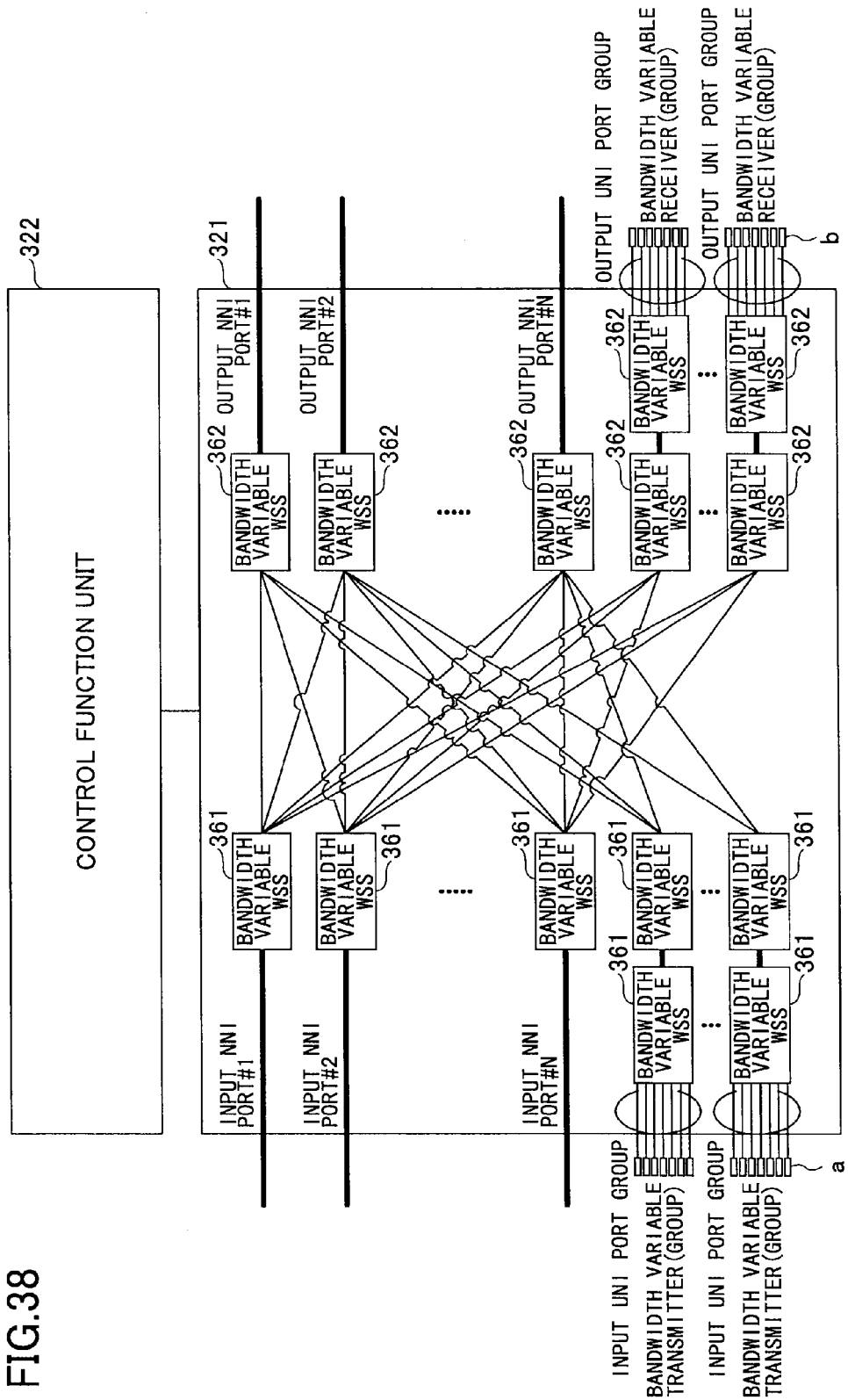
FIG. 38 is a configuration diagram of a node apparatus of the embodiment 3-1.

The node apparatus 313 used in the present embodiment realizes the route exchange function for performing route exchange in units of optical frequency slots by the following control function unit (322 in after-mentioned FIGS. 38 and 39).

The control function unit includes a function configured to control each component in the node, a function configured to receive a control message from the control apparatus 330 in the communication network, a function configured to receive communication path attribute information from the control apparatus 330 to recognize an optical frequency band (optical frequency slot) of a communication path to be set, and a function configured to connect an optical frequency slot of the input part and an optical frequency slot in the output part.

The node apparatus 313 receives a communication path connection instruction (including bandwidth information) from the control apparatus 330 of the communication network by the control function unit of the node apparatus 313, recognizes optical frequency slots of the communication path to be set from the control instruction, and generates connection relationship between the input part and the output part by the designated optical frequency slots. Accordingly, it becomes possible to flexibly accommodate different communication paths using different optical frequency bandwidths. Therefore, a superfluous guard band between channels can be eliminated, so that optical frequency use efficiency can be increased.

A procedure for path setting of the present embodiment is shown in the following.

(1) The assignment frequency determination function unit 333 of the control apparatus 330 refers to information stored in the transmission specification DB 352 and determines a use optical frequency bandwidth of the communication path to be set in consideration of information of transmission specification (route information, passing node number, bit rate and the like) of the communication path to be set (the transmission specification DB 352 stores necessary optical frequency bandwidth of necessary communication paths for each transmission specification).

(2) The optical frequency resource function unit 331 refers to available resource information of the current communication network in the optical frequency resource DB 351, and determines an optical frequency band that can be accommodated in the route required to set with the bandwidth of the communication path determined in (1), and the optical frequency band is passed to the control function unit 332.

(3) The control apparatus 330 sends a communication path connection instruction to each node apparatus 313 on the communication path route based on various communication path attribute information of the set communication path including the optical frequency bandwidth determined in the above-mentioned procedure. Each node apparatus 313 connects between an input part and an output part by the designated communication path band so as to set an end-to-end communication path.

(4) A use bandwidth is reported to the optical transmission function unit from the control function unit 332, so that the optical transmission function unit causes a transmitter to emit light using the center optical frequency of the use band.

Functions for executing the above-mentioned procedure are implemented in the control apparatus 330 of the communication network.

In the present embodiment, the transmitter has a function for arbitrary setting a center frequency of an optical signal. Thus, whatever frequency band the node apparatus sets for a communication path, an optical signal of a center frequency corresponding to the frequency bandwidth can be transmitted.

Also, the communication network of the present embodiment includes a function for setting an optimal optical frequency for the communication path by using a signal quality measurement function of the optical receiving function 312 in a node apparatus of an end point of the communication path and using an optical frequency changing function of the optical transmission function unit 311 in a node apparatus of a start point of the communication path.

In the optical signal that passes through the communication path for which the communication path bandwidth is set to the node apparatuses, variations of spectrum shape occur due to filter characteristics of the node apparatuses. The optimal center frequency of the optical communication path varies according to the passband and the shape of filters in the node apparatuses that function as a filter function. The filter characteristics of the node apparatuses are different in a subtle way according to individual devices to be used and the like. Thus, the filter characteristics are not the same for every communication path. Thus, the optical frequency of the optical signal transmitted by the optical transmission function unit 311 needs to be adjusted. When the optical frequency is largely deviated from the optimal optical frequency, it becomes a factor of quality deterioration of the optical signal. Thus, the oscillation optical frequency of the optical transmission function unit 311 is corrected (compensated) in the following procedure, so that signal transmission is performed with the optical frequency optimal to the set communication path.

(1) Communication path is set using the before-mentioned procedure.

(2) The control apparatus notifies the optical receiving function unit 312 of optical frequency correction start so as to start monitoring of optical signal quality.

(3) After the communicating path setting completes, the optical transmission function unit 311 changes the set optical frequency by a constant width (change speed) so as to shift the optical frequency step-by-step. At this time, the optical receiving function unit 312 records the measurement result of the optical signal quality in synchronization with the change of the optical frequency of the transmitter by the control apparatus 330.

(4) The optical receiving function unit 312 sends, to the control apparatus 330, an optical frequency in which the optical signal quality is the best (when being synchronized with the transmission function unit 311 using timing, timing information is sent).

(5) The control apparatus 330 reports an optical frequency by which the best signal quality is obtained to the optical transmission function unit 311, so that the optical transmission function unit 311 emits light with the reported optical frequency.

Functions for executing the above procedure are implemented in the control function unit 332 of the communication network.

Also, the present embodiment is provided with a function for changing a use optical frequency bandwidth of a communication path when the route of the communication path is changed at the time of failure restoration or obstruction transfer. For example, in the case where a failure occurs, if the route changes by failure restoration, since the transmission distance or the number of passing nodes changes, transmission specification of the communication path changes. Thus, even though transmission requirement becomes stricter after the change, the optical signal can be transmitted while maintaining signal quality by increasing the bandwidth of the communication path in each node. In this case, after the route is changed, the bandwidth of the communication path that is changed is increased (or decreased).

Also, it is possible to reserve, at the time of route change, the communication path band to be used by a communication path after the route change. In this case, it is possible to reserve only increased amount in a common part of the original route and the changed route. Accordingly, the band for reservation can be saved.

The optical frequency band indicates a band from a particular value to a particular value in optical frequency resources.

The optical frequency bandwidth indicates a width from a lower limit and an upper limit of the optical frequency band without consideration of the particular values.

By adopting the management method of the present embodiment, the gap of optical frequency between communication paths can be reduced so that optical frequency resources of the transmission route and the node apparatus can be utilized effectively.

The "node apparatus" in the present embodiment represents node apparatuses such as ROADM, OXC, optical packet exchange, optical burst exchange and the like. The route connection function of the node apparatus can be realized by WSS (Wavelength Selectable Switch) and the like that is realized by LCOS and the like. The "optical communication path" of the present embodiment indicates optical path, optical packet path, optical burst path and the like. The "transmission specification" of the present embodiment may include frequency intervals between channels, the number of passing optical switches, the number of passing optical amplifiers, and passing optical demultiplexing elements/optical multiplexing elements in addition to transmission distance, bit rate, the number of passing nodes and the like.

Embodiment 3-1

Figure 37:
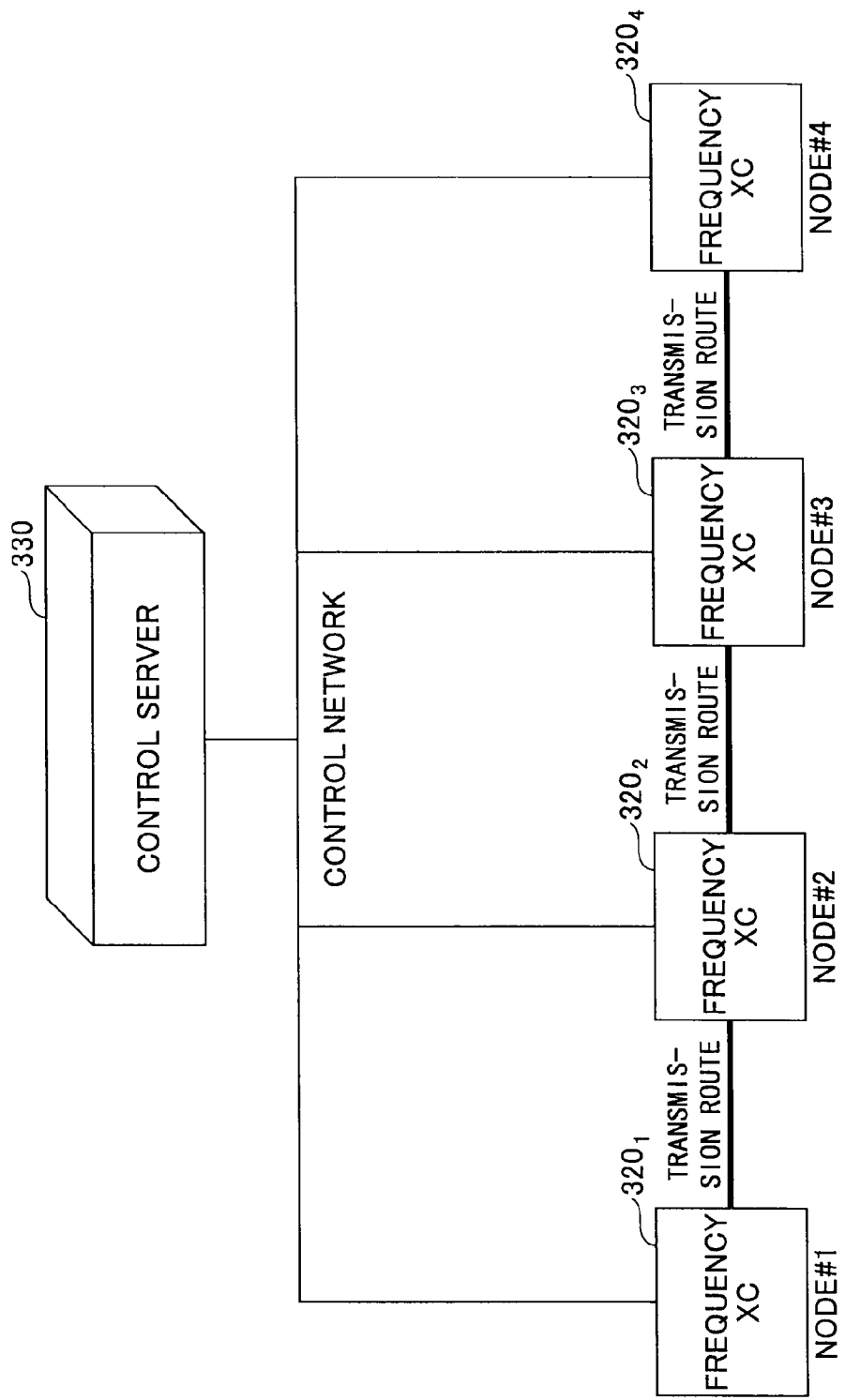
FIG. 37 is an example of a communication network in the embodiment 3-1.

FIG. 37 shows an example of a communication network in the embodiment 3-1. Optical frequency cross-connect apparatuses $320_1$~$320_4$ of 4 nodes (#1~#4) are connected to the communication network by transmission routes. The control server 330 is provided with a function for controlling the node apparatuses (#1~#4) via the control network. It is assumed that the length of each transmission route is 50 km.

FIG. 38 shows a configuration of the node apparatus of the embodiment 3-1. The node apparatus 320 includes a cross-connect unit 321 and a control function unit 322. In this example, in the node apparatus 320, the cross-connect unit 321 (route exchange function unit 391) is realized by combining plural WSSes (Wavelength Selectable Switch). An input part and an output part are determined by designating a part of the frequency band of the transmission route that becomes an input port in units of slots.

The cross-connect unit 321 is configured by connecting bandwidth variable WSSes (Wavelength Selective Switch) 361, 362 and transmission routes. The WSS 361, 362 is placed for each input NNI (Network Network Interface) port, each output NNI port, each input UNI (User Network Interface) port group, and each output UNI (User Network Interface) port group. For each UNI port group, two bandwidth variable WSSes are used.

By using multi-stage WSSes for the UNI part, color-less switching function is realized in which arbitrary wavelength can be used for each UNI port. According to this function, it is possible to prevent frequency bands from colliding in UNI when the communication path is set, so that frequency use efficiency can be improved in the UNI route.

In addition, by using the multi-stage WSSes, a directionless function is also realized in which an optical signal can be output from a UNI port to an arbitrary output route direction. By providing the directionless function, a UNI route can be shared by each output route, so that the number of UNI routes and the number of UNI ports can be decreased. In this example, a bandwidth variable WSS is used having a function for outputting an input signal to an arbitrary output port, and applying a filter to the optical frequency bandwidth of the input signal. Such a bandwidth variable WSS is realized by using an LCOS (liquid crystal on silicon). The optical frequency XC function unit 313 is realized by combining the bandwidth variable WSSes. The function of the optical frequency filter is a function essentially included in the bandwidth variable WSS. Thus, by controlling the communication path bandwidth using the optical frequency filter, the bandwidth can be controlled without using additional devices, so that the node configuration can be simplified. Also, it is possible to perform bandwidth control independently of the transmission scheme of the optical transmitter 311 to be used, so that optical signals transmitted from any optical transmitter can be processed similarly.

Also, in the node apparatus 320, the input UNI port a is connected to a bandwidth variable optical transmitter (optical transmission function unit 311 of FIG. 32) having a function configured to change a bandwidth of an optical signal to be transmitted. In addition, the output UNI port b is connected to a bandwidth variable receiver (optical receiving function unit 312 of FIG. 32) that can receive an optical signal of arbitrary bandwidth within a predetermined range. In addition, the node apparatus 320 is provided with, in the control function unit 322 of the node apparatus, a function configured to identify an optical frequency bandwidth of the communication path to be set based on a received control message and a setting file and the like, so as to be able to connect the input part and the output part with the designated optical frequency bandwidth by sending a control instruction to the bandwidth variable WSS 361, 362.

The optical frequency band of the optical signal is designated by a start point value and an end point value of an optical frequency band used in the optical communication path, or by a center optical frequency and a bandwidth.

The control server 330 that can control the whole of the communication network is implemented with the optical frequency resource management function unit 331, the optical frequency resource DB 351, the control function unit 332, the assignment frequency determination function unit 333, and the transmission specification DB 352 shown in FIG. 32.

Operation is described in a case when receiving a request for setting the following three communication path attributes for the communication network.

Communication Path #1:
Bit rate: 40 Gbps
Transmission distance: 150 km
Passing node number: 4 nodes
Route: node #1→node #2→node #3→node #4
Communication Path #2:
Bit rate: 100 Gbps
Transmission distance: 150 km
Passing node number: 4 nodes
Route: node #1→node #2→node #3→node #4
Communication Path #3:
Bit rate: 40 Gbps
Transmission distance: 50 km
Passing node number: 2 nodes
Route: node #1→node #2
<Setting of the Communication Path #1>
Information of transmission specification of the communication path #1 (bit rate: 40 Gbps, passing node number: 4 nodes, transmission distance: 150 km) is input to the control server 330.

The control server 330 refers to information stored in the transmission specification DB 352. In this case, it is assumed that a table of transmission specification information shown in FIG. 39 is managed (implementation form of the transmission specification DB 352 is not limited to a table, but may be any form). The transmission specification DB 352 has a structure in which a communication path bandwidth can be obtained using a transmission specification as a key. It is determined that bandwidth necessary for the communication path #1 is 50 GHz based on the transmission specification DB 352 and the input transmission specification information.

Next, the assignment frequency determination function unit 333 determines an optical frequency bandwidth used by the communication path to be set. Available resource information in each link of the current communication network is referred to in the optical frequency resource DB 352, so as to determine an optical frequency band that can be accommodated in the requested route with the bandwidth of the communication path determined in the previous procedure. In this case, the band of the communication network used by the communication network is 193.1 THz~194.1 THz, and the whole band is available. Thus, 193.1 Thz~193.15 THZ is determined to be an optical frequency band for the "communication path #1". The information of the use frequency band is passed to the control function unit 332. Accordingly, a communication path connection instruction including the determined optical frequency bandwidth is sent from the control server 330 to each node apparatus on the communication path route based on various communication route attribute information of the communication path to be set, so that each node apparatus 320 connects an input part and an output part with the designated communication path band to set the communication path of the node apparatus 320. In this case, in each node apparatus input and output are connected with the band (193.1 THz~193.15 THz) designated to the following bandwidth variable WSSes.

Node #1:
Two bandwidth variable WSSes at the input UNI part;
A bandwidth variable WSS connected to the output NNI port connected to a transmission route addressed to the node #2;
Node #2:
A bandwidth variable WSS connected to the input NNI port connected to a transmission route addressed to the node #1;
A bandwidth variable WSS connected to the input NNI port connected to a transmission route addressed to the node #3;
Node #3:
A bandwidth variable WSS connected to the input NNI port connected to a transmission route addressed to the node #2;
A bandwidth variable WSS connected to the input NNI port connected to a transmission route addressed to the node #4;
Node #4:
A bandwidth variable WSS connected to the input NNI port connected to a transmission route addressed to the node #3;
Two bandwidth variable WSSes connected the output UNI part;

By assigning the designated bandwidth not only to the bandwidth variable WSS at the NNI part but also to the bandwidth variable WSS at the UNI part in cooperation with the control function unit 332 of the control server 330, a communication path can set end-to-end of the communication path with an arbitrary bandwidth (in a conventional technique, a communication path bandwidth of the connection function at the UNI part is fixed).

Next, the use band (or center optical frequency) is reported, from the control function unit 332, to the optical transmitter 311 that is connected to the communication path under setting at the input UNI part of the node #1 of the start point node, so that light emission of the bandwidth variable transmitter is performed with the center frequency of the use band. Also, the set optical frequency band is reported to the bandwidth variable receiving apparatus at the output UNI part of the node #4 of the end point node, so as to measure and check whether the communication path has been set by a correct optical frequency band. The receiving apparatus 312 performs the check so that erroneous operation or abnormal operation of the communication path setting can be detected.

Also, band information used by the "communication route #1" is reported to the assignment frequency determination function unit 333, so that the optical frequency information of the optical frequency resource DB 351 is updated. In this case, the based used by the "communication route #1" is stored in the frequency resource DB 352 as a resource being used.

Next, procedure for setting the "communication path #2" in the state in which the "communication path #1" has been set is described.

<Setting of the Communication Path #2>

Information of transmission specification of the communication path #2 (bit rate: 100 Gbps, passing node number: 3 nodes, transmission distance: 100 km) is input to the control server 330. Similarly to the case of the "communication path #1", the communication path bandwidth is determined to be 100 GHz by referring to the transmission specification DB 352 (FIG. 39).

Next, the assignment frequency determination function unit 333 determines an optical frequency bandwidth used by the communication path to be set. Available resource information of the current communication network is referred to in the frequency resource DB 351, so as to determine an optical frequency band that can be accommodated in the requested route with the bandwidth of the communication path determined in the previous procedure. Since 193.1 Thz~193.15 THZ is assigned to the "communication path #1", 193.15 THz~193.25 THz is determined to be the communication path band. At this time, a guard band can be set based on guard band information registered in the assignment frequency determination unit 333 as management information beforehand. In this case, by providing necessary and sufficient guard band, crosstalk from adjacent a communication path can be reduced.

Next, the information of the determined optical frequency band is passed to the control function unit 332. Accordingly, a communication path connection instruction including the determined optical frequency band is sent from the control server 330 to each node apparatus on the communication path route based on various communication route attribute information of the communication path to be set, so that each node apparatus 320 connects an input part and an output part with the designated communication path band to set the communication path of the node apparatus 320. In this case, input and output are connected with the band (193.15 THz~193.25 THz) designated to the following bandwidth variable WSSes in each node apparatus 322.

Node #1:
Two bandwidth variable WSSes at the input UNI part;
A bandwidth variable WSS connected to the output NNI port connected to a transmission route addressed to the node #2;

Node #2:
A bandwidth variable WSS connected to the input NNI port connected to a transmission route addressed to the node #1;
A bandwidth variable WSS connected to the input NNI port connected to a transmission route addressed to the node #3;

Node #3:
A bandwidth variable WSS connected to the input NNI port connected to a transmission route addressed to the node #2;
A bandwidth variable WSS connected to the input NNI port connected to a transmission route addressed to the node #4;

Node #4:
A bandwidth variable WSS connected to the input NNI port connected to a transmission route addressed to the node #3;
Two bandwidth variable WSSes connected to the output UNI part;

Also, for the transmitter and the receiver, similar control for the "communication path #1" is performed.

Also, the management information of the frequency resource DB 351 is updated as to the band used by the "communication path #2".

As to the "communication path #3", the communication path band is determined by the similar method. The bandwidth is determined to be 25 GHz based on the values of the table of FIG. 39. It is determined to be 193.25 THz~194.00 THz in consideration of optical frequency vacancy status after "communication path #1" and "communication path #2" are set.

A control instruction is sent to each node apparatus 200, so that connection status is set as follows with the bandwidth of 193.25 THz~194.00 THz.

Node #1:
Two bandwidth variable WSSes at the input UNI part;
A bandwidth variable WSS connected to the output NNI port connected to a transmission route addressed to the node #2;

Node #2:
A bandwidth variable WSS connected to the input NNI port connected to a transmission route addressed to the node #1;
Two bandwidth variable WSSes connected the output UNI part;

Also, for the transmitter and the receiver, similar control for the "communication path #1" and "communication path #2" is performed.

Also, the management information of the frequency resource DB 351 is updated as to the band used by the "communication path #3".

As mentioned above, the communication path band to be assigned to passing nodes is variable according to the transmission specification of the communication path (transmission distance, bit rate, passing node).

Control of the node apparatuses 320 in the present embodiment can be also performed in an autonomous distributed manner using a signaling protocol such as GMPLS (RSVP-TE). In this case, the set band information (bandwidth, center optical frequency, guard band for adjacent communication path) is included in the signaling message, and the signaling message is transmitted to each node. The optical frequency band information can be included in a message of RSVP-TE by extending Label-Objet or Sender_Tspec Object (which is similar for the later-mentioned embodiments 3-2-3-5).

Embodiment 3-2

Figure 40:
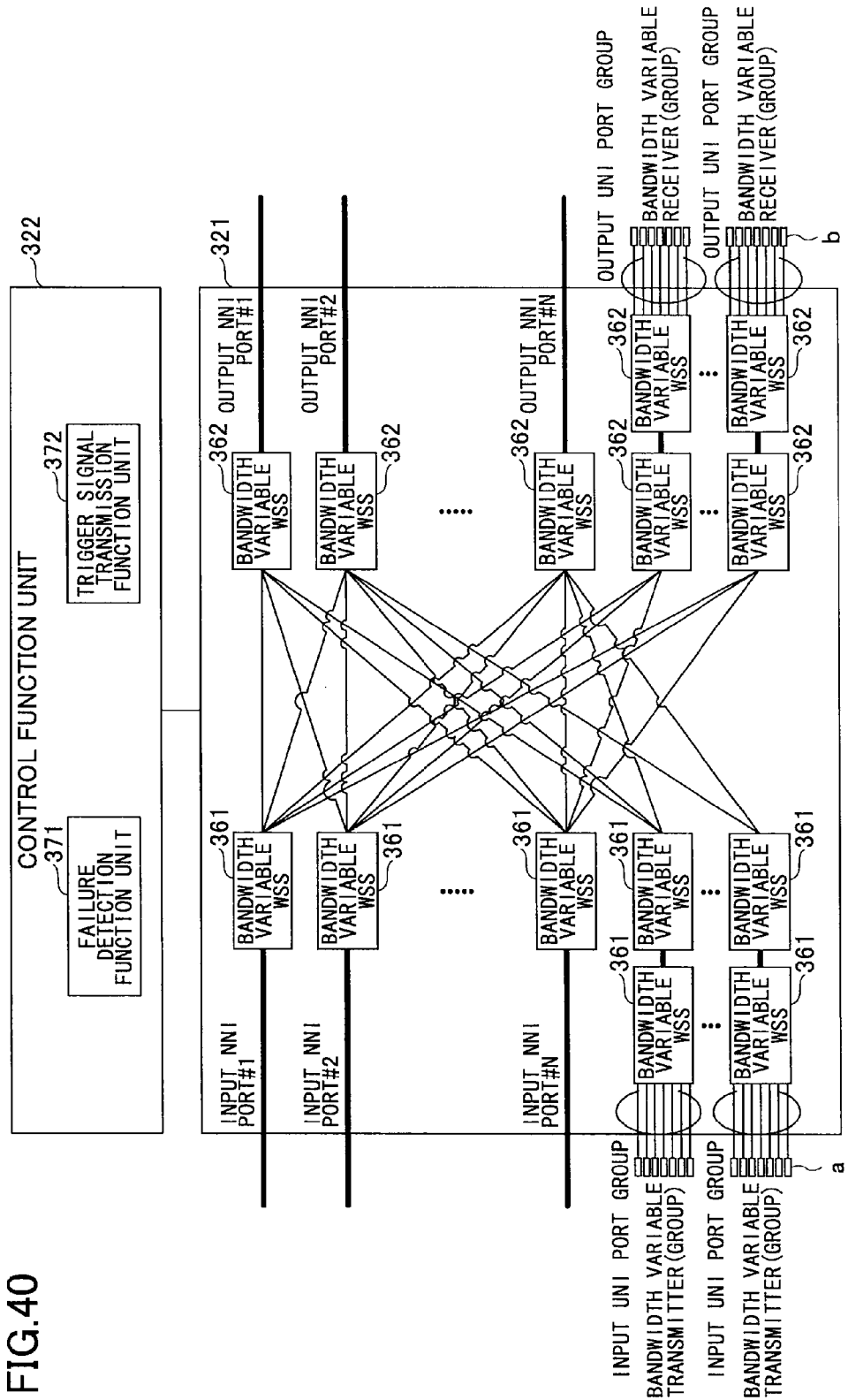
FIG. 40 shows a configuration of a node apparatus in the embodiment 3-2 of the present invention.

FIG. 40 shows a configuration of a node apparatus in the embodiment 3-2 of the present invention. In the present embodiment, the control function unit 322 of the node apparatus shown in FIG. 38 is further implemented with a failure detection function unit 371 and a trigger signal transmission function unit 372. In addition, the control server 340 is implemented with a trigger signal detection function unit 341, a detour route calculation function unit 342. Thus, communication path bandwidth can be changed according to change of requirement of optical transmission when changing the route of the communication path. Accordingly, it becomes possible to adaptively change the route of the communication path even when a failure of the communication path occurs.

In the case of the conventional technique, when the route length or the number of passing nodes is different between an active route and a standby route, transmission design is performed in conformity to a communication path for which the transmission requirement is severer (since the standby communication path is longer, the design is performed in conformity to the standby communication path). Thus, redundant resources are assigned to standby communication paths that are not used at normal times. By applying the method of the present embodiment, communication paths can be set with bandwidths suitable for requirements for each of the active communication path and the standby communication path.

Figure 41:
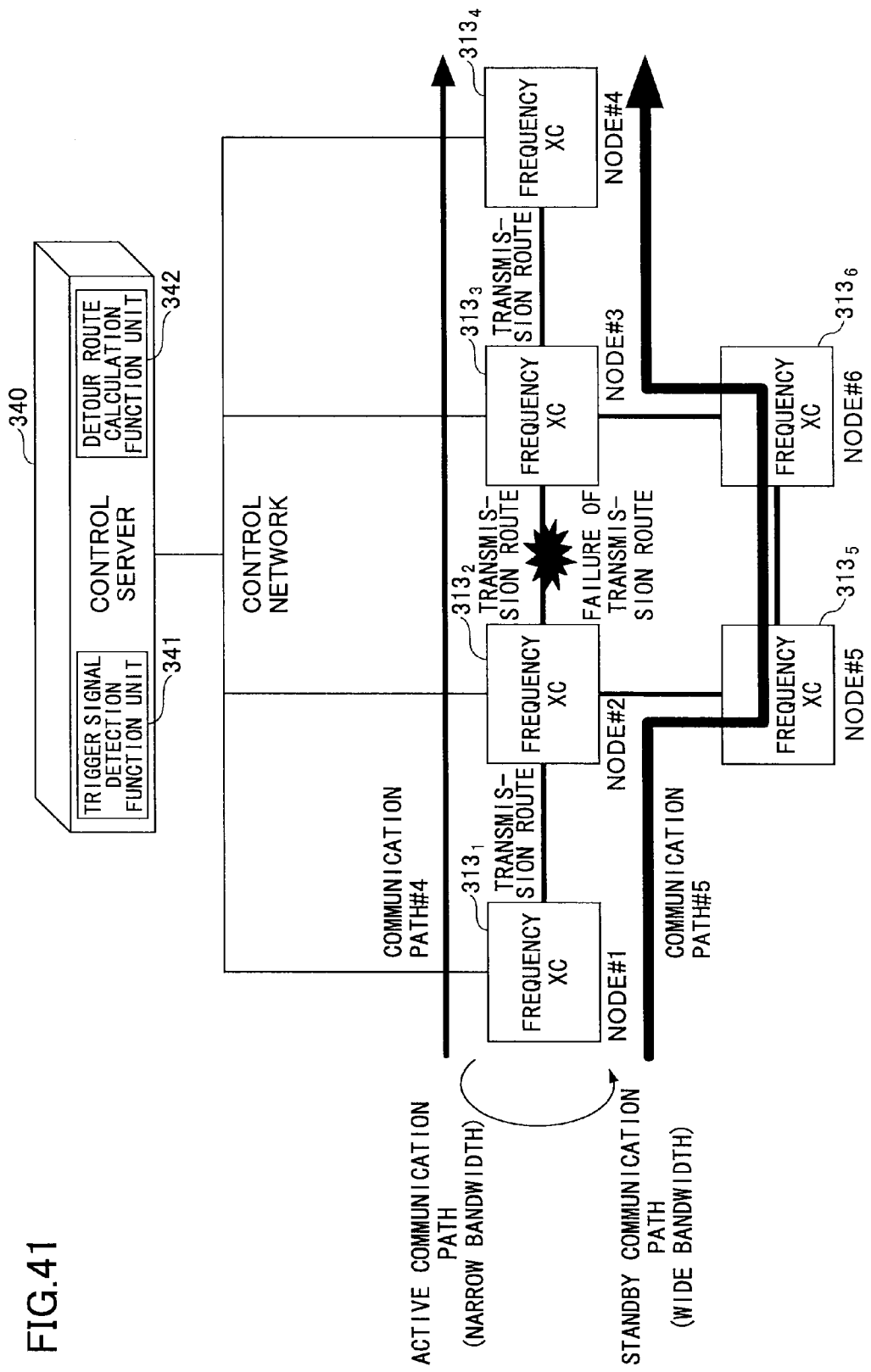
FIG. 41 is a diagram showing a configuration of the communication network in the embodiment 3-2.

FIG. 41 shows a configuration of the communication network in the embodiment 3-2. Each of the node apparatuses #1~#6 includes the configuration of FIG. 40.

The transmission specification of the communication path of the "communication path #4" is as follows.

Communication Path #4:

Bit rate: 40 Gbps

Transmission distance: 150 km

Passing node number: 4 nodes

Route: node #1→node #2→node #3→node #4

By performing the procedure shown in the first example, the control server 400 assigns a band of 193.1 THz~193.15 THz with a bandwidth of 50 GHz to the communication path #4. Also, information indicating that the communication path #4 is using the band is stored in the frequency resource DB 352. After the communication path #4 is set, when a transmission route failure occurs between the node apparatus #2 and the node apparatus #3, an optical signal cannot be received by the node apparatus #3, so that the node apparatus #3 detects the transmission route failure. When the transmission route failure occurs, the trigger signal transmission function unit 372 of the control function unit 322 of the node apparatus #3 transmits a trigger signal, to the control server 340, including information of a failed part. The trigger signal detection function unit 341 of the control server 340 receives the trigger signal, and a detour route calculation function unit 342 determines a route of a communication path that detours around the failure part. In this example, a route of node #1→node #2→node #5→node #6→node #3→node #4 is determined to be the detour route. A communication path set on the detour route is referred to as "communication path #5". The transmission specification of the communication path of "communication path #5" is as follows.

Communication Path #5:

Bit rate: 40 Gbps

Transmission distance: 250 km

Passing node number: 6 nodes

Route: node #1→node #2→node #5→node #6→node #3→node #4

The assignment frequency determination function unit 333 of the control server 340 refers to information stored in the transmission specification DB 351 (storing data of FIG. 39). The bandwidth necessary for the "communication path #5" is determined to be 100 GHz from the transmission specification DB 351. Next, the assignment frequency determination function unit 333 of the control server 340 determines a use optical frequency bandwidth of the communication path to be set, and the detour route calculation function unit 342 sets the communication path of the detour route. At this time, the control function unit 332 reports, to the assignment frequency determination function unit 333, information indicating that this communication path is tied to the active communication path (communication path #4, in this case) as a detour communication path of the active communication path (for example, this information is reported after the detour route is determined). In the case of setting the detour communication path, for parts where the route is common for both of the detour communication path and the active path, use band is determined for each of input part and output part for each node such that only increased band that is used by the active communication path (communication path #4) is newly added, and optical frequency resources of the common route are diverted to the detour communication path. By only setting the increased optical frequency band for the route common part, the optical frequency use amount can be decreased. Also, the transmitter and the receiver the same as those for the active communication path can be used.

In this case, as for the part for which the route is common to the "communication path #4", up to 193.15 THz~193.20 THz can be used as the added band. As for the part where the route is not common with the "communication path #4", the band of 193.10 THz~193.20 THz is used.

The control function unit 332 of the communication network transmits a control instruction, so as to make settings for each node as follows.

Node #1:

The band of 193.15 THz~193.20 THz is set to two bandwidth variable WSSes at the input UNI part;

The band of 193.15 THz~193.20 THz is set to a bandwidth variable WSS connected to the output NNI port connected to a transmission route addressed to the node #2;

Node #2:

The bandwidth of 193.15 THz~193.20 THz is set to a bandwidth variable WSS connected to the input NNI port connected to a transmission route addressed to the node #1;

The band of 193.10 THz~193.20 THz is set to a bandwidth variable WSS connected to the input NNI port connected to a transmission route addressed to the node #5;

Node #5:

The band of 193.10 THz~193.20 THz is set to a bandwidth variable WSS connected to the input NNI port connected to a transmission route addressed to the node #2;

The band of 193.10 THz~193.20 THz is set to a bandwidth variable WSS connected to the input NNI port connected to a transmission route addressed to the node #6;

Node #6:

The band of 193.10 THz~193.20 THz is set to a bandwidth variable WSS connected to the input NNI port connected to a transmission route addressed to the node #5;

The band of 193.10 THz~193.20 THz is set to a bandwidth variable WSS connected to the input NNI port connected to a transmission route addressed to the node #3;

Node #3:

The band of 193.10 THz~193.20 THz is set to a bandwidth variable WSS connected to the input NNI port connected to a transmission route addressed to the node #6;

The band of 193.15 THz~193.20 THz is set to a bandwidth variable WSS connected to the input NNI port connected to a transmission route addressed to the node #4;

Node #4:

The bandwidth of 193.15 THz~193.20 THz is set to a bandwidth variable WSS connected to the input NNI port connected to a transmission route addressed to the node #3;

The band of 193.15 THz~193.20 THz is set to two bandwidth variable WSSes at the output UNI part.

After setting of communication path connection in the node apparatus 320, the control function unit 332 of the control server 340 calculates a center optical frequency of the band of the communication path (communication path #5) after the route is changed. The control function unit 332 of the control server 340 transmits a control instruction to the transmitter and the receiver so that the following control is performed.

The center optical frequency of the "communication path #5" is reported to the transmitter connected to the "communication path #5" in the node #1 that is a start point node of the "communication path #5", so as to change the center optical frequency of transmission light from the center optical frequency (193.125 THz) of the "communication path #4" to the center optical frequency (193.15 THz) of the "communication path #5".

The center optical frequency of the "communication path #5" is reported to the receiver connected to the "communication path #5" in the node #4 that is the end point node of the "communication path #5", so that the receiver performs monitoring to check whether assumed optical frequency is received.

By changing the center optical frequency with route change, it becomes possible to transmit signals with optimal optical frequency while suppressing deterioration even after route change.

Also, it is possible to determine the route of the detour communication path and the optical frequency band, and set them in the control server 340 beforehand. Accordingly, it becomes possible that an operator can operate the network by explicitly designating the detour route and the band.

Further, it is also possible to reserve an optical frequency band necessary for the detour communication path beforehand. In this case, the control function unit 332 of the control server 340 sends a band reservation message to each node apparatus 320 for an optical frequency band to be reserved, so that the control function unit 322 of the node apparatus 320 stores the optical frequency band as reservation information. Accordingly, it becomes possible to avoid consumption of an optical frequency band necessary for the detour communication path when other communication path is set.

When reserving the "communication path #5", the control server 400 performs the following processing after the "communication path #4" is set.

Node #1:

Reserve the band of 193.15 THz~193.20 THz to two bandwidth variable WSSes at the input UNI part;

Reserve the band of 193.15 THz~193.20 THz to a bandwidth variable WSS connected to the output NNI port connected to a transmission route addressed to the node #2;

Node #2:

Reserve the band of 193.15 THz~193.20 THz to a bandwidth variable WSS connected to the input NNI port connected to a transmission route addressed to the node #1;

Reserve the band of 193.10 THz~193.20 THz to a bandwidth variable WSS connected to the input NNI port connected to a transmission route addressed to the node #5;

Node #5:

Reserve the band of 193.10 THz~193.20 THz to a bandwidth variable WSS connected to the input NNI port connected to a transmission route addressed to the node #2;

Reserve the band of 193.10 THz~193.20 THz to a bandwidth variable WSS connected to the input NNI port connected to a transmission route addressed to the node #6;

Node #6:

Reserve the band of 193.10 THz~193.20 THz to a bandwidth variable WSS connected to the input NNI port connected to a transmission route addressed to the node #5;

Reserve the band of 193.10 THz~193.20 THz to a bandwidth variable WSS connected to the input NNI port connected to a transmission route addressed to the node #3;

Node #3:

Reserve the band of 193.10 THz~193.20 THz to a bandwidth variable WSS connected to the input NNI port connected to a transmission route addressed to the node #6;

Reserve the band of 193.15 THz~193.20 THz to a bandwidth variable WSS connected to the input NNI port connected to a transmission route addressed to the node #4;

Node #4:

Reserve the band of 193.15 THz~193.20 THz to a bandwidth variable WSS connected to the input NNI port connected to a transmission route addressed to the node #3;

Reserve the band of 193.15 THz~193.20 THz to two bandwidth variable WSSes at the output UNI part.

In the case when the reserved band is necessary due to failure and the like, an optical frequency assignment instruction for assigning the reserved band is transmitted to each node, so that the band of the detour communication route is ensured.

Embodiment 3-3

In the present embodiment, similarly to the switching method for changing filter width in the before-mentioned embodiment 3-2, the modulation scheme of the optical transmitter can be also changed according to the route length or the number of hops of the standby path.

Figure 42:
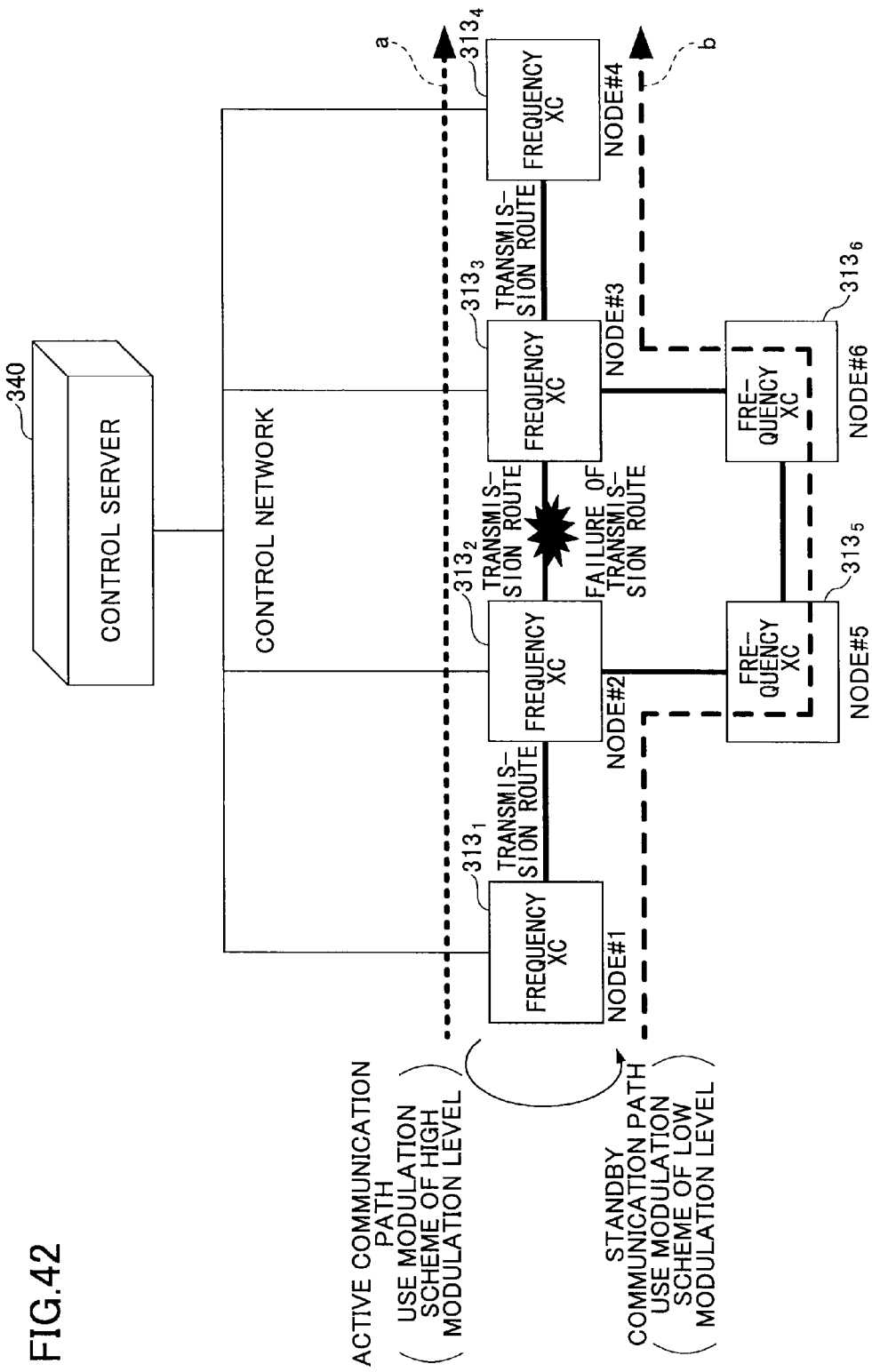
FIG. 42 is a diagram showing a configuration of the communication network in the embodiment 3-3.

FIG. 42 shows a configuration of the communication network in the embodiment 3-3 of the present invention.

For example, the smaller the modulation level of the modulation scheme is, the more the resistance against the transmission deterioration increases so that the optical signal can be transmitted longer distance. For example, the active path a is transmitted using 16 QAM (Quadrature Amplitude Modulation) as the transmission scheme, then, the modulation scheme is changed to DP-QPSK (Dual Polarization Quadrature Phase Shift Keying) when the active path a is switched to a standby path b. By changing the modulation scheme, even though the optical route increases due to the switch to the standby path b, transmission is available while suppressing the optical signal deterioration. In this case, an instruction for changing the modulation scheme is transmitted to the optical transmitter being triggered by failure information detected by the node apparatus 313 or a trigger signal such as a switch instruction and the like by an operator, so that the modulation scheme to be used in the optical transmitter is changed.

This can be combined with the change of the filter width of the embodiment 3-2, so that the bandwidth can be determined in consideration of a bandwidth required for the modulation scheme and the filtering penalty.

Embodiment 3-4

Similarly to the switching method for changing the filter width in the before-mentioned embodiment, this embodiment makes it possible to apply parallel transmission of OVC (Optical Virtual Concatenation) or MLD (Molecular Layer Deposition) scheme described in ITU-T Recommendation G.709 according to the route length and the number of hops of the standby path.

Figure 43:
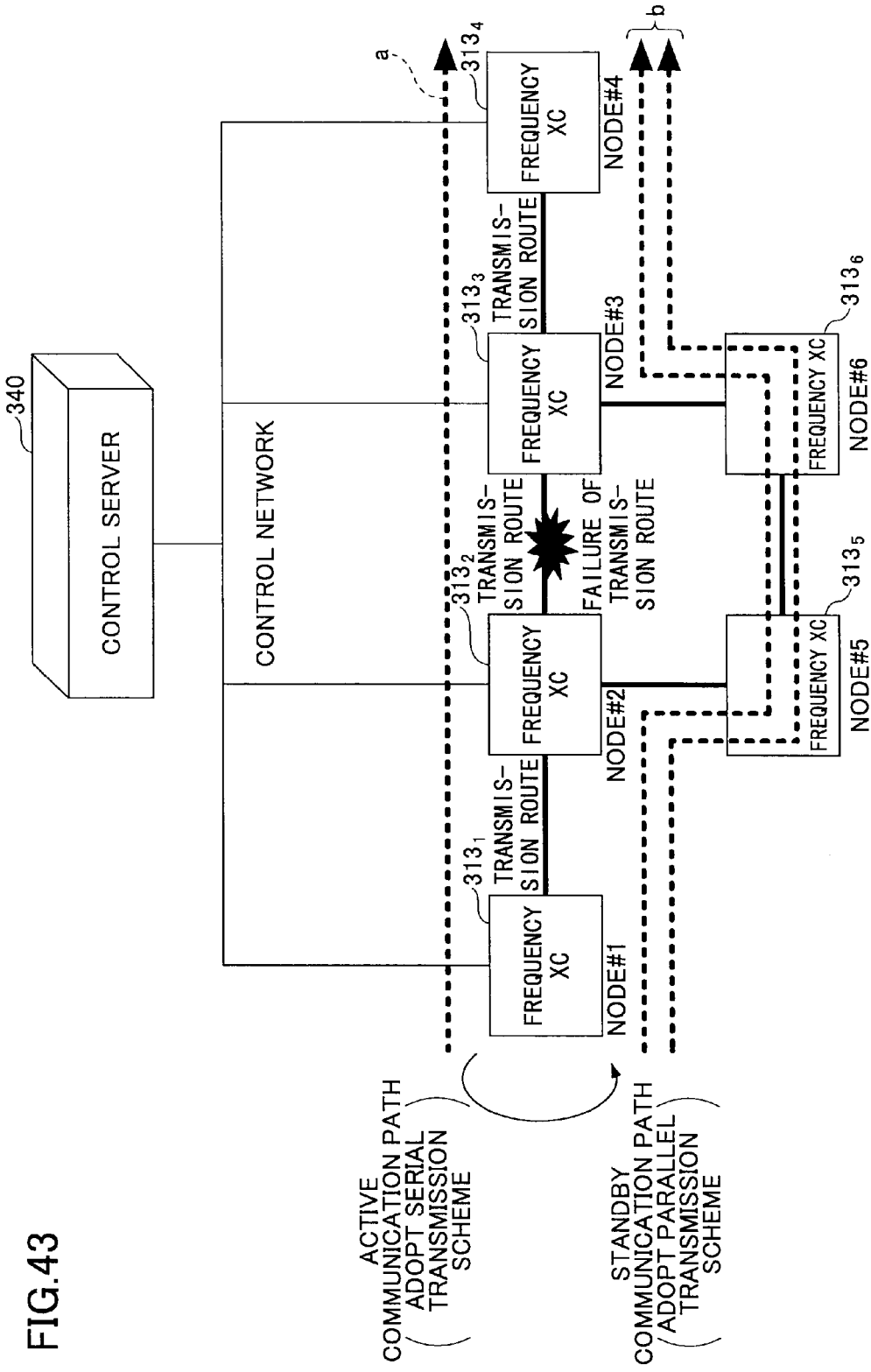
FIG. 43 is a diagram showing a configuration of the communication network in the embodiment 3-4.

FIG. 43 shows a configuration of the communication network in the embodiment 3-4.

For example, it is assumed that the active path a can be transmitted by one transmission path with a bit rate of 100 Gbps and a bandwidth of 75 GHz, and that, since the route of the standby communication path b has a long transmission distance, the standby path b cannot be transmitted by 75 GHz/100 Gbps. Further, it is assumed that, in the route b of the standby communication path, transmission with a bandwidth of 50 GHz and a bit rate of 50 Gbps is available.

In this case, when transmission is performed by switching to the standby communication path b, two transmitters are used each of which can realize equal to or greater than 50 Gbps with a bandwidth of 50 GHz by utilizing OVC or MLD, so that two communication paths each having the bandwidth of 50 GHz and the bit rate of 50 Gbps can be used as a communication path having a bit rate of 100 Gbps effectively.

Being triggered by failure information detected by the node apparatus 313 or a trigger signal such as the switch instruction and the like by the operator, the active communication path a is switched to the standby communication path b, and at the same time, the transmission scheme is changed from the serial transmission to the parallel transmission.

The similar scheme can be also realized by a method in which parallel transmission is applied to the active communication path a and the number of lanes for the parallel transmission is increased.

Similarly to the bandwidth variable method of the first example, the method for increasing the lanes in the parallel transmission according to the transmission specification can be also applied to setting of the active communication path by using a database storing correspondence between required specification and the number of lanes of the parallel transmission, instead of the transmission specification database 352 of the embodiment 3-1.

Embodiment 3-5

In the present embodiment, it becomes possible to cause the transmitter to emit light with an optical frequency optimal for the set communication path by the following function.

Figure 44:
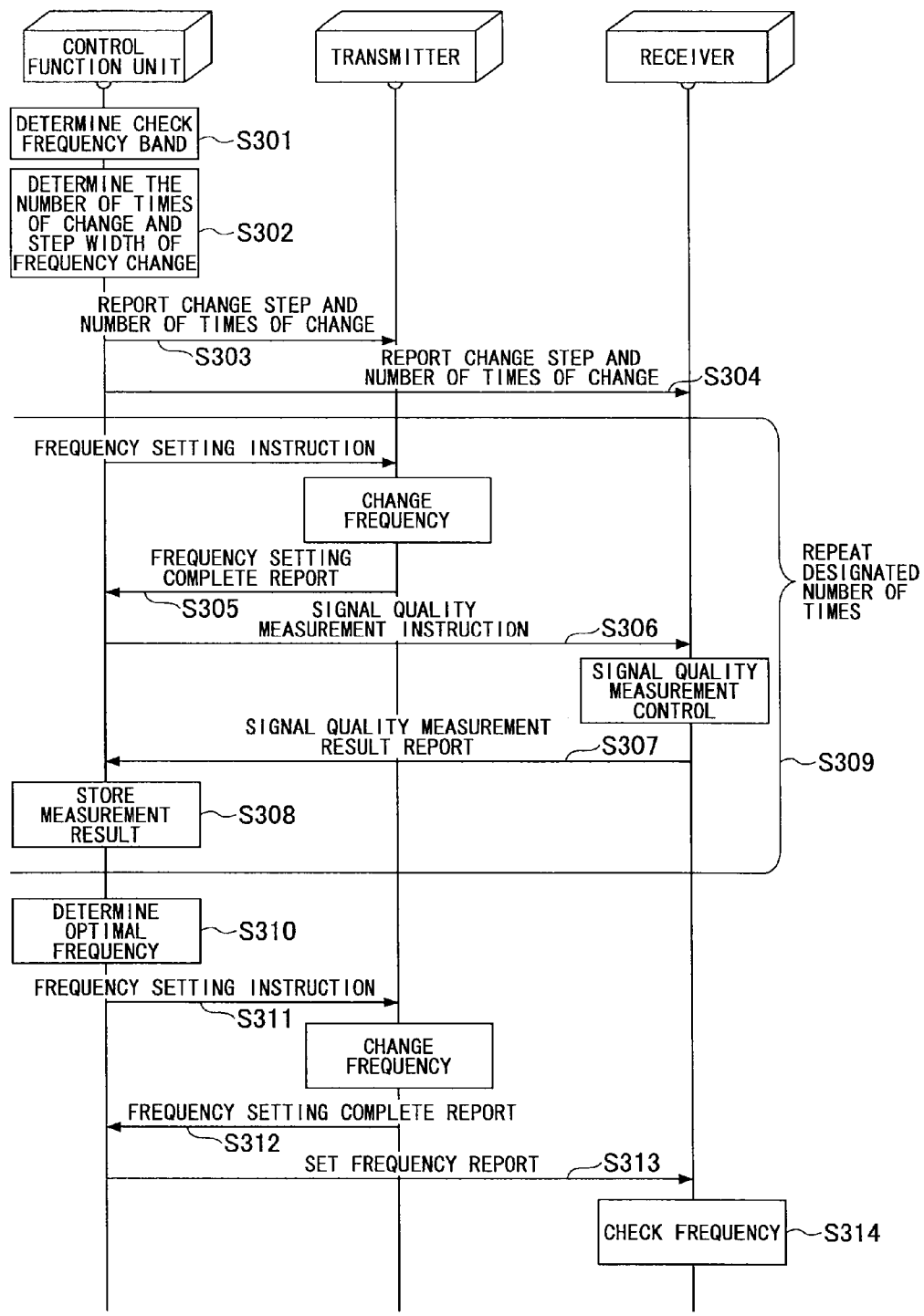
FIG. 44 is a sequence chart (1) showing a series of procedures in the embodiment 3-5.

FIG. 44 is a sequence chart showing a series of procedures in the embodiment 3-5.

The control function unit of the communication network, the transmitter and the receiver cooperate with each other so that the present function can be realized. Although not shown in the figure, transmission of a control instruction to the transmitter and the receiver is performed via the control function unit 322 of the node apparatus 313. The optimal optical frequency is determined by measuring quality while changing the optical frequency of the optical signal of the transmitter with a predetermined step.

In the following, the operation is described with reference to the sequence chart of FIG. 44.

Step 301) The control function unit 322 of the node apparatus 313 determines a search band where the optimal optical frequency is searched. For example, the search band can be set as a band the same as the band of the communication path.

Step 302) The control function unit 322 determines a change step and the number of change times, the change step being a change width by which the optical frequency is changed within the predetermined search range.

Step 303) The control function unit 322 reports the change step and the number of change times to the transmitter and the receiver.

Step 304) The control function unit 322 transmits an optical frequency setting instruction to the transmitter with an optical frequency used in the first change step.

Step 305) The optical frequency in the transmitter is changed to the designated optical frequency, and the transmitter transmits an optical frequency setting complete report to the control function unit 322 of the node apparatus 313.

Step 306) A signal quality measurement instruction is transmitted from the control function unit 322 to the receiver.

Step 307) The receiver measures the signal quality so that the measured signal quality is reported to the control function unit 322.

Step 308) The control function unit 322 stores the signal quality received from the receiver in association with check optical frequency information.

Step 309) The procedure similar to steps 304-308 for changing the optical frequency with the predetermined change step is repeated predetermined number of times.

Step 310) The control function unit 322 determines an optical frequency by which the best signal quality is obtained based on the stored measurement results.

Step 311) The control function unit 322 transmits an optical frequency setting instruction to the transmitter with the optimal optical frequency.

Step 312) The transmitter changes the optical frequency of the optical signal to the optimal optical frequency, and transmits an optical frequency setting complete report to the control apparatus.

Step 313) The control function unit 322 reports the set optical frequency to the receiver.

Step 314) The receiver checks the set optical frequency.

Figure 45:
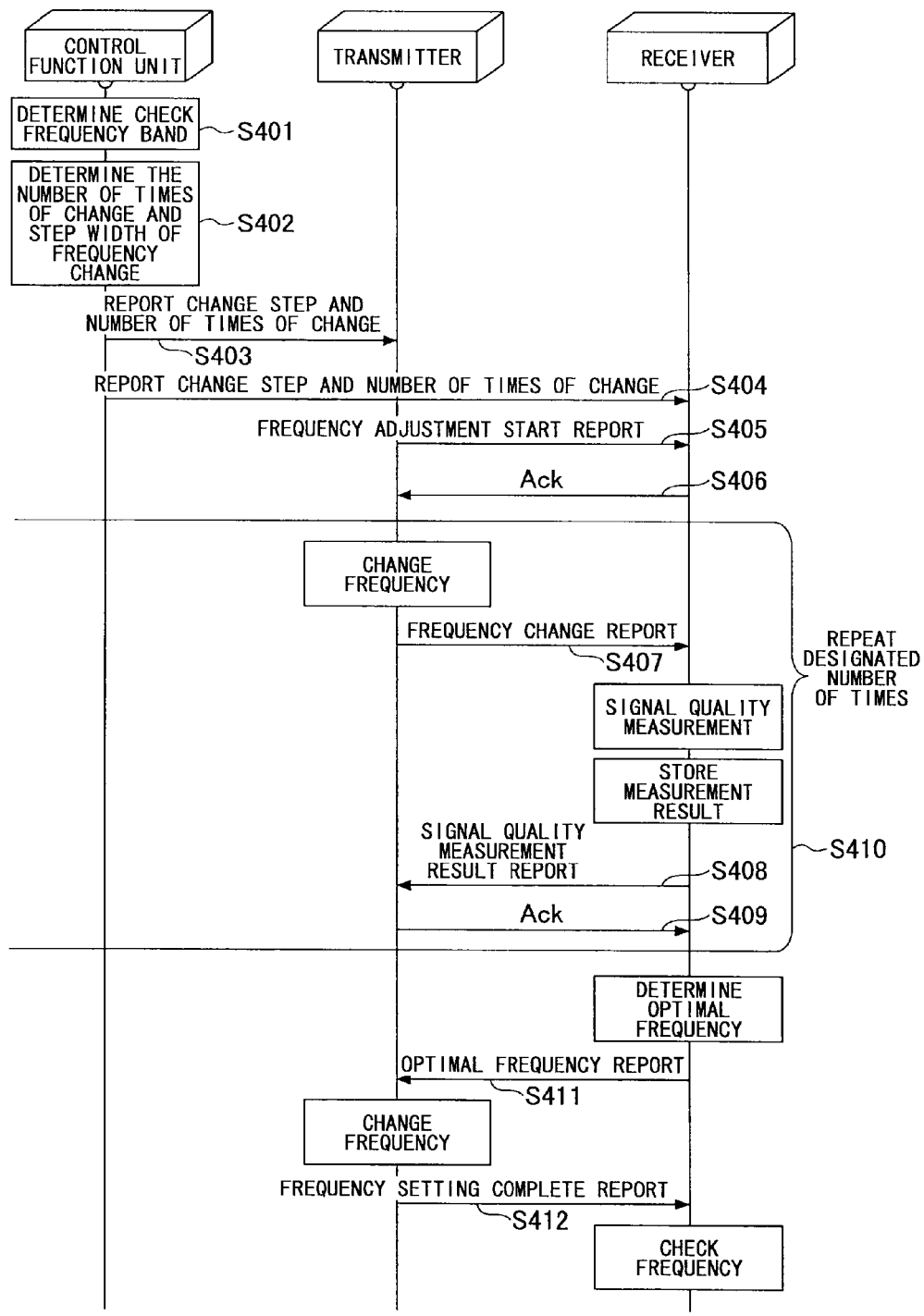
FIG. 45 is a sequence chart (2) showing a series of procedures in the embodiment 3-5.

As shown in FIG. 45, the start point node and the end point node may control the transmitter and the receiver in an autonomous distributed manner so as to carry out the above-mentioned function. In the case of the autonomous distributed manner, load of the communication network management system can be reduced. This procedure is described as follows.

Step 401-Step 404) The procedure of these steps is similar to steps 301-304 of FIG. 44.

Step 405) An optical frequency adjustment start report is sent from the transmitter to the receiver.

Step 406) The receiver returns an acknowledgement message (Ack) to the transmitter.

Step 407) The transmitter changes the optical frequency with a value of the determined optical frequency change step, and transmits the newly set optical frequency information to the receiver.

Step 408) The receiver performs signal quality measurement, stores the measurement result in association with the optical frequency information reported from the transmitter (store in the control function unit of the node apparatus).

When the measurement of the signal quality completes, the receiver transmits a signal quality measurement complete report to the transmitter.

Step 409) The transmitter that received the signal quality measurement complete report transmits an acknowledgement message (Ack) to the receiver.

Step 410) The procedure similar to steps 407-409 for changing the optical frequency with the predetermined change step is repeated predetermined number times.

Step 411) The receiver determines an optical frequency by which the best signal quality is obtained based on the stored measurement results, and reports the optical frequency to the transmitter.

Step 412) The transmitter changes the optical frequency to the reported optical frequency, and transmits an optical frequency setting complete report to the receiver.

Step 413) The receiver checks whether the optical frequency is set in conformity with the setting value.

Also, such an optical frequency adjustment function can be applied when the route is dynamically changed after failure occurs, and in the case where transmission characteristics of the communication path change due to performance deterioration of devices.

Embodiment 3-6

Figure 46:
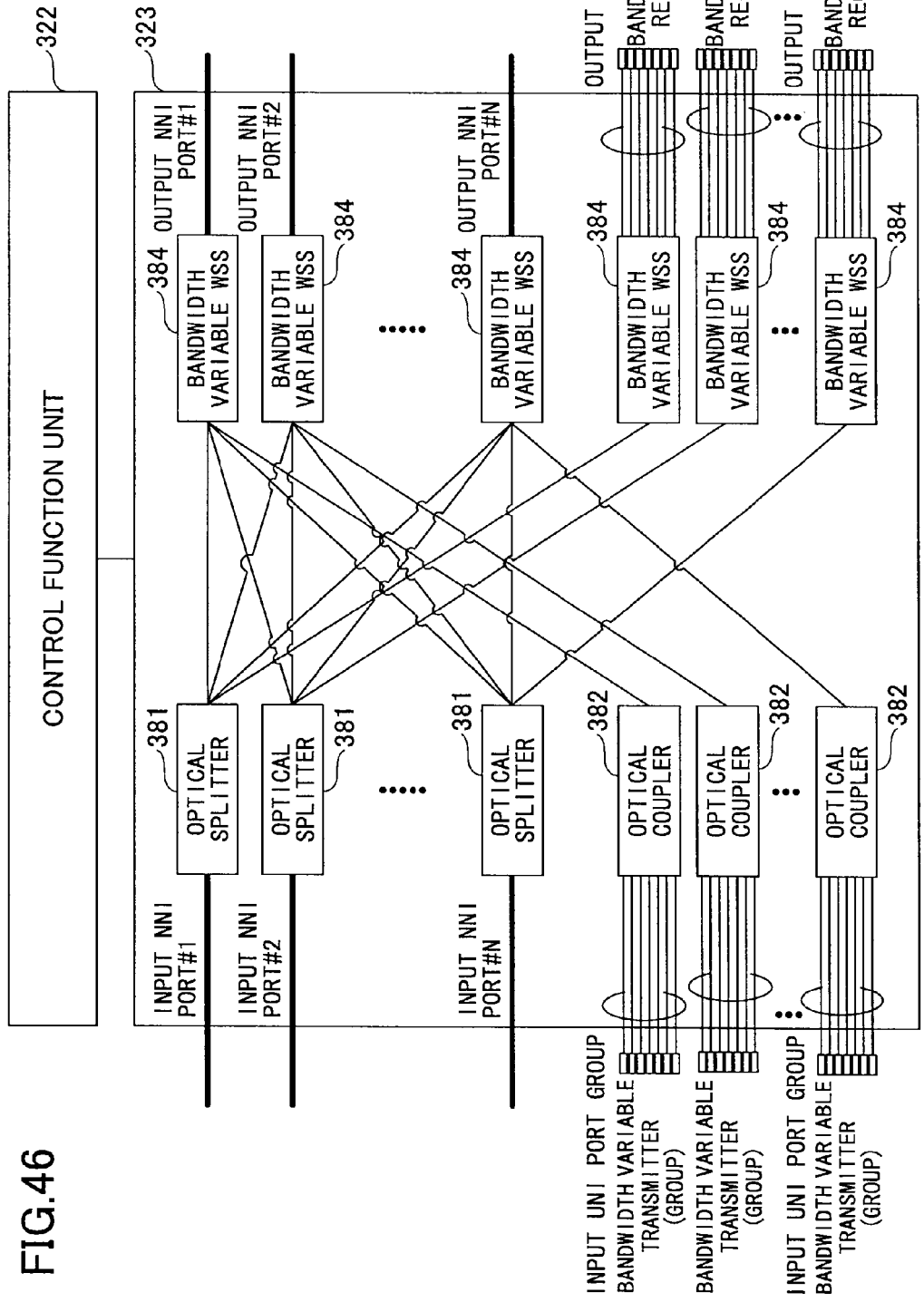
FIG. 46 is a block diagram of a node apparatus in the embodiment 3-6.

The similar processes of the embodiments 3-1~3-5 can be performed using the node of FIG. 46. When using the node, the optical splitter 381 and the optical coupler 382 do not perform active control for the communication path band, but outputs the communication path with a band the same as the band of the input communication path (there may be a case where an error may occur due to elements).

The operation of configuration components of the control apparatus (control server) and the node apparatus in the embodiments 3-1~3-6 can be constructed as a program, so that the program can be installed in a computer used as the control apparatus or the node apparatus, or the program can be distributed via a network. That is, each of the control apparatus (control server) and the node apparatus can be realized by causing a computer to execute the program.

Also, the constructed program can be stored in a portable recording medium such as a hard disk, flexible disk and a CD-ROM, so that the program can be installed in a computer or can be distributed.

The present invention is not limited to the specifically disclosed embodiments, and variations and modifications may be made without departing from the scope of the claims.

The present international application claims priority based on Japanese patent application No. 2009-212148 filed on Sep. 14, 2009, Japanese patent application No. 2010-066826 filed on Mar. 23, 2010, and Japanese patent application No. 2010-068796 filed on Mar. 24, 2010, and the entire contents of the applications No. 2009-212148, No. 2010-066826 and No. 2010-068796 are incorporated herein by reference.

DESCRIPTION OF REFERENCE SIGNS 101-108 bandwidth variable communication apparatus
109 network management apparatus
111 bandwidth variable transmission unit
112 bandwidth variable receiving unit
113 bandwidth variable route exchange unit
114 optical amplifier
115 control unit
191 optical signal quality deterioration amount obtaining unit
192 modulation format selection unit
193 control message exchange unit
201 optical transmission apparatus
202 optical receiving apparatus
210 node apparatus
211 modulation level/bandwidth variable optical transmission function unit
212 modulation level/bandwidth variable optical receiving function unit
213 bandwidth variable exchange function unit
214 control unit
215, 216 optical amplifier
220 optical communication path setting system
221 transmission information database
222 pass bandwidth/modulation scheme determination function unit
223 control part, control function unit
311 optical transmission function unit
312 optical receiving function unit
313 optical frequency assignment cross-connect (XC) function unit
391 route exchange function unit
320 frequency XC function unit (node apparatus)
361 bandwidth variable WSS
362 bandwidth variable WSS
321 optical cross connect
322 control function unit
371 failure detection unit
372 trigger signal transmission function unit
330 control apparatus
351 optical frequency resource DB
352 transmission specification DB
331 optical frequency resource management function unit
332 control function unit
333 assignment frequency determination function unit
340 control server
341 trigger signal detection function unit
342 detour route calculation function unit

The invention claimed is:

1. A bandwidth variable communication method in an optical path network, in which communication apparatuses are connected by optical transmission, that includes a network management apparatus having a function for setting and managing an optical path,
the method being performed by the network management apparatus, or by the network management apparatus and the communication apparatus when the network management apparatus sets or changes an optical path that passes through plural communication apparatuses, the method comprising:
an optical signal quality deterioration amount obtaining step of obtaining an optical signal quality deterioration amount in a route of the optical path;
a modulation format selection step of selecting a modulation format in which a spectrum bandwidth is the narrowest from among modulation formats by which transmission is available on conditions of the optical signal quality deterioration amount and a desired bit rate B (bit/s);
a control message exchange step of exchanging control information for controlling a transmission unit, a receiving unit and a route exchange unit in the communication apparatus based on a selection result in the modulation format selection step, the control information being exchanged between the network management apparatus and a control unit of each communication apparatus on the optical path route;

an optical signal transmission step of generating and transmitting the optical signal of the selected modulation format and of the bit rate B (bit/s) based on the control information received by the control unit in the control message exchange step, the optical signal transmission step being performed by the transmission unit of a communication apparatus of a start point of the optical path;

a route exchange step of switching an output port of the optical path by the route exchange unit of the communication apparatuses in a section through which the optical path passes;

a bandwidth change step of changing a passband of the route exchange unit based on the control information; and an optical path receiving step of receiving the optical path of the selected modulation format and of the bit rate B (bit/s) in the receiving unit of the communication apparatus in an end point of the optical path.

2. The bandwidth variable communication method as claimed in claim 1, the modulation format selection step comprising:

selecting a combination of a modulation level M and a symbol rate SR that satisfies B=M×SR by using a modulation format corresponding to M multi-level modulation of optical phase, optical strength or both of the optical phase and the optical strength with a symbol rate SR (bit/s) in a single carrier.

3. The bandwidth variable communication method as claimed in claim 2, the modulation format selection step comprising:

selecting the combination of the modulation level M and the symbol rate SR that satisfies B=M×SR×2 by further using polarized wave multiplexing.

4. The bandwidth variable communication method as claimed in claim 1, the modulation format selection step comprising:

selecting a combination of the number N of subcarriers and a modulation level M that satisfies B=N×M×SR by using a modulation format corresponding to M multi-level modulation of optical phase, optical strength or both of the optical phase and the optical strength with an orthogonal frequency division multiplexing signal of N subcarriers and a symbol rate SR (bit/s) for each subcarrier.

5. The bandwidth variable communication method as claimed in claim 4, the modulation format selection step comprising:

selecting the combination of the number N of subcarriers and the modulation level M that satisfies B=N×M×SR×2 by further using polarized wave multiplexing.

6. A bandwidth variable communication apparatus that is placed on a route of a link connecting between client apparatuses of a start point and an end point and that includes a function for transmitting, receiving and route-exchanging for an optical signal, the bandwidth variable communication apparatus comprising:

a transmission unit configured to generate and transmit an optical path of a desired bit rate B (bit/s);

a receiving unit configured to receive an optical path of a desired bit rate B (bit/s);

a control unit configured to receive a control signal from an external management apparatus to control the transmission unit, the receiving unit and the route exchange unit; and a route exchange unit including a route exchange function configured to switch an output port of one or more optical paths entering from an input port based on the control signal from the control unit and a bandwidth change function configured to change a frequency bandwidth by which an optical path can pass through a section from the output port to the output port, the control unit including:

a control transmit receive function configured to transmit and receive, with the external management apparatus, modulation format control information of the transmission unit and the receiving unit and control information of the route exchange function and the bandwidth change function of the route exchange unit, and a control function configured to control the transmission unit, the receiving unit and the route exchange unit based on the control information, wherein the transmission unit generates and transmits an optical signal by changing the modulation format based on the control signal from the control unit, the receiving unit performs reception corresponding to a modulation format of an optical path transmitted from another optical communication apparatus, and the route exchange unit sets a frequency bandwidth in a section through which the optical path passes in accordance with the bandwidth of the path.

7. The bandwidth variable communication apparatus as claimed in claim 6, wherein the transmission unit:

performs M multi-level modulation of optical phase, optical strength or both of the optical phase and the optical strength with a symbol rate SR (bit/s) using a single carrier, and generates an optical signal by selecting a combination of a modulation level M and a symbol rate SR that satisfies B=M×SR in which transmission is available and the spectrum bandwidth is narrow according to the optical signal quality deterioration amount in the optical path route.

8. The bandwidth variable communication apparatus as claimed in claim 7, wherein the transmission unit:

further uses polarized wave multiplexing, and generates the optical signal by selecting the combination of the modulation level M and the symbol rate SR that satisfies B=M×SR×2 in which transmission is available and the spectrum bandwidth is narrow.

9. The bandwidth variable communication apparatus as claimed in claim 6, wherein the transmission unit:

performs M multi-level modulation of optical phase, optical strength or both of the optical phase and the optical strength with a symbol rate SR (bit/s) for each subcarrier by using orthogonal frequency division multiplexing of N subcarriers in which frequency bands partially overlap, and generates an optical signal by selecting a combination of the number N of subcarriers and a modulation level M that satisfies B=N×M×SR in which transmission is available and the spectrum bandwidth is narrow according to the optical signal quality deterioration amount in the path route.

10. The bandwidth variable communication apparatus as claimed in claim 9, wherein the transmission unit:

further uses polarized wave multiplexing, and generates the optical signal by selecting the combination of the number N of subcarriers and the modulation level M that satisfies B=N×M×SR×2 in which transmission is available and the spectrum bandwidth is narrow.

11. A transmission bandwidth determination apparatus including a function configured to transmit a control instruction to an optical transmission apparatus, a node apparatus and an optical receiving apparatus and to set a designated route, in an optical communication network formed by connecting, via transmission routes, the optical transmission apparatus having a function for changing a modulation scheme for transmitting an optical signal, the node apparatus having a function for changing a pass bandwidth of an optical signal, and an optical receiving apparatus that can receive signals of various modulation schemes, the transmission bandwidth determination apparatus comprising:
a transmission information database configured to store corresponding relationship between transmission specification of a communication path for route setting, a pass bandwidth to be assigned to the node apparatus on the communication path and a modulation scheme to be set to the optical transmission apparatus;
a pass bandwidth and modulation scheme determination unit configured to determine a pass bandwidth to be assigned and a modulation scheme according to the transmission specification of an optical communication path to be set by referring to the transmission information database; and
a control unit configured to receive information of the pass bandwidth and the modulation scheme set by the pass bandwidth and modulation scheme determination unit, and to perform setting of the optical communication path according to the information.

12. The transmission bandwidth determination apparatus as claimed in claim 11, wherein the pass bandwidth and modulation scheme determination unit changes a modulation level, a bit rate, or the number of subcarriers in the change of the modulation scheme of the optical transmission apparatus.

13. The transmission bandwidth determination apparatus as claimed in claim 12, the pass bandwidth and modulation scheme determination unit including
a unit configured to determine the pass bandwidth of the node apparatus, and a modulation level, a bit rate, or the number of subcarriers of the optical transmission apparatus such that a use communication bandwidth becomes the smallest by comparing cases of applying different modulation schemes, or by comparing cases of applying different pass bandwidth with the same modulation scheme, or for both of the cases.

14. A transmission bandwidth determination method in a transmission bandwidth determination apparatus including a function configured to transmit a control instruction to an optical transmission apparatus, a node apparatus and an optical receiving apparatus and to set a designated route, in an optical communication network formed by connecting, via transmission routes, the optical transmission apparatus having a function for changing a modulation scheme for transmitting an optical signal, the node apparatus having a function for changing a pass bandwidth of an optical signal, and an optical receiving apparatus that can receive signals of various modulation schemes, the transmission bandwidth determination apparatus comprising:
a pass bandwidth and modulation scheme determination step in which a pass bandwidth and modulation scheme determination unit determines a pass bandwidth to be assigned and a modulation scheme by referring to a transmission information database configured to store corresponding relationship between transmission specification of a communication path for route setting, a pass bandwidth to be assigned to the node apparatus on the communication path and a modulation scheme to be set to the optical transmission apparatus;
a control step in which a control unit receives information of the pass bandwidth and the modulation scheme set by the pass bandwidth and modulation scheme determination step, and performs setting of the optical communication path according to the information.

15. The transmission bandwidth determination method as claimed in claim 14, the pass bandwidth and modulation scheme determination step comprising:
changing a modulation level, a bit rate, or the number of subcarriers in the change of the modulation scheme of the optical transmission apparatus.

16. The transmission bandwidth determination method as claimed in claim 14, the pass bandwidth and modulation scheme determination step comprising:
determining the pass bandwidth of the node apparatus, and a modulation level, a bit rate, or the number of subcarriers of the optical transmission apparatus such that a use communication bandwidth becomes the smallest by comparing cases of applying different modulation schemes, or by comparing cases of applying different pass bandwidth with the same modulation scheme, or for both of the cases.

17. A node apparatus in a communication network, comprising:
a bandwidth variable transmission unit configured to transmit an optical signal of an arbitrary frequency band;
a bandwidth variable receiving unit configured to receive an optical signal of an arbitrary frequency band;
a bandwidth variable route exchange unit configured to perform route exchange for an optical signal of an arbitrary frequency band between arbitrary input-output routes; and
a control function unit configured to set a signal of an arbitrary frequency band in arbitrary input-output routes by exchanging a control signal with the bandwidth variable transmission unit, the bandwidth variable receiving unit and the bandwidth variable route exchange unit, wherein
the control signal designates the frequency band of the optical signal on which route exchange is performed by using a start point value and an end point value of an optical frequency or by using a center frequency and a bandwidth.

18. The node apparatus as claimed in claim 17, comprising:
a connection part to be connected to a client apparatus on the communication network;
an output route exchange unit configured to exchange an output route to a node of a next stage; and
a switch unit between the connection part and the output route exchange unit,
wherein the client apparatus connects to an arbitrary output route with an arbitrary frequency.

19. The node apparatus as claimed in claim 17, comprising a unit configured to receive a signal quality that is measured by changing an oscillation optical frequency of an optical transmitter within a range predetermined in a receiver on the communication network,
determine an oscillation optical frequency bandwidth based on the reception result, and
output an optical signal input in an input part to an output part with an optical frequency band of the oscillation optical frequency bandwidth.

20. The node apparatus as claimed in claim 17, wherein
when the communication network includes a function for setting a standby communication path for an active communication path and performing switching from the active communication path to the standby communication path being triggered by a trigger signal or route change of a communication path, the node comprises a unit configured to change an optical frequency bandwidth to be set to the communication path, or the node apparatus comprises a unit configured to reduce the number of transmission lanes for an active communication path of a short route for communication and to increase the number of transmission lanes only when the active communication path is switched to a standby communication path of a long route.

21. The node apparatus as claimed in claim 17, comprising a unit configured to change an optical frequency transmitted by the optical transmitter when the communication network switches the active communication path to the standby communication path.

22. The node apparatus as claimed in claim 17, wherein
when the communication network includes a function for setting a standby communication path for an active communication path and performing switching from the active communication path to the standby communication path being triggered by a trigger signal or route change of a communication path, the node comprises:
a unit configured to change a modulation scheme of an optical signal to be transmitted when the node apparatus becomes the transmitter, and
a unit configured to change a modulation scheme for receiving when the node apparatus becomes the receiver.

23. The node apparatus as claimed in claim 17, comprising a unit configured to change the number of lanes for transmission when the node apparatus becomes the optical transmitter in the case when the communication network sets a standby communication path for an active communication path and switches from the active communication path to the standby communication path being triggered by a trigger signal or changes a route of a communication path; and
a unit configured to change the number of lanes for reception when the node apparatus becomes the optical receiver in the case when the communication network sets a standby communication path for an active communication path and switches from the active communication path to the standby communication path being triggered by a trigger signal or changes a route of a communication path.

24. A communication path setting system in a communication network that connects, via optical transmission routes,
a node apparatus that can output an input optical signal to an arbitrary output unit by parallel transmission and that includes a function for changing the number of lanes in the parallel transmission,
an optical transmitter that can perform parallel transmission of an optical signal and that can change the number of lanes, and
an optical receiver that can receive an optical signal received in parallel transmission with an arbitrary number of lanes,
the communication path setting system comprising:
a control function unit configured to transmit a control instruction to the node apparatus;
a database configured to store correspondence information between transmission specification required when setting a communication path and the number of transmission lanes;
a transmission lane number determination function unit configured to determine the number of lanes corresponding to a required transmission specification; and
a control apparatus including a unit configured to transmit a communication path setting instruction to the node apparatus with the lane number determined by the transmission lane number determination function unit, and to set a communication path,
the optical transmitter comprising:
a unit configured to change the number of lanes for transmission in the case when the communication network sets a standby communication path for an active communication path and switches from the active communication path to the standby communication path being triggered by a trigger signal or performs route change of a communication path, and
the optical receiver comprising:
a unit configured to change the number of lanes for reception in the case when the communication network sets a standby communication path for an active communication path and switches from the active communication path to the standby communication path being triggered by a trigger signal or performs route change of a communication path.

25. A communication path setting method in a node apparatus in a communication network, wherein a control function unit of the node apparatus:
sets a signal of an arbitrary frequency band in arbitrary input-output routes by performing control of exchanging a control signal among
a bandwidth variable transmission unit configured to transmit an optical signal of an arbitrary frequency band,
a bandwidth variable receiving unit configured to receive an optical signal of an arbitrary frequency band, and
a bandwidth variable route exchange unit configured to perform route exchange for an optical signal of an arbitrary frequency band between arbitrary input-output routes, wherein
the control signal designates the frequency band of the optical signal on which route exchange is performed by using a start point value and an end point value of an optical frequency or by using a center frequency and a bandwidth.

* * * * *